United States Patent
Gan et al.

(10) Patent No.: US 11,832,263 B2
(45) Date of Patent: Nov. 28, 2023

(54) COMMUNICATION METHOD AND APPARATUS

(71) Applicant: Huawei Technologies Co., Ltd., Shenzhen (CN)

(72) Inventors: Ming Gan, Shenzhen (CN); Mengshi Hu, Shenzhen (CN); Jian Yu, Shenzhen (CN); Dandan Liang, Shenzhen (CN); Yiqing Li, Shenzhen (CN); Yunbo Li, Shenzhen (CN); Yuchen Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/994,813

(22) Filed: Nov. 28, 2022

(65) Prior Publication Data
US 2023/0109874 A1 Apr. 13, 2023

Related U.S. Application Data

(63) Continuation of application No. PCT/CN2021/096896, filed on May 28, 2021.

(30) Foreign Application Priority Data

May 28, 2020 (CN) .......................... 202010471252.8
Oct. 16, 2020 (CN) .......................... 202011112221.X
(Continued)

(51) Int. Cl.
*H04W 72/04* (2023.01)
*H04W 72/21* (2023.01)
(Continued)

(52) U.S. Cl.
CPC ....... *H04W 72/21* (2023.01); *H04W 72/0446* (2013.01); *H04W 72/0453* (2013.01)

(58) Field of Classification Search
CPC ............. H04W 72/21; H04W 72/0446; H04W 72/0453
See application file for complete search history.

(56) References Cited

U.S. PATENT DOCUMENTS 10,123,330 B2  11/2018  Josiam et al.
10,425,917 B2  9/2019   Asterjadhi et al.
(Continued)

FOREIGN PATENT DOCUMENTS

CN   107534972 A   1/2018
CN   107736072     2/2018
(Continued)

OTHER PUBLICATIONS

Lopez-Perez, D. et al, "IEEE 802.11be Extremely High Throughput: The Next Generation of Wi-Fi Technology Beyond 802.11ax", arXiv:1902.04320v2 [cs.IT] Sep. 27, 2019, 6 pages.
(Continued)

*Primary Examiner* — Brian D Nguyen
(74) *Attorney, Agent, or Firm* — Slater Matsil, LLP

(57) ABSTRACT

This application provides a communication method and apparatus, and relates to the field of communication technologies. The method includes: An AP generates a trigger frame, where the trigger frame includes a first user information field, a part or all of a frequency domain resource indicated by a resource unit allocation subfield in a fourth user information field before the first user information field is located on a primary 160 MHz channel, and a part or all of a frequency domain resource indicated by a resource unit allocation subfield in a fourth user information field after the first user information field is located on a secondary 160 MHz channel. Then, the AP sends the trigger frame.

30 Claims, 21 Drawing Sheets

(30) Foreign Application Priority Data

Dec. 2, 2020 (CN) .......................... 202011391598.3
Dec. 14, 2020 (CN) .......................... 202011468003.X

(51) Int. Cl.
*H04W 72/0446* (2023.01)
*H04W 72/0453* (2023.01)

(56) References Cited

U.S. PATENT DOCUMENTS

| | | | |
|---|---|---|---|
| 10,470,174 B2 | 11/2019 | Verma et al. | |
| 10,862,635 B2* | 12/2020 | Huang | H04B 7/0452 |
| 11,218,351 B2 | 1/2022 | Yu et al. | |
| 2017/0188376 A1* | 6/2017 | Noh | H04W 52/42 |
| 2018/0167177 A1 | 6/2018 | Huang et al. | |
| 2018/0332627 A1 | 11/2018 | Chitrakar et al. | |
| 2019/0124556 A1 | 4/2019 | Verma et al. | |
| 2019/0238195 A1* | 8/2019 | Liu | H04B 7/0413 |
| 2019/0349067 A1 | 11/2019 | Huang et al. | |
| 2020/0015219 A1 | 1/2020 | Asterjadhi et al. | |
| 2022/0361103 A1* | 11/2022 | Li | H04W 28/06 |
| 2022/0407754 A1* | 12/2022 | Park | H04L 1/0031 |
| 2023/0014333 A1* | 1/2023 | Park | H04W 74/08 |
| 2023/0081928 A1* | 3/2023 | Park | H04L 27/2602 |

FOREIGN PATENT DOCUMENTS

| | | |
|---|---|---|
| CN | 109996343 | 7/2019 |
| CN | 110352589 A | 10/2019 |
| CN | 110730050 A | 1/2020 |
| TW | 201924384 A | 6/2019 |
| WO | 2017030342 A1 | 2/2017 |
| WO | 2019043192 A1 | 3/2019 |
| WO | 2020013594 A1 | 1/2020 |

OTHER PUBLICATIONS

IEEE P802.11ax/D6.0, "Draft Standard for Information technology—Tele-communications and information exchange between systems Local and metropolitan area networks—Specific requirements", Part 11: Wireless LAN Medium Access Control (MAC) and Physical Layer (PHY) Specifications, Amendment 1: Enhancements for High Efficiency WLAN, Nov. 2019, 780 pages.

IEEE Std 802.11-2016, "IEEE Standard for Information technology—Telecommunications and information exchange between systems Local and metropolitan area networks—Specific requirements", Part 11: Wireless LAN Medium Access Control (MAC) and Physical Layer (PHY) Specifications, Approved Dec. 7, 2016, total 3534 pages.

* cited by examiner

| 4 bits | 8 bits | 1 bit | 1 bit | 2 bits | 2 bits | 1 bit | 3 bits | 1 bit |
|---|---|---|---|---|---|---|---|---|
| Trigger type | Uplink length | More trigger frame | Carrier sensing required | Uplink bandwidth | Guard interval and HE long training field type | Mode | Number of HE-LTF symbols and midamble peridicity | Uplink space-time block coding |

| 1 bit | 1 bit | 2 bits | 1 bit | 16 bits | 1 bit | 9 bits | 1 bit | Change |
|---|---|---|---|---|---|---|---|---|
| LDPC extra symbol segment | AP transmit power | Pre-FEC padding factor | Packet extension disambiguilty | Uplink spatial reuse | Doppler | Uplink HE-SIG-A2 reserved | Reserved | Trigger dependent common info |

FIG. 6

| 12 bits | 8 bits | 1 bit | 4 bits | 1 bit | 6 bits | 7 bits | 1 bit | Change |
|---|---|---|---|---|---|---|---|---|
| AID | Resource unit allocation | Uplink forward error correction coding type | Modulation and coding scheme | Dual-carrier modulation | Spatial stream allocation/ random access RU information | Uplink target received signal strength indicator | Reserved | Trigger dependent station info |

FIG. 7

First 20 MHz channel

Second 20 MHz channel

Third 20 MHz channel

Fourth 20 MHz channel

First 20 MHz channel

Second 20 MHz channel

Third 20 MHz channel

Fourth 20 MHz channel

First 20 MHz channel

Second 20 MHz channel

Third 20 MHz channel

Fourth 20 MHz channel

First 20 MHz channel

Second 20 MHz channel

Third 20 MHz channel

Fourth 20 MHz channel

| Secondary 80 MHz channel | Legacy short training field | Legacy long training field | Legacy signal field | Repeated legacy signal field | General field | Extremely high throughput short training field | Extremely high throughput long training field | Data |
|---|---|---|---|---|---|---|---|---|
| | | | | | | Extremely high throughput short training field | Extremely high throughput long training field | Data |
| | | | | | | ... | | |
| | | | | | | Extremely high throughput short training field | Extremely high throughput long training field | Data |
| | Legacy short training field | Legacy long training field | Legacy signal field | Repeated legacy signal field | General field | Extremely high throughput short training field | Extremely high throughput long training field | Data |
| | | | | | | Extremely high throughput short training field | Extremely high throughput long training field | Data |
| | | | | | | ... | | |
| | | | | | | Extremely high throughput short training field | Extremely high throughput long training field | Data |
| | Legacy short training field | Legacy long training field | Legacy signal field | Repeated legacy signal field | General field | Extremely high throughput short training field | Extremely high throughput long training field | Data |
| | | | | | | Extremely high throughput short training field | Extremely high throughput long training field | Data |
| | | | | | | ... | | |
| | | | | | | Extremely high throughput short training field | Extremely high throughput long training field | Data |
| | Legacy short training field | Legacy long training field | Legacy signal field | Repeated legacy signal field | General field | Extremely high throughput short training field | Extremely high throughput long training field | Data |
| | | | | | | Extremely high throughput short training field | Extremely high throughput long training field | Data |
| | | | | | | ... | | |
| | | | | | | Extremely high throughput short training field | Extremely high throughput long training field | Data |
| Primary 80 MHz channel | Legacy short training field | Legacy long training field | Legacy signal field | Repeated legacy signal field | High efficient signal field A | High efficient short training field | High efficient long training field | Data |
| | | | | | | High efficient short training field | High efficient long training field | Data |
| | | | | | | ... | | |
| | | | | | | High efficient short training field | High efficient long training field | Data |
| | Legacy short training field | Legacy long training field | Legacy signal field | Repeated legacy signal field | High efficient signal field A | High efficient short training field | High efficient long training field | Data |
| | | | | | | High efficient short training field | High efficient long training field | Data |
| | | | | | | ... | | |
| | | | | | | High efficient short training field | High efficient long training field | Data |
| | Legacy short training field | Legacy long training field | Legacy signal field | Repeated legacy signal field | High efficient signal field A | High efficient short training field | High efficient long training field | Data |
| | | | | | | High efficient short training field | High efficient long training field | Data |
| | | | | | | ... | | |
| | | | | | | High efficient short training field | High efficient long training field | Data |
| | Legacy short training field | Legacy long training field | Legacy signal field | Repeated legacy signal field | High efficient signal field A | High efficient short training field | High efficient long training field | Data |
| | | | | | | High efficient short training field | High efficient long training field | Data |
| | | | | | | ... | | |
| | | | | | | High efficient short training field | High efficient long training field | Data |

FIG. 65

| B0 to B4 | B5 to B12 | B13 to B17 | B18 to B22 | B23 and B24 | B25 |
|---|---|---|---|---|---|
| UL data symbols | Resource unit allocation | AP uplink transmit power | UL target RSSI | UL MCS | Reserved |
FIG. 66
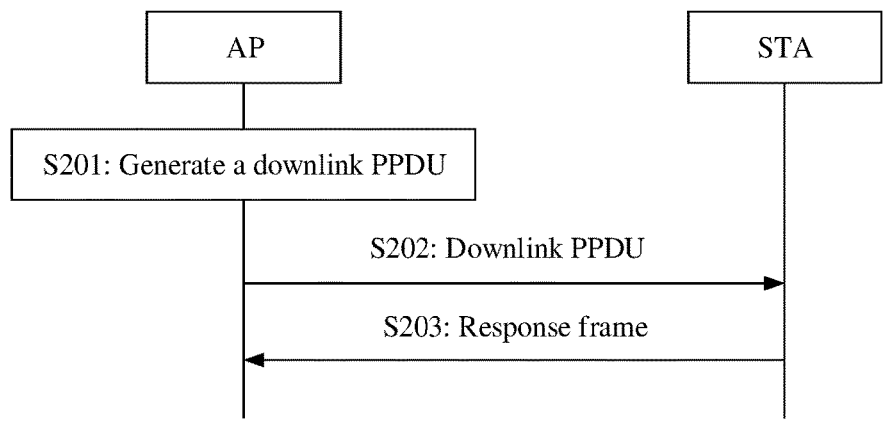
FIG. 67
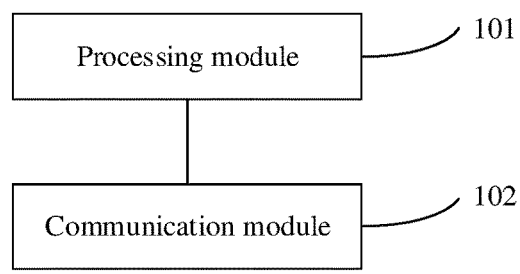
FIG. 68

First 20 MHz channel

Second 20 MHz channel

Third 20 MHz channel

Fourth 20 MHz channel

COMMUNICATION METHOD AND APPARATUS

CROSS-REFERENCE TO RELATED APPLICATIONS

This application is a continuation of International Application No. PCT/CN2021/096896, filed on May 28, 2021, which claims priority to Chinese Patent Application No. 202011468003.X, filed on Dec. 14, 2020 and Chinese Patent Application No. 202011391598.3, filed on Dec. 2, 2020 and Chinese Patent Application No. 202011112221.X, filed on Oct. 16, 2020 and Chinese Patent Application No. 202010471252.8, filed on May 28, 2020. All of the aforementioned patent applications are hereby incorporated by reference in their entireties.

TECHNICAL FIELD

This application relates to the field of communication technologies, and in particular, to a communication method and apparatus.

BACKGROUND

The 802.11 standard is a general standard for a wireless local area network (WLAN). Currently, the Institute of Electrical and Electronics Engineers (IEEE) is discussing a next-generation 802.11be standard after 802.11ax. Compared with the previous 802.11ax standard, the 802.11be standard supports extremely high throughput (EHT) data transmission. In the following, a station that supports the 802.11ax standard but does not support the 802.11be standard is referred to as a high efficient (HE) station for short, and a station that supports the 802.11be standard is referred to as an EHT station for short.

In the 802.11ax standard, an access point (AP) may trigger, by using a trigger frame, a station to perform uplink transmission. In a scenario to which a next-generation 802.11 standard is applied, to maintain compatibility, the trigger frame should be used to trigger the HE station and the EHT station to simultaneously perform uplink transmission.

In addition, a maximum transmission bandwidth supported by the 802.11ax standard is 160 MHz, and a maximum transmission bandwidth supported by the 802.11be standard is 320 MHz. In the scenario to which the next-generation 802.11 standard is applied, to transmit a larger bandwidth, the trigger frame should be used to trigger the EHT station to perform uplink transmission in a bandwidth greater than 160 MHz.

Therefore, how to enable the trigger frame to have a capability of triggering a station to perform uplink transmission in the bandwidth greater than 160 MHz while maintaining compatibility of the trigger frame is an urgent problem to be resolved in the industry.

SUMMARY

This application provides a communication method and apparatus, to enable a trigger frame to have a capability of triggering an EHT station to perform uplink transmission in a bandwidth greater than 160 MHz while ensuring compatibility of the trigger frame.

According to a first aspect, a communication method is provided, including: generating a trigger frame, where the trigger frame includes a first user information field and one or more fourth user information fields; the fourth user information field includes a resource unit allocation subfield, and the resource unit allocation subfield indicates to allocate a frequency domain resource; a part or all of a frequency domain resource allocated by a resource unit allocation subfield in a fourth user information field before the first user information field is located on a primary 160 MHz channel, and a part or all of a frequency domain resource allocated by a resource unit allocation subfield in a fourth user information field after the first user information field is located on a secondary 160 MHz channel; and the fourth user information field is used to trigger a station to send a response frame; and sending the trigger frame.

Based on the foregoing solution, the first user information field exists in a user information list field of the trigger frame, and the first user information field may be used to determine a specific 160 MHz frequency domain in which a frequency domain resource indicated by a resource unit allocation subfield in another user information field is located, so that a resource unit is allocated to a first station in a 320 MHz frequency domain by using the trigger frame. In addition, one bit does not need to be added to the resource unit allocation subfield in the fourth user information field. This ensures that the trigger frame provided in this application can be compatible with a trigger frame in the 802.11ax standard.

In a possible design, the method further includes: receiving an uplink MAC frame of one or more stations, where the MAC frame is sent on the frequency domain resource allocated by the resource unit allocation subfield in the fourth user information field; and then sending an acknowledgement frame.

In a possible design, a value in an AID subfield in the first user information field is a first preset value, and the first preset value is any one of 2008 to 2044 or 2046 to 4095.

In a possible design, a user information field whose value in an AID subfield is 4095 includes a first indication field; if a value of the first indication field is a first value, the user information field whose value in an AID subfield is 4095 is a user information field used to fill the trigger frame; and if the value of the first indication field is a second value, the user information field whose AID subfield is 4095 is the first user information field.

In a possible design, the resource unit allocation subfield occupies eight bits, bits B1 to B7 in the eight bits jointly indicate the frequency domain resource used by the station, and a bit B0 in the eight bits indicates whether a part or all of the frequency domain resource allocated by the bits B1 to B7 is located on a primary 80 MHz channel or a secondary 80 MHz channel.

In a possible design, a quantity of bits occupied by the first user information field is the same as a quantity of bits occupied by a user information field corresponding to a second station.

In a possible design, the trigger frame includes a third user information field, the third user information field carries common information of a first station, and the first station supports an 802.11 standard after the 802.11ax standard. In this way, the trigger frame uses the third user information field to carry the extra common information that needs to be read by the first station, so that a quantity of bits does not need to be added to a common information field of the trigger frame, thereby ensuring that the trigger frame provided in this application can be compatible with the trigger frame in the 802.11ax standard. In other words, the trigger frame provided in this application may trigger the first station to perform uplink transmission, and may also trigger the second station to perform uplink transmission.

In a possible design, the third user information field includes one or more of the following: (1) a first subfield, where the first subfield indicates an uplink bandwidth in combination with an uplink bandwidth subfield in the common information field of the trigger frame; (2) a second subfield, where the second subfield indicates a puncturing pattern; (3) a third subfield, where the third subfield indicates the first station transmits whether an HE PPDU or an EHT PPDU on one or more frequency segments in the uplink bandwidth; and (4) a fourth subfield, where the fourth subfield indicates a spatial reuse parameter supporting 320 MHz bandwidth transmission.

In a possible design, if the first subfield occupies one bit, that the first subfield indicates the uplink bandwidth in combination with the uplink bandwidth subfield in the common information field of the trigger frame includes the following cases: when a value of the uplink bandwidth subfield is 3 and a value of the first subfield is a fourth value, the uplink bandwidth is 160 MHz; and when the value of the uplink bandwidth subfield is 3 and the value of the first subfield is a fifth value, the uplink bandwidth is 320 MHz.

In a possible design, if the first subfield occupies two bits, that the first subfield indicates the uplink bandwidth in combination with the uplink bandwidth subfield in the common information field of the trigger frame includes the following cases: when a value of the uplink bandwidth subfield is 3 and a value of the first subfield is a sixth value, the uplink bandwidth is 160 MHz; when the value of the uplink bandwidth subfield is 3 and the value of the first subfield is a seventh value, the uplink bandwidth is 240 MHz; and when the value of the uplink bandwidth subfield is 3 and the value of the first subfield is an eighth value, the uplink bandwidth is 320 MHz.

In a possible design, a quantity of bits occupied by the common information field of the trigger frame is the same as a quantity of bits occupied by a common information field of the trigger frame in the 802.11ax standard.

According to a second aspect, a communication method is provided. The method includes: receiving a trigger frame, where the trigger frame includes a first user information field and one or more fourth user information fields; the fourth user information field includes a resource unit allocation subfield, and the resource unit allocation subfield indicates to allocate a frequency domain resource; a part or all of a frequency domain resource allocated by a resource unit allocation subfield in a fourth user information field before the first user information field is located on a primary 160 MHz channel, and a part or all of a frequency domain resource allocated by a resource unit allocation subfield in a fourth user information field after the first user information field is located on a secondary 160 MHz channel; and the fourth user information field is used to trigger a station to send a response frame; and parsing the trigger frame.

In a possible design, the method further includes: sending an uplink MAC frame, where the MAC frame is sent on the frequency domain resource allocated by the resource unit allocation subfield in the fourth user information field; and receiving an acknowledgment frame.

In a possible design, a value in an AID subfield in the first user information field is a first preset value, and the first preset value is any one of 2008 to 2044 or 2046 to 4095.

In a possible design, a user information field whose value in an AID subfield is 4095 includes a first indication field; if a value of the first indication field is a first value, the user information field whose value in an AID subfield is 4095 is a user information field used to fill the trigger frame; and if the value of the first indication field is a second value, the user information field whose AID subfield is 4095 is the first user information field.

In a possible design, the resource unit allocation subfield occupies eight bits, bits B1 to B7 in the eight bits jointly indicate the frequency domain resource used by the station, and a bit B0 in the eight bits indicates whether a part or all of the frequency domain resource allocated by the bits B1 to B7 is located on a primary 80 MHz channel or a secondary 80 MHz channel.

In a possible design, a quantity of bits occupied by the first user information field is the same as a quantity of bits occupied by a user information field corresponding to a second station.

In a possible design, the trigger frame includes a third user information field, the third user information field carries common information of a first station, and the first station supports an 802.11 standard after the 802.11ax standard.

In a possible design, the third user information field includes one or more of the following: (1) a first subfield, where the first subfield indicates an uplink bandwidth in combination with an uplink bandwidth subfield in a common information field of the trigger frame; (2) a second subfield, where the second subfield indicates a puncturing pattern; (3) a third subfield, where the third subfield indicates the first station transmits whether an HE PPDU or an EHT PPDU on one or more frequency segments in the uplink bandwidth; and (4) a fourth subfield, where the fourth subfield indicates a spatial reuse parameter supporting 320 MHz bandwidth transmission.

In a possible design, if the first subfield occupies one bit, that the first subfield indicates the uplink bandwidth in combination with the uplink bandwidth subfield in the common information field of the trigger frame includes the following cases: when a value of the uplink bandwidth subfield is 3 and a value of the first subfield is a fourth value, the uplink bandwidth is 160 MHz; and when the value of the uplink bandwidth subfield is 3 and the value of the first subfield is a fifth value, the uplink bandwidth is 320 MHz.

In a possible design, if the first subfield occupies two bits, that the first subfield indicates the uplink bandwidth in combination with the uplink bandwidth subfield in the common information field of the trigger frame includes the following cases: when a value of the uplink bandwidth subfield is 3 and a value of the first subfield is a sixth value, the uplink bandwidth is 160 MHz; when the value of the uplink bandwidth subfield is 3 and the value of the first subfield is a seventh value, the uplink bandwidth is 240 MHz; and when the value of the uplink bandwidth subfield is 3 and the value of the first subfield is an eighth value, the uplink bandwidth is 320 MHz.

In a possible design, a quantity of bits occupied by the common information field of the trigger frame is the same as a quantity of bits occupied by a common information field of a trigger frame in the 802.11ax standard.

According to a third aspect, a communication method is provided. The method includes: generating a trigger frame, where the trigger frame includes a third user information field, the third user information field carries common information of a first station, and the first station supports an 802.11 standard after the 802.11ax standard; and then sending the trigger frame.

In a possible design, the method further includes: receiving an uplink MAC frame of one or more stations, where the MAC frame is sent on a frequency domain resource allocated by a resource unit allocation subfield in a fourth user information field; and then sending an acknowledgement frame.

In a possible design, the third user information field includes one or more of the following: (1) a first subfield, where the first subfield indicates an uplink bandwidth in combination with an uplink bandwidth subfield in a common information field of the trigger frame; (2) a second subfield, where the second subfield indicates a puncturing pattern; (3) a third subfield, where the third subfield indicates the first station transmits whether an HE PPDU or an EHT PPDU on one or more frequency segments in the uplink bandwidth; and (4) a fourth subfield, where the fourth subfield indicates a spatial reuse parameter supporting 320 MHz bandwidth transmission.

In a possible design, if the first subfield occupies one bit, that the first subfield indicates the uplink bandwidth in combination with the uplink bandwidth subfield in the common information field of the trigger frame includes the following cases: when a value of the uplink bandwidth subfield is 3 and a value of the first subfield is a fourth value, the uplink bandwidth is 160 MHz; and when the value of the uplink bandwidth subfield is 3 and the value of the first subfield is a fifth value, the uplink bandwidth is 320 MHz.

In a possible design, if the first subfield occupies two bits, that the first subfield indicates the uplink bandwidth in combination with the uplink bandwidth subfield in the common information field of the trigger frame includes the following cases: when a value of the uplink bandwidth subfield is 3 and a value of the first subfield is a sixth value, the uplink bandwidth is 160 MHz; when the value of the uplink bandwidth subfield is 3 and the value of the first subfield is a seventh value, the uplink bandwidth is 240 MHz; and when the value of the uplink bandwidth subfield is 3 and the value of the first subfield is an eighth value, the uplink bandwidth is 320 MHz.

In a possible design, a quantity of bits occupied by the common information field of the trigger frame is the same as a quantity of bits occupied by a common information field of a trigger frame in the 802.11ax standard.

In a possible design, the trigger frame includes a first user information field and one or more fourth user information fields; the fourth user information field includes a resource unit allocation subfield, and the resource unit allocation subfield indicates to allocate a frequency domain resource; a part or all of a frequency domain resource allocated by a resource unit allocation subfield in a fourth user information field before the first user information field is located on a primary 160 MHz channel, and a part or all of a frequency domain resource allocated by a resource unit allocation subfield in a fourth user information field after the first user information field is located on a secondary 160 MHz channel; and the fourth user information field is used to trigger a station to send a response frame.

In a possible design, a value in an AID subfield in the first user information field is a first preset value, and the first preset value is any one of 2008 to 2044 or 2046 to 4095.

In a possible design, a user information field whose value in an AID subfield is 4095 includes a first indication field; if a value of the first indication field is a first value, the user information field whose value in an AID subfield is 4095 is a user information field used to fill the trigger frame; and if the value of the first indication field is a second value, the user information field whose AID subfield is 4095 is the first user information field.

In a possible design, the resource unit allocation subfield occupies eight bits, bits B1 to B7 in the eight bits jointly indicate the frequency domain resource used by the station, and a bit B0 in the eight bits indicates whether a part or all of the frequency domain resource allocated by the bits B1 to B7 is located on a primary 80 MHz channel or a secondary 80 MHz channel.

In a possible design, a quantity of bits occupied by the first user information field is the same as a quantity of bits occupied by a user information field corresponding to a second station.

According to a fourth aspect, a communication method is provided. The method includes: receiving a trigger frame, where the trigger frame includes a third user information field, the third user information field carries common information of a first station, and the first station supports an 802.11 standard after the 802.11ax standard; and then parsing the trigger frame.

In a possible design, the method further includes: sending an uplink MAC frame, where the MAC frame is sent on a frequency domain resource allocated by a resource unit allocation subfield in the fourth user information field; and receiving an acknowledgment frame.

In a possible design, the third user information field includes one or more of the following: (1) a first subfield, where the first subfield indicates an uplink bandwidth in combination with an uplink bandwidth subfield in a common information field of the trigger frame; (2) a second subfield, where the second subfield indicates a puncturing pattern; (3) a third subfield, where the third subfield indicates the first station transmits whether an HE PPDU or an EHT PPDU on one or more frequency segments in the uplink bandwidth; and (4) a fourth subfield, where the fourth subfield indicates a spatial reuse parameter supporting 320 MHz bandwidth transmission.

In a possible design, if the first subfield occupies one bit, that the first subfield indicates the uplink bandwidth in combination with the uplink bandwidth subfield in the common information field of the trigger frame includes the following cases: when a value of the uplink bandwidth subfield is 3 and a value of the first subfield is a fourth value, the uplink bandwidth is 160 MHz; and when the value of the uplink bandwidth subfield is 3 and the value of the first subfield is a fifth value, the uplink bandwidth is 320 MHz.

In a possible design, if the first subfield occupies two bits, that the first subfield indicates the uplink bandwidth in combination with the uplink bandwidth subfield in the common information field of the trigger frame includes the following cases: when a value of the uplink bandwidth subfield is 3 and a value of the first subfield is a sixth value, the uplink bandwidth is 160 MHz; when the value of the uplink bandwidth subfield is 3 and the value of the first subfield is a seventh value, the uplink bandwidth is 240 MHz; and when the value of the uplink bandwidth subfield is 3 and the value of the first subfield is an eighth value, the uplink bandwidth is 320 MHz.

In a possible design, a quantity of bits occupied by the common information field of the trigger frame is the same as a quantity of bits occupied by a common information field of a trigger frame in the 802.11ax standard.

In a possible design, the trigger frame includes a first user information field and one or more fourth user information fields; the fourth user information field includes a resource unit allocation subfield, and the resource unit allocation subfield indicates to allocate a frequency domain resource; a part or all of a frequency domain resource allocated by a resource unit allocation subfield in a fourth user information field before the first user information field is located on a primary 160 MHz channel, and a part or all of a frequency domain resource allocated by a resource unit allocation subfield in a fourth user information field after the first user information field is located on a secondary 160 MHz channel; and the fourth user information field is used to trigger a station to send a response frame.

In a possible design, a value in an AID subfield in the first user information field is a first preset value, and the first preset value is any one of 2008 to 2044 or 2046 to 4095.

In a possible design, a user information field whose value in an AID subfield is 4095 includes a first indication field; if a value of the first indication field is a first value, the user information field whose value in an AID subfield is 4095 is a user information field used to fill the trigger frame; and if the value of the first indication field is a second value, the user information field whose AID subfield is 4095 is the first user information field.

In a possible design, the resource unit allocation subfield occupies eight bits, bits B1 to B7 in the eight bits jointly indicate the frequency domain resource used by the station, and a bit B0 in the eight bits indicates whether a part or all of the frequency domain resource allocated by the bits B1 to B7 is located on a primary 80 MHz channel or a secondary 80 MHz channel.

In a possible design, a quantity of bits occupied by the first user information field is the same as a quantity of bits occupied by a user information field corresponding to a second station.

According to a fifth aspect, a communication method is provided. The method includes: generating a downlink PPDU, where the downlink PPDU includes a MAC frame corresponding to one or more first stations; the MAC frame corresponding to the first station includes a TRS control field, the TRS control field includes a control information field, the control information field includes a resource unit allocation subfield, and all or a part of a frequency domain resource indicated by the resource unit allocation subfield is located on a 160 MHz channel on which the MAC frame that carries the resource unit allocation subfield in the TRS control field is transmitted; and then sending the downlink PPDU.

In a possible design, the method further includes: receiving a response frame sent by the one or more stations.

According to a sixth aspect, a communication method is provided. The method includes: receiving a downlink PPDU, where the downlink PPDU includes a MAC frame corresponding to one or more first stations, the MAC frame corresponding to the first station includes a TRS control field, the TRS control field includes a control information field, the control information field includes a resource unit allocation subfield, and all or a part of a frequency domain resource indicated by the resource unit allocation subfield is located on a 160 MHz channel on which the MAC frame that carries the resource unit allocation subfield in the TRS control field is transmitted; and then parsing the downlink PPDU.

In a possible design, the method further includes: sending a response frame.

According to a seventh aspect, a communication apparatus is provided, including a processing unit and a communication unit. The processing unit is configured to generate a trigger frame, where the trigger frame includes a first user information field and one or more fourth user information fields; the fourth user information field includes a resource unit allocation subfield, and the resource unit allocation subfield indicates to allocate a frequency domain resource; a part or all of a frequency domain resource allocated by a resource unit allocation subfield in a fourth user information field before the first user information field is located on a primary 160 MHz channel, and a part or all of a frequency domain resource allocated by a resource unit allocation subfield in a fourth user information field after the first user information field is located on a secondary 160 MHz channel; and the fourth user information field is used to trigger a station to send a response frame. The communication unit is configured to send the trigger frame.

In a possible design, the communication unit is further configured to: receive an uplink MAC frame of one or more stations, where the MAC frame is sent on the frequency domain resource allocated by the resource unit allocation subfield in the fourth user information field; and then send an acknowledgement frame.

In a possible design, a value in an AID subfield in the first user information field is a first preset value, and the first preset value is any one of 2008 to 2044 or 2046 to 4095.

In a possible design, a user information field whose value in an AID subfield is 4095 includes a first indication field; if a value of the first indication field is a first value, the user information field whose value in an AID subfield is 4095 is a user information field used to fill the trigger frame; and if the value of the first indication field is a second value, the user information field whose AID subfield is 4095 is the first user information field.

In a possible design, the resource unit allocation subfield occupies eight bits, bits B1 to B7 in the eight bits jointly indicate the frequency domain resource used by the station, and a bit B0 in the eight bits indicates whether a part or all of the frequency domain resource allocated by the bits B1 to B7 is located on a primary 80 MHz channel or a secondary 80 MHz channel.

In a possible design, a quantity of bits occupied by the first user information field is the same as a quantity of bits occupied by a user information field corresponding to a second station.

In a possible design, the trigger frame includes a third user information field, the third user information field carries common information of a first station, and the first station supports an 802.11 standard after the 802.11ax standard.

In a possible design, the third user information field includes one or more of the following: (1) a first subfield, where the first subfield indicates an uplink bandwidth in combination with an uplink bandwidth subfield in a common information field of the trigger frame; (2) a second subfield, where the second subfield indicates a puncturing pattern; (3) a third subfield, where the third subfield indicates the first station transmits whether an HE PPDU or an EHT PPDU on one or more frequency segments in the uplink bandwidth; and (4) a fourth subfield, where the fourth subfield indicates a spatial reuse parameter supporting 320 MHz bandwidth transmission.

In a possible design, if the first subfield occupies one bit, that the first subfield indicates the uplink bandwidth in combination with the uplink bandwidth subfield in the common information field of the trigger frame includes the following cases: when a value of the uplink bandwidth subfield is 3 and a value of the first subfield is a fourth value, the uplink bandwidth is 160 MHz; and when the value of the uplink bandwidth subfield is 3 and the value of the first subfield is a fifth value, the uplink bandwidth is 320 MHz.

In a possible design, if the first subfield occupies two bits, that the first subfield indicates the uplink bandwidth in combination with the uplink bandwidth subfield in the common information field of the trigger frame includes the following cases: when a value of the uplink bandwidth subfield is 3 and a value of the first subfield is a sixth value, the uplink bandwidth is 160 MHz; when the value of the uplink bandwidth subfield is 3 and the value of the first subfield is a seventh value, the uplink bandwidth is 240 MHz; and when the value of the uplink bandwidth subfield is 3 and the value of the first subfield is an eighth value, the uplink bandwidth is 320 MHz.

In a possible design, a quantity of bits occupied by the common information field of the trigger frame is the same as a quantity of bits occupied by a common information field of a trigger frame in the 802.11ax standard.

According to an eighth aspect, a communication apparatus is provided, including a processing unit and a communication unit. The communication unit is configured to receive a trigger frame, where the trigger frame includes a first user information field and one or more fourth user information fields; the fourth user information field includes a resource unit allocation subfield, and the resource unit allocation subfield indicates to allocate a frequency domain resource; a part or all of a frequency domain resource allocated by a resource unit allocation subfield in a fourth user information field before the first user information field is located on a primary 160 MHz channel, and a part or all of a frequency domain resource allocated by a resource unit allocation subfield in a fourth user information field after the first user information field is located on a secondary 160 MHz channel; and the fourth user information field is used to trigger a station to send a response frame. The processing unit is configured to parse the trigger frame.

In a possible design, the communication unit is further configured to: send an uplink MAC frame, where the MAC frame is sent on the frequency domain resource allocated by the resource unit allocation subfield in the fourth user information field; and receive an acknowledgment frame.

In a possible design, a value in an AID subfield in the first user information field is a first preset value, and the first preset value is any one of 2008 to 2044 or 2046 to 4095.

In a possible design, a user information field whose value in an AID subfield is 4095 includes a first indication field; if a value of the first indication field is a first value, the user information field whose value in an AID subfield is 4095 is a user information field used to fill the trigger frame; and if the value of the first indication field is a second value, the user information field whose AID subfield is 4095 is the first user information field.

In a possible design, the resource unit allocation subfield occupies eight bits, bits B1 to B7 in the eight bits jointly indicate the frequency domain resource used by the station, and a bit B0 in the eight bits indicates whether a part or all of the frequency domain resource allocated by the bits B1 to B7 is located on a primary 80 MHz channel or a secondary 80 MHz channel.

In a possible design, a quantity of bits occupied by the first user information field is the same as a quantity of bits occupied by a user information field corresponding to a second station.

In a possible design, the trigger frame includes a third user information field, the third user information field carries common information of a first station, and the first station supports an 802.11 standard after the 802.11ax standard.

In a possible design, the third user information field includes one or more of the following: (1) a first subfield, where the first subfield indicates an uplink bandwidth in combination with an uplink bandwidth subfield in a common information field of the trigger frame; (2) a second subfield, where the second subfield indicates a puncturing pattern; (3) a third subfield, where the third subfield indicates the first station transmits whether an HE PPDU or an EHT PPDU on one or more frequency segments in the uplink bandwidth; and (4) a fourth subfield, where the fourth subfield indicates a spatial reuse parameter supporting 320 MHz bandwidth transmission.

In a possible design, if the first subfield occupies one bit, that the first subfield indicates the uplink bandwidth in combination with the uplink bandwidth subfield in the common information field of the trigger frame includes the following cases: when a value of the uplink bandwidth subfield is 3 and a value of the first subfield is a fourth value, the uplink bandwidth is 160 MHz; and when the value of the uplink bandwidth subfield is 3 and the value of the first subfield is a fifth value, the uplink bandwidth is 320 MHz.

In a possible design, if the first subfield occupies two bits, that the first subfield indicates the uplink bandwidth in combination with the uplink bandwidth subfield in the common information field of the trigger frame includes the following cases: when a value of the uplink bandwidth subfield is 3 and a value of the first subfield is a sixth value, the uplink bandwidth is 160 MHz; when the value of the uplink bandwidth subfield is 3 and the value of the first subfield is a seventh value, the uplink bandwidth is 240 MHz; and when the value of the uplink bandwidth subfield is 3 and the value of the first subfield is an eighth value, the uplink bandwidth is 320 MHz.

In a possible design, a quantity of bits occupied by the common information field of the trigger frame is the same as a quantity of bits occupied by a common information field of a trigger frame in the 802.11ax standard.

According to a ninth aspect, a communication apparatus is provided, including a processing unit and a communication unit. The processing unit is configured to generate a trigger frame, where the trigger frame includes a third user information field, the third user information field carries common information of a first station, and the first station supports an 802.11 standard after the 802.11ax standard. The communication unit is configured to send the trigger frame.

In a possible design, the communication unit is further configured to: receive an uplink MAC frame of one or more stations, where the MAC frame is sent on a frequency domain resource allocated by a resource unit allocation subfield in the fourth user information field; and then send an acknowledgement frame.

In a possible design, the third user information field includes one or more of the following: (1) a first subfield, where the first subfield indicates an uplink bandwidth in combination with an uplink bandwidth subfield in a common information field of the trigger frame; (2) a second subfield, where the second subfield indicates a puncturing pattern; (3) a third subfield, where the third subfield indicates the first station transmits whether an HE PPDU or an EHT PPDU on one or more frequency segments in the uplink bandwidth; and (4) a fourth subfield, where the fourth subfield indicates a spatial reuse parameter supporting 320 MHz bandwidth transmission.

In a possible design, if the first subfield occupies one bit, that the first subfield indicates the uplink bandwidth in combination with the uplink bandwidth subfield in the common information field of the trigger frame includes the following cases: when a value of the uplink bandwidth subfield is 3 and a value of the first subfield is a fourth value, the uplink bandwidth is 160 MHz; and when the value of the uplink bandwidth subfield is 3 and the value of the first subfield is a fifth value, the uplink bandwidth is 320 MHz.

In a possible design, if the first subfield occupies two bits, that the first subfield indicates the uplink bandwidth in combination with the uplink bandwidth subfield in the common information field of the trigger frame includes the following cases: when a value of the uplink bandwidth subfield is 3 and a value of the first subfield is a sixth value, the uplink bandwidth is 160 MHz; when the value of the uplink bandwidth subfield is 3 and the value of the first subfield is a seventh value, the uplink bandwidth is 240 MHz; and when the value of the uplink bandwidth subfield is 3 and the value of the first subfield is an eighth value, the uplink bandwidth is 320 MHz.

In a possible design, a quantity of bits occupied by the common information field of the trigger frame is the same as a quantity of bits occupied by a common information field of a trigger frame in the 802.11ax standard.

In a possible design, the trigger frame includes a first user information field and one or more fourth user information fields; the fourth user information field includes a resource unit allocation subfield, and the resource unit allocation subfield indicates to allocate a frequency domain resource; a part or all of a frequency domain resource allocated by a resource unit allocation subfield in a fourth user information field before the first user information field is located on a primary 160 MHz channel, and a part or all of a frequency domain resource allocated by a resource unit allocation subfield in a fourth user information field after the first user information field is located on a secondary 160 MHz channel; and the fourth user information field is used to trigger a station to send a response frame.

In a possible design, a value in an AID subfield in the first user information field is a first preset value, and the first preset value is any one of 2008 to 2044 or 2046 to 4095.

In a possible design, a user information field whose value in an AID subfield is 4095 includes a first indication field; if a value of the first indication field is a first value, the user information field whose value in an AID subfield is 4095 is a user information field used to fill the trigger frame; and if the value of the first indication field is a second value, the user information field whose AID subfield is 4095 is the first user information field.

In a possible design, the resource unit allocation subfield occupies eight bits, bits B1 to B7 in the eight bits jointly indicate the frequency domain resource used by the station, and a bit B0 in the eight bits indicates whether a part or all of the frequency domain resource allocated by the bits B1 to B7 is located on a primary 80 MHz channel or a secondary 80 MHz channel.

In a possible design, a quantity of bits occupied by the first user information field is the same as a quantity of bits occupied by a user information field corresponding to a second station.

According to a tenth aspect, a communication apparatus is provided, including a processing unit and a communication unit. The communication unit is configured to receive a trigger frame, where the trigger frame includes a third user information field, the third user information field carries common information of a first station, and the first station supports an 802.11 standard after the 802.11ax standard. The processing unit is configured to parse the trigger frame.

In a possible design, the communication unit is further configured to: send an uplink MAC frame, where the MAC frame is sent on a frequency domain resource allocated by a resource unit allocation subfield in the fourth user information field; and receive an acknowledgment frame.

In a possible design, the third user information field includes one or more of the following: (1) a first subfield, where the first subfield indicates an uplink bandwidth in combination with an uplink bandwidth subfield in a common information field of the trigger frame; (2) a second subfield, where the second subfield indicates a puncturing pattern; (3) a third subfield, where the third subfield indicates the first station transmits whether an HE PPDU or an EHT PPDU on one or more frequency segments in the uplink bandwidth; and (4) a fourth subfield, where the fourth subfield indicates a spatial reuse parameter supporting 320 MHz bandwidth transmission.

In a possible design, if the first subfield occupies one bit, that the first subfield indicates the uplink bandwidth in combination with the uplink bandwidth subfield in the common information field of the trigger frame includes the following cases: when a value of the uplink bandwidth subfield is 3 and a value of the first subfield is a fourth value, the uplink bandwidth is 160 MHz; and when the value of the uplink bandwidth subfield is 3 and the value of the first subfield is a fifth value, the uplink bandwidth is 320 MHz.

In a possible design, if the first subfield occupies two bits, that the first subfield indicates the uplink bandwidth in combination with the uplink bandwidth subfield in the common information field of the trigger frame includes the following cases: when a value of the uplink bandwidth subfield is 3 and a value of the first subfield is a sixth value, the uplink bandwidth is 160 MHz; when the value of the uplink bandwidth subfield is 3 and the value of the first subfield is a seventh value, the uplink bandwidth is 240 MHz; and when the value of the uplink bandwidth subfield is 3 and the value of the first subfield is an eighth value, the uplink bandwidth is 320 MHz.

In a possible design, a quantity of bits occupied by the common information field of the trigger frame is the same as a quantity of bits occupied by a common information field of a trigger frame in the 802.11ax standard.

In a possible design, the trigger frame includes a first user information field and one or more fourth user information fields; the fourth user information field includes a resource unit allocation subfield, and the resource unit allocation subfield indicates to allocate a frequency domain resource; a part or all of a frequency domain resource allocated by a resource unit allocation subfield in a fourth user information field before the first user information field is located on a primary 160 MHz channel, and a part or all of a frequency domain resource allocated by a resource unit allocation subfield in a fourth user information field after the first user information field is located on a secondary 160 MHz channel; and the fourth user information field is used to trigger a station to send a response frame.

In a possible design, a value in an AID subfield in the first user information field is a first preset value, and the first preset value is any one of 2008 to 2044 or 2046 to 4095.

In a possible design, a user information field whose value in an AID subfield is 4095 includes a first indication field; if a value of the first indication field is a first value, the user information field whose value in an AID subfield is 4095 is a user information field used to fill the trigger frame; and if the value of the first indication field is a second value, the user information field whose AID subfield is 4095 is the first user information field.

In a possible design, the resource unit allocation subfield occupies eight bits, bits B1 to B7 in the eight bits jointly indicate the frequency domain resource used by the station, and a bit B0 in the eight bits indicates whether a part or all of the frequency domain resource allocated by the bits B1 to B7 is located on a primary 80 MHz channel or a secondary 80 MHz channel.

In a possible design, a quantity of bits occupied by the first user information field is the same as a quantity of bits occupied by a user information field corresponding to a second station.

According to an eleventh aspect, a communication apparatus is provided, including a processing unit and a communication unit. The processing unit is configured to generate a downlink PPDU, where the downlink PPDU includes a MAC frame corresponding to one or more first stations; the MAC frame corresponding to the first station includes a TRS control field, the TRS control field includes a control information field, the control information field includes a resource unit allocation subfield, and all or a part of a frequency domain resource indicated by the resource unit allocation subfield is located on a 160 MHz channel on which the MAC frame that carries the resource unit allocation subfield in the TRS control field is transmitted. The communication unit is configured to send the downlink PPDU.

In a possible design, the communication unit is further configured to receive a response frame sent by one or more stations.

According to a twelfth aspect, a communication apparatus is provided, including a processing unit and a communication unit. The processing unit is configured to receive a downlink PPDU, where the downlink PPDU includes a MAC frame corresponding to one or more first stations; the MAC frame corresponding to the first station includes a TRS control field, the TRS control field includes a control information field, the control information field includes a resource unit allocation subfield, and all or a part of a frequency domain resource indicated by the resource unit allocation subfield is located on a 160 MHz channel on which the MAC frame that carries the resource unit allocation subfield in the TRS control field is transmitted. The processing unit is configured to parse the downlink PPDU.

In a possible design, the processing unit is further configured to send a response frame.

According to a thirteenth aspect, a communication apparatus is provided. The communication apparatus includes a processor and a communication interface, and the processor and the communication interface are configured to implement any method provided in any one of the first aspect to the sixth aspect. The processor is configured to perform a processing action in a corresponding method, and the communication interface is configured to execute a receiving/sending action in the corresponding method.

According to a fourteenth aspect, a computer-readable storage medium is provided. The computer-readable storage medium stores computer instructions, and when the computer instructions are run on a computer, the computer is enabled to perform any method provided in any one of the first aspect to the sixth aspect.

According to a fifteenth aspect, a computer program product including computer instructions is provided. When the computer instructions are run on a computer, the computer is enabled to perform any method provided in any one of the first aspect to the sixth aspect.

According to a sixteenth aspect, a chip is provided, including a processing circuit and a transceiver pin. The processing circuit and the transceiver pin are configured to implement any method provided in any one of the first aspect to the sixth aspect. The processing circuit is configured to perform a processing action in a corresponding method, and the transceiver pin is configured to perform a receiving/sending action in the corresponding method.

It should be noted that for a technical effect brought by any design in the seventh aspect to the sixteenth aspect, refer to a technical effect brought by a corresponding design in the first aspect to the sixth aspect. Details are not described herein again.

BRIEF DESCRIPTION OF THE DRAWINGS

FIG. 6 is a schematic diagram of a structure of a common information field of a trigger frame in the 802.11ax standard;

FIG. 7 is a schematic diagram of a structure of a user information field of a trigger frame in the 802.11ax standard;

FIG. 65 is a schematic diagram of a structure of an uplink multi-user PPDU according to an embodiment of this application;

FIG. 66 is a schematic diagram of a structure of a control information field in the 802.11ax standard;

FIG. 67 is a schematic flowchart of a communication method according to an embodiment of this application;

FIG. 68 is a schematic diagram of a structure of a communication apparatus according to an embodiment of this application;

DETAILED DESCRIPTION OF ILLUSTRATIVE EMBODIMENTS

Figure 1:
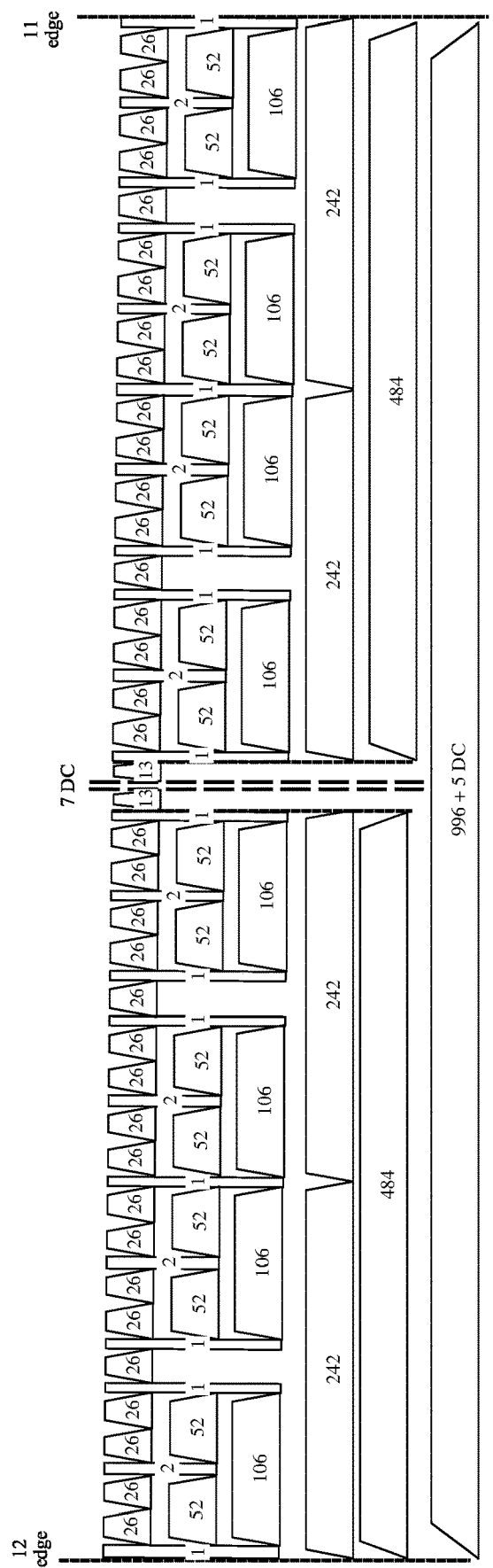
FIG. 1 is a schematic diagram of tone distribution in an 80 MHz frequency segment in the 802.11ax standard.

In descriptions of this application, unless otherwise specified, "/" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

In this application, the word such as "example" or "for example" is used to represent giving an example, an illustration, or a description. Any embodiment or design scheme described as an "example" or "for example" in this application should not be explained as having more advantages than another embodiment or design scheme. Exactly, use of the word "example", "for example", or the like is intended to present a relative concept in a specific manner.

Technical solutions provided in this application may be applicable to a WLAN scenario, and may be further applicable to an IEEE 802.11 system standard, for example, a next-generation 802.11be standard of the IEEE 802.11ax standard or a next-next-generation standard. Application scenarios of the technical solutions of this application include: communication between an access point (AP) and a station (STA), communication between APs, and communication between STAs, and the like.

STAs in this application may be various user terminals, user apparatuses, access apparatuses, subscriber stations, subscriber units, mobile stations, user agents, user devices, or other devices that have a wireless communication function. The user terminals may include various handheld devices, vehicle-mounted devices, wearable devices, computing devices that have the wireless communication function, or other processing devices connected to a wireless modem, and include various forms of user equipments (UEs), mobile stations (MSs), terminals, terminal devices, portable communication devices, handheld devices, portable computing devices, entertainment devices, game devices or systems, and global positioning system devices, or any other suitable device configured to perform network communication via wireless media. Herein, for ease of description, the devices mentioned above are collectively referred to as stations or STAs.

The access point AP in this application is an apparatus that is deployed in a wireless communication network and that provides a wireless communication function for a STA associated with the access point AP. The access point AP may be used as a hub of a communication system, and may be a communication device such as a base station, a router, a gateway, a repeater, a communication server, a switch, or a bridge. The base station may include various forms of macro base stations, micro base stations, relay stations, and the like. Herein, for ease of description, the devices mentioned above are collectively referred to as access points APs.

To facilitate understanding of the technical solutions in this application, the following first briefly describes terms in this application.

1. Abbreviations of the Terms in this Application

TABLE 1

| Acronyms and abbreviations | Full name/standard English term | term |
| --- | --- | --- |
| AC | access category | Access category |
| AP | Access Point | Access point |
| CRC | cyclic redundancy code | Cyclic redundancy code |
| CS | Carrier Sensing | Carrier sensing |
| DCM | Dual Coding Modulation | Dual-carrier modulation |
| FEC | forward error correction | Forward error correction |
| HE-SIG-A/B | High Efficient Signal Field A/B | High efficient signal field A/B |
| HE-STF | High Efficient Short Training Field | High efficient short training field |
| HE-LTF | High Efficient Long Training Field | High efficient long training field |
| ID | Identifier | Identifier |
| L-STF | Legacy Short Training Field | Legacy short training field |
| L-LTF | Legacy Long Training Field | Legacy long training field |
| L-SIG | Legacy Signal Field | Legacy signal field |
| MAC | Medium Access Control | Medium access control |
| MCS | Modulation and Coding Scheme | Modulation and coding scheme |
| MIMO | Multiple-Input Multiple-Output | Multiple-input multiple-output |
| MPDU | Medium access control (MAC) Protocol Data Unit | Media access control protocol data unit |
| MU | Multiple User | Multiple user |
| NG | Next Generation | Next generation |
| NSTS | Number of Spatial and Time Streams | Number of spatial and time streams |
| OFDM | Orthogonal Frequency Division Multiplexing | Orthogonal frequency division multiplexing |
| OFDMA | Orthogonal Frequency Division Multiple Access | Orthogonal frequency division multiple access |
| PHY | Physical | Physical |
| PPDU | PHY Protocol Data Unit | PHY protocol data unit |
| PSDU | PHY Service Data Unit | PHY service data unit |
| RU | Resource unit | Resource unit |
| STA | Station | Station |
| SS | Spatial Stream | Spatial stream |
| TB | Trigger Based | Trigger based |
| TID | Traffic Identifier | Traffic identifier |
| UL/DL | Uplink/Downlink | Uplink/Downlink |
| WLAN | Wireless Local Area Network | Wireless local access network |

2. 802.11 Standards

The WLAN starts from 802.11a/g, goes through 802.11n and 802.11ac, and goes through 802.11ax and 802.11be that are currently under discussion. For allowed transmission bandwidths and supported maximum data rates of 802.11a/g, 802.11n, 802.11ac, 802.11ax, and 802.11be, refer to Table 2.

6. Tone Distribution in an 80 MHz Frequency Segment in the 802.11ax Standard As shown in FIG. 1, the 80 MHz channel in the 802.11ax standard may support the 26-tone RU, the 52-tone RU, the 106-tone RU, the 242-tone RU, the 484-tone RU, and the 996-tone RU. Specifically, the 80 MHz channel may include one 996-tone RU. Alternatively, the 80 MHz channel may

TABLE 2

|  | 802.11a/g | 802.11n (HT) | 802.11ac (VHT) | 802.11ax (HE) | 802.11be (EHT) |
| --- | --- | --- | --- | --- | --- |
| Bandwidths | 20 MHz | 20/40 MHz | 20/40/80/160 MHz | 20/40/80/160 MHz | 20/40/80/160/ 240/320 MHz |
| Supported maximum data rates | 54 Mbps | 600 Mbps | 6.9 Gbps | 9.6 Gbps | Not lower than 30 Gbps |

The 802.11n standard is also referred to as high throughput (HT), the 802.11ac standard is referred to as very high throughput (VHT), 802.11ax (Wi-Fi 6) is referred to as HE, and 802.11be (Wi-Fi 7) is referred to as extremely high throughput (EHT). Standards before the HT such as 802.11a/b/g are collectively referred to as non-high throughput (Non-HT). In 802.11b, a non-orthogonal frequency division multiplexing (OFDM) mode is used. Therefore, 802.11b is not listed in Table 2.

3. Channel

The channel is a frequency domain resource. The channel may have another name, for example, a frequency band, a frequency segment, or a frequency domain. Embodiments of this application are not limited thereto. Currently, a WLAN system defines a plurality of channel bandwidth values, for example, 20 MHz, 40 MHz, 80 MHz, 160 MHz, and 320 MHz. For ease of description, a channel whose bandwidth value is x may be referred to as an x MHz channel for short. For example, a 320 MHz channel is a channel whose bandwidth value is 320 MHz.

A 320 MHz bandwidth and a 160 MHz bandwidth may further include discontinuous frequency segments. For example, a form of the 320 MHz bandwidth is a 160+160 MHz channel, and the 160+160 MHz channel is a channel including two discontinuous 160 MHz subchannels.

4. RU

The RU is a frequency domain resource. The RU includes one or more tones. Currently, the following types of RUs are defined in the WLAN system: 26-tone RU (that is, one RU includes 26 tones), 52-tone RU (that is, one RU includes 52 tones), 106-tone RU (that is, one RU includes 106 tones), 242-tone RU (that is, one RU includes 242 tones), 484-tone RU (that is, one RU includes 484 tones), 996-tone RU (that is, one RU includes 996 tones), 2×996-tone RU (that is, one RU includes 2×996 tones), 4×996-tone RU (that is, one RU includes 4×996 tones), and the like. Optionally, there may further be a 3×996-tone RU (that is, one RU includes 3×996 tones) in the WLAN system.

5. Tone

The tone is a frequency domain resource. The tone includes a null tone, a data and pilot tone, a guard tone, and a direct current tone.

include one or more 26-tone RUs, one or more 52-tone RUs, one or more 106-tone RUs, one or more 242-tone RUs, and/or one or more 484-tone RUs.

When FIG. 1 is vertically placed, the leftmost part of FIG. 1 may be considered as a lowest frequency, and the rightmost part of FIG. 1 may be considered as a highest frequency. 26-tone RUs on the 80 MHz channel may be respectively numbered from left to right to obtain an RU 1 to an RU 37. 52-tone RUs on the 80 MHz channel may also be respectively numbered from left to right to obtain an RU 1 to an RU 16. 106-tone RUs on the 80 MHz channel may also be respectively numbered from left to right to obtain an RU 1 to an RU 8. 242-tone RUs on the 80 MHz channel may also be respectively numbered from left to right to obtain an RU 1 to an RU 4. 484-tone RUs on the 80 MHz channel may also be respectively numbered from left to right to obtain an RU 1 and an RU 2. A 996-tone RU on the 80 MHz channel may also be numbered from left to right to obtain an RU 1. The foregoing numbers may alternatively be numbered in descending order of frequencies.

In addition, an 80+80 MHz/160 MHz channel in the 802.11ax standard may be considered as a combination of two 80 MHz channels.

7. Channel Distribution in a 160 MHz Bandwidth

Figure 3:
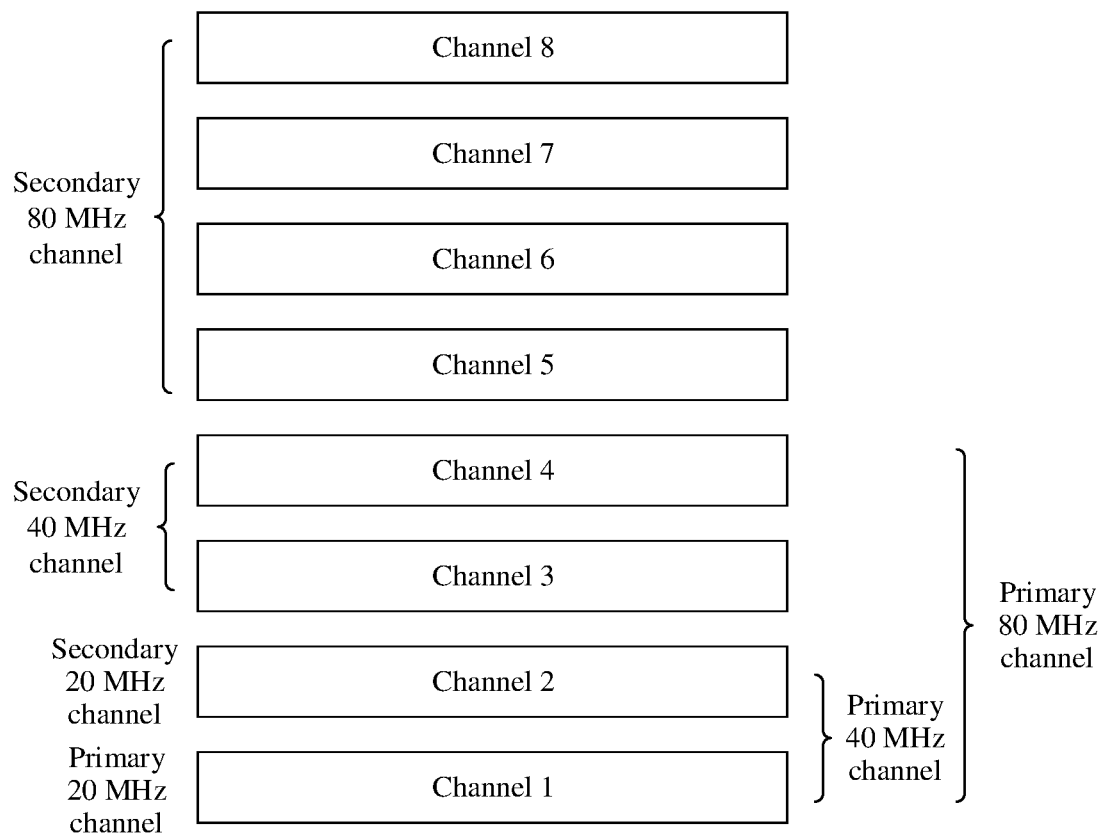
FIG. 3 is a schematic diagram of channel distribution in a 160 MHz bandwidth.

As shown in FIG. 3, the 160 MHz channel may be divided into eight 20 MHz channels. The eight 20 MHz channels may be sequentially numbered in descending order of frequencies, or may be sequentially numbered in ascending order of frequencies. In FIG. 3, a channel 1 may be used as a primary 20 MHz channel, and a channel 2 may be used as a secondary 20 MHz channel. The channel 1 and the channel 2 may be aggregated as a primary 40 MHz channel, a channel 3 and a channel 4 may be aggregated as a secondary 40 MHz channel. The channel 1 to the channel 4 may be aggregated as a primary 80 MHz channel, and a channel 5 to a channel 8 may be aggregated as a secondary 80 MHz channel.

It should be noted that the primary 20 MHz channel is not necessarily located at the beginning of 20 MHz. For example, the channel 3 may be used as a primary 20 MHz channel, the channel 4 may be used as a secondary 20 MHz channel, the channel 3 and the channel 4 may be aggregated as a primary 40 MHz channel, the channel 1 and the channel 2 may be aggregated as a secondary 40 MHz channel, the channel 1 to the channel 4 may be aggregated as a primary 80 MHz channel, and the channel 5 to the channel 8 may be aggregated as a secondary 80 MHz channel.

The secondary channel may alternatively have another name, for example, a subordinate or auxiliary channel. Embodiments of this application are not limited thereto.

8. First Station and Second Station

The first station supports an 802.11 standard after the 802.11ax standard. For example, the first station supports the 802.11be standard, or the first station supports a next-generation 802.11 standard of the 802.11be standard. It may be understood that the first station may be backward compatible with a previous standard protocol, for example, support the 802.11ax standard and an 802.11 standard before the 802.11ax standard.

The second station does not support the 802.11 standard after the 802.11ax standard. For example, the second station does not support the 802.11be standard. It may be understood that the second station may support the 802.11ax standard and the 802.11 standard before the 802.11ax standard.

The foregoing describes the terms used in embodiments of this application, and details are not described below again.

Figure 4:
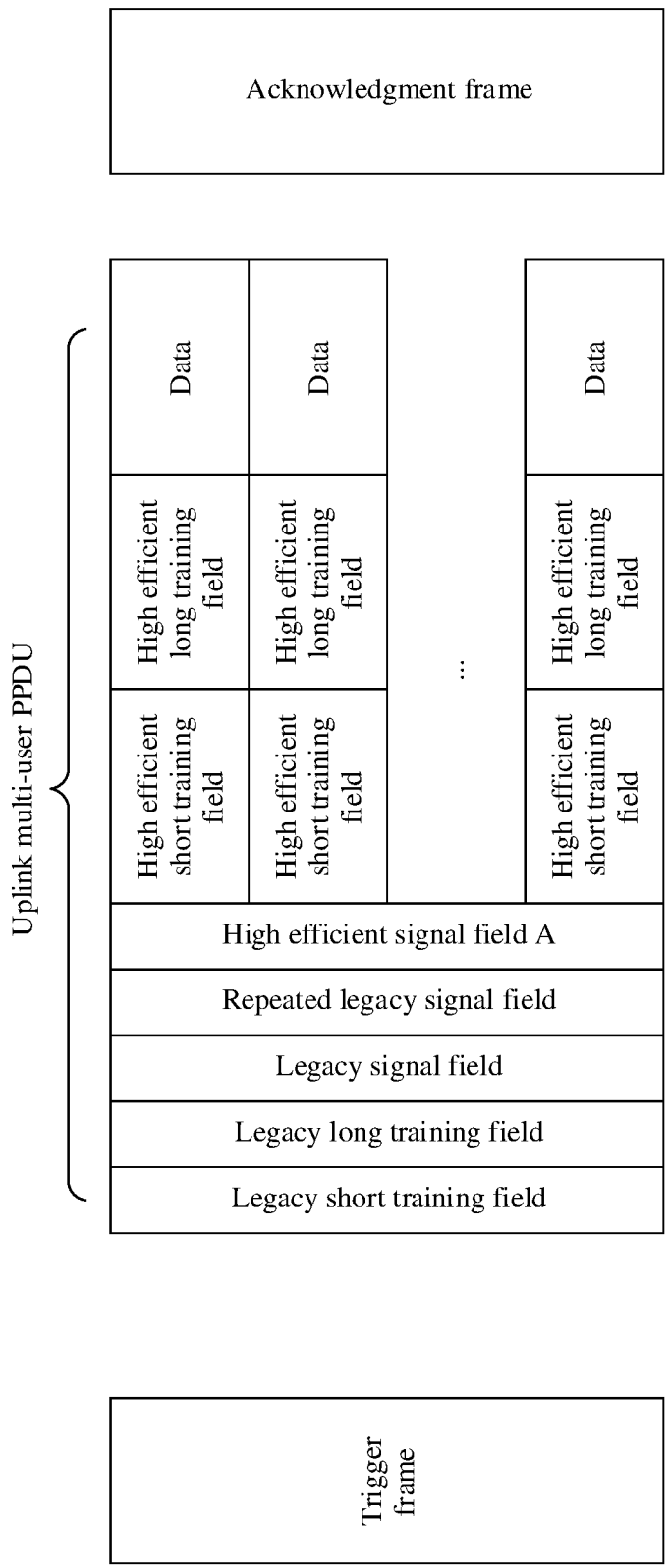
FIG. 4 is a flowchart of a trigger based scheduled uplink transmission method.

The 802.11ax standard introduces a trigger based scheduled uplink transmission method, and a procedure of the method is shown in FIG. 4.

First, an AP sends a trigger frame. The trigger frame includes resource scheduling information and another parameter that are used by one or more stations to send an uplink sub-PPDU.

A station receives the trigger frame, and parses, from the trigger frame, a user information field that matches an AID of the station. Then, the station sends an HE modulation part of a high efficient trigger based physical layer protocol data unit (HE TB PPDU) on an RU indicated by a resource unit allocation subfield in the user information field. The HE modulation part includes a high efficient short training field (HE-STF), a high efficient long training field (HE-LTF), and a data field. An encoding and modulation parameter of the data field is indicated by an MCS field in a corresponding user information field. As shown in FIG. 4, a common physical layer preamble of the high efficient trigger based physical layer protocol data unit is sent on one or more 20 MHz channels on which the RU indicated by the resource unit allocation subfield in the user information field is located. The common physical layer preamble includes a legacy short training field, a legacy long training field, a legacy signal field, a repeated legacy signal field, and a high efficient signal field A.

The AP receives an uplink multi-user PPDU, and the uplink multi-user PPDU includes uplink sub-PPDUs sent by the one or more stations. Then, the AP replies with an acknowledgment frame. The acknowledgment frame sent to the one or more stations may be sent in a form of downlink orthogonal frequency division multiple access (OFDMA), or may be sent in a non-HT replication transmission form.

Figure 5:
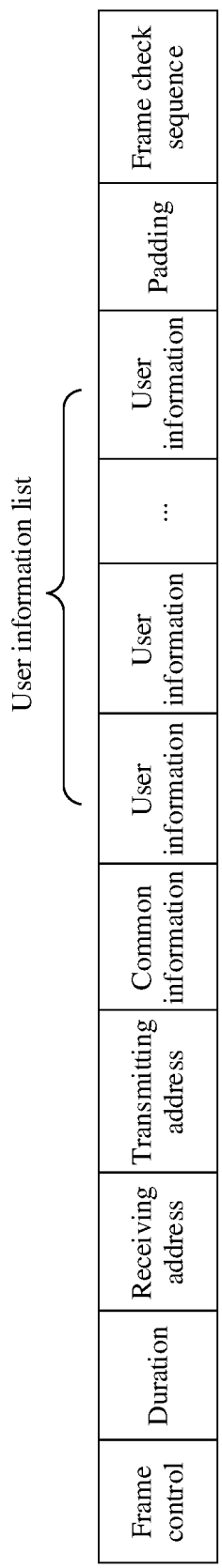
FIG. 5 is a schematic diagram of a frame format of a trigger frame in the 802.11ax standard.

FIG. 5 shows a frame format of a trigger frame in the 802.11ax standard. The trigger frame includes: a frame control field, a duration field, a receiving address (RA) field, a transmitting address (TA) field, a common information (common info) field, a user information list (user info list) field, a padding field, and a frame check sequence (FCS) field.

The common information field includes common information that needs to be read by all stations. As shown in FIG. 6, the common information field includes: a trigger type subfield, an uplink length (UL length) subfield, a more trigger frame (more TF) subfield, a carrier sensing required (CS required) subfield, an uplink bandwidth (UL bandwidth) subfield, a guard interval and HE long training field type (GI and HE-LTF type) subfield, and a MU-MIMO HE-LTF mode (MU-MIMO HE-LTF mode) subfield, a number of HE-LTF symbols and midamble periodicity (number of HE-LTF symbols and Midamble periodicity) subfield, an uplink space-time block coding (UL STBC) subfield, an LDPC extra symbol segment (LDPC extra symbol segment) subfield, an AP transmit power (AP TX power) subfield, a pre-FEC padding factor subfield, a packet extension disambiguity (PE disambiguity) subfield, an uplink spatial reuse (UL spatial reuse) subfield, a Doppler (Doppler) subfield, an uplink HE-SIG-A2 reserved (UL HE-SIG-A2 Reserved) subfield, a reserved subfield, and a trigger dependent Common info field.

The following briefly describes some fields in the common information field of the trigger frame.

1. Trigger Type Subfield in the Common Information Field

The trigger type subfield occupies four bits, and indicates a type of the trigger frame. In the conventional technology, for a correspondence between a value of the trigger type subfield and a type of the trigger frame, refer to Table 3.

TABLE 3

| Trigger type subfield value | Trigger frame variant |
| --- | --- |
| 0 | Basic (basic) |
| 1 | Beamforming report poll (Beamforming report poll, BFRP) |
| 2 | Multi-user block acknowledgment request (multi-user block ACK request, MU-BAR) |
| 3 | Multi-user request to send (MU-RTS) |
| 4 | Buffer status report poll (BSRP) |
| 5 | Group cast retransmission MU-BAR |
| 6 | Bandwidth query report poll (BQRP) |
| 7 | NDP feedback report poll (NFRP) |
| 8 to 15 | Reserved |

2. Uplink Bandwidth Subfield in the Common Information Field

The uplink bandwidth subfield occupies two bits, and indicates an uplink bandwidth. In the conventional technology, when a value of the uplink bandwidth subfield is 0, it indicates that the uplink bandwidth is 20 MHz; when the value of the uplink bandwidth subfield is 1, it indicates that the uplink bandwidth is 40 MHz; when the value of the uplink bandwidth subfield is 2, it indicates that the uplink bandwidth is 80 MHz; and when the value of the uplink bandwidth subfield is 3, it indicates that the uplink bandwidth is 160 MHz.

3. Number of HE-LTF Symbols and Midamble Periodicity Subfield and the Doppler Subfield in the Common Information Field The number of HE-LTF symbols and midamble periodicity subfield occupies three bits, and the Doppler subfield occupies one bit. The number of HE-LTF symbols and midamble periodicity subfield is used in combination with the Doppler subfield.

Specifically, when a value of the Doppler subfield is 0, the three bits in the number of HE-LTF symbols and midamble periodicity subfield indicate the number of HE-LTF symbols. Specifically, when a value of the number of HE-LTF symbols and midamble periodicity subfield is 0, it indicates that the number of HE-LTF symbols is 1; when the value of the number of HE-LTF symbols and midamble periodicity subfield is 1, it indicates that the number of HE-LTF symbols is 2; when the value of the number of HE-LTF symbols and midamble periodicity subfield is 2, it indicates that the number of HE-LTF symbols is 4; when the value of the number of HE-LTF symbols and midamble periodicity subfield is 3, it indicates that the number of HE-LTF symbols is 6; when the value of the number of HE-LTF symbols and midamble periodicity subfield is 4, it indicates that the number of HE-LTF symbols is 8; and another value of the number of HE-LTF symbols and midamble periodicity subfield is a reserved value.

When the value of the Doppler subfield is 1, first two bits in the number of HE-LTF symbols and midamble periodicity subfield indicate the number of HE-LTF symbols, and a third bit in the number of HE-LTF symbols and midamble periodicity subfield indicates a midamble periodicity. Specifically, when a value of the first two bits is 0, it indicates that the number of HE-LTF symbols is 1; when the value of the first two bits is 1, it indicates that the number of HE-LTF symbols is 2; when the value of the first two bits is 2, it indicates that the number of HE-LTF symbols is 4; and a value 3 of the first two bits is a reserved value. When a value of the third bit in the number of HE-LTF symbols and midamble periodicity subfield is 0, it indicates that the midamble periodicity is 10 symbols; and when the value of the third bit is 1, it indicates that the midamble periodicity is 20 symbols.

The foregoing describes the some fields in the common information field of the trigger frame in the 802.11ax standard, and details are not described below again.

The user information list field of the trigger frame may include a plurality of user information fields. In the 802.11ax standard, a structure of the user information field may be shown in FIG. 7. The user information field may include: an AID subfield, a resource unit (RU allocation) allocation subfield, an uplink forward error correction coding type (UL FEC coding type) subfield, an uplink modulation and coding scheme (UL HE-MCS) subfield, an uplink dual-carrier modulation (UL DCM) subfield, a spatial stream allocation/random access RU information (SS allocation/RA-RU information) subfield, an uplink target received signal strength indicator (UL target RSSI) subfield, a reserved (reserved) subfield, and a trigger dependent user info subfield.

The following briefly describes some fields in the user information field.

1. AID Subfield in the User Information Field

In the 802.11ax standard, for a value in the AID subfield and a meaning, refer to Table 4.

TABLE 4

| value of the AID subfield | Meaning |
| --- | --- |
| 0 | The user information field allocates one or more contiguous random access RUs for associated stations (user info field allocates one or more contiguous RA-RUs for associated STAs). |
| 1 to 2007 | The user information field is addressed to a station whose AID is equal to the value in the AID subfield. |
| 2008 to 2044 | Reserved |
| 2045 | The user information field allocates one or more contiguous random access RUs for associated stations (user info field allocates one or more contiguous RA-RUs for associated STAs). |
| 2046 | Unallocated RU |
| 2047 to 4094 | Reserved |
| 4095 | Start of a padding field |

In other words, in the 802.11ax standard, if a value in an AID subfield of a user information field is 0 or 2045, the user information field is used to allocate one or more contiguous random access RUs to a managed station. If a value in an AID subfield of a user information field is any value of 1 to 2007, the user information field is used to carry information that needs to be read by a station whose AID matches the value in the AID subfield. If a value in an AID subfield of a user information field is 2046, the user information field indicates an unallocated RU. If a value in an AID subfield of a user information field is 4095, the user information field is used as a padding field. In addition, in the 802.11ax standard, values 2008 to 2044 and 2047 to 4094 of the AID subfield are still reserved values, and are not defined.

The AID subfield may also be denoted as an AID12 subfield, and details are not described below again.

2. Resource Unit Allocation Subfield in the User Information Field

In the 802.11ax standard, the resource unit allocation subfield and the uplink bandwidth subfield in the common information field may jointly indicate a size and a location of an allocated RU. Sorting is performed from a least significant bit to a most significant bit, and eight bits in the resource unit allocation subfield may be numbered as bits B0 to B7. Specifically, for encoding of the bits B1 to B7 (that is, a second bit to an eighth bit) in the resource unit allocation subfield, refer to Table 5. For example, a second row in Table 5 is used as an example. Values 0 to 8 of the bits B1 to B7 correspond to 26-tone RU 1 to RU 9 respectively.

TABLE 5

| Value | Uplink bandwidth indicated by the uplink bandwidth subfield | RU tone size | Description |
| --- | --- | --- | --- |
| 0 to 8 | 20 MHz/40 MHz/80 MHz/80 + 80 MHz or 160 MHz | 26-tone | RU 1 to RU 9 respectively |
| 9 to 17 | 40 MHz/80 MHz/80 + 80 MHz or 160 MHz | | RU 10 to RU 18 respectively |
| 18 to 36 | 80 MHz/80 + 80 MHz or 160 MHz | | RU 19 to RU 37 respectively |
| 37 to 40 | 20 MHz/40 MHz/80 MHz/80 + 80 MHz or 160 MHz | 52-tone | RU 1 to RU 4 respectively |
| 41 to 44 | 40 MHz/80 MHz/80 + 80 MHz or 160 MHz | | RU 5 to RU 8 respectively |
| 45 to 52 | 80 MHz/80 + 80 MHz or 160 MHz | | RU 9 to RU 16 respectively |
| 53 and 54 | 20 MHz/40 MHz/80 MHz/80 + 80 MHz or 160 MHz | 106-tone | RU 1 and RU 2 respectively |
| 55 and 56 | 40 MHz/80 MHz/80 + 80 MHz or 160 MHz | | RU 3 and RU 4 respectively |
| 57 to 60 | 80 MHz/80 + 80 MHz or 160 MHz | | RU 5 to RU 8 respectively |
| 61 | 20 MHz/40 MHz/80 MHz/80 + 80 MHz or 160 MHz | 242-tone | RU 1 |
| 62 | 40 MHz/80 MHz/80 + 80 MHz or 160 MHz | | RU 2 |
| 63 and 64 | 80 MHz/80 + 80 MHz or 160 MHz | | RU 3 and RU 4 respectively |
| 65 | 40 MHz/80 MHz/80 + 80 MHz or 160 MHz | 484-tone | RU 1 |
| 66 | 80 MHz/80 + 80 MHz or 160 MHz | | RU 2 |

TABLE 5-continued

| Value | Uplink bandwidth indicated by the uplink bandwidth subfield | RU tone size | Description |
| --- | --- | --- | --- |
| 67 | 80 MHz/80 + 80 MHz or 160 MHz | 996-tone | RU 1 |
| 68 | 80 + 80 MHz or 160 MHz | 2x996-tone | RU 1 including two 996-tone RUs |
| Otherwise | Reserved | | |

Specific locations of various tone types and RUs with various numbers on an 80 MHz channel may be described above.

For example, if the uplink bandwidth indicated by the uplink bandwidth subfield is 80 MHz, and the values of the bits B1 to B7 are 0, it indicates that the 26-tone RU 1 on the 80 MHz channel is allocated.

In addition, the bit B0 (that is, a first bit) in the resource unit allocation subfield indicates an 80 MHz channel on which a resource unit allocated by the bits B1 to B7 is located. Specifically, when a value of the bit B0 is 0, it indicates that the resource unit allocated by the bits B1 to B7 is on a primary 80 MHz channel. When the value of the bit B0 is 1, it indicates that the resource unit allocated by the bits B1 to B7 is on a secondary 80 MHz channel. If the uplink bandwidth is less than or equal to 80 MHz, the bit B0 is set to 0 by default.

It should be noted that in OFDMA transmission in 802.11ax, the AP can allocate only one resource unit to the station for transmission.

3. Spatial Stream Allocation/Random Access RU Information Subfield in the User Information Field If the value in the AID subfield in the user information field is 0 or 2045, the spatial stream allocation/random access RU information subfield is actually used as a random access RU information subfield, and indicates random access RU information. If the value in the AID subfield in the user information field is not 0 or 2045, the spatial stream allocation/random access RU information subfield is actually used as a spatial stream allocation subfield, and is used to allocate a spatial stream.

In the 802.11ax standard, the spatial stream allocation subfield occupies six bits. The spatial stream allocation subfield includes a spatial stream start sequence number field and a number of spatial streams field. The spatial stream start sequence number field occupies three bits, and indicates a spatial stream start sequence number. The number of spatial streams field occupies three bits, and indicates the number of spatial streams.

The foregoing describes the some fields in the user information field in the 802.11ax standard, and details are not described below again.

A maximum transmission bandwidth supported by the 802.11ax standard is 160 MHz, and a maximum transmission bandwidth supported by the 802.11be standard is 320 MHz. The trigger frame in the 802.11ax standard cannot trigger the first station to perform uplink transmission in a larger bandwidth (for example, 240 MHz or 320 MHz). Therefore, this application provides a trigger frame, to trigger the first station to perform uplink transmission in the larger bandwidth. In addition, to support hybrid transmission performed by the first station and the second station, the trigger frame provided in this application can be compatible with the trigger frame in the 802.11ax standard to some extent.

With reference to a specific application scenario, the following specifically describes a frame format and a usage method of the trigger frame provided in this application.

Figure 8:
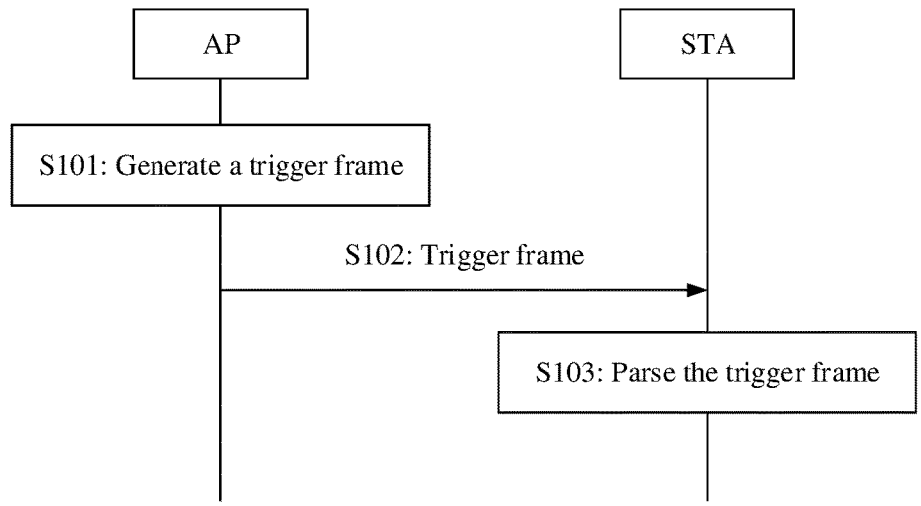
FIG. 8 is a schematic flowchart of a communication method according to an embodiment of this application.

FIG. 8 shows a communication method according to an embodiment of this application. The method includes the following steps.

S101: An AP generates a trigger frame.

Optionally, the trigger frame uses a type of a trigger frame in an existing 802.11ax standard. In other words, a value of a trigger type field in a common information field of the trigger frame is one of {0, 1, 2, 3, 4, 5, 6, 7}.

Optionally, the trigger frame mentioned in step S101 may alternatively be generated by a STA. Then, the STA sends the trigger frame to the AP, to trigger the AP to send a response frame.

In this embodiment of this application, to support compatibility with 802.11ax, a quantity of bits occupied by the common information field of the trigger frame provided in this application is the same as a quantity of bits occupied by a common information field of the trigger frame in the 802.11ax standard.

Figure 9:
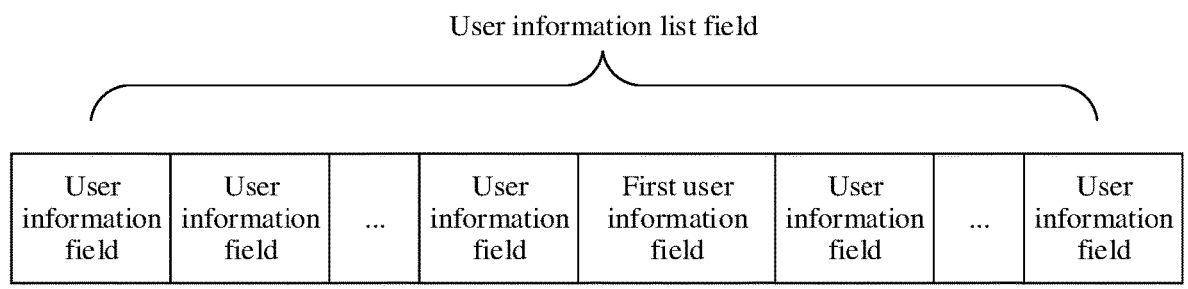
FIG. 9 is a schematic diagram of a structure of a user information list field according to an embodiment of this application.

Optionally, the trigger frame provided in this application may use one or more of the following implementations:

Implementation 1: As shown in FIG. 9, a user information list field of the trigger frame includes a first user information field and one or more fourth user information fields. The fourth user information field is used to trigger one station to send a response frame. The response frame may be a data frame, a management frame, or a control frame. A value in an AID subfield in the fourth user information field may be an AID of an associated station, or may be an AID (for example, 0) used by a plurality of associated stations to perform random contention, or may be an ADI (for example, 2045) used by a plurality of unassociated stations to perform random contention.

Optionally, the trigger frame further includes one or more of a user information field used for padding and/or a user information field used to indicate an unallocated resource unit.

If the fourth user information field is located before the first user information field, a part or all of a frequency domain resource indicated by a resource unit allocation subfield included in the fourth user information field is located on a first 160 MHz channel. If the fourth user information field is located after the first user information field, a part or all of the frequency domain resource indicated by the resource unit allocation subfield included in the fourth user information field is located on a second 160 MHz channel.

Optionally, one of the following designs may be used for the first 160 MHz channel and the second 160 MHz channel, and the first 160 MHz channel and the second 160 MHz channel are applied to all embodiments of this application:

Design 1: The first 160 MHz channel is a primary 160 MHz channel, and the second 160 MHz channel is a secondary 160 MHz channel.

Design 2: The first 160 MHz channel is a secondary 160 MHz channel, and the second 160 MHz channel is a primary 160 MHz channel.

Design 3: The first 160 MHz channel is a first 160 MHz channel in ascending order of frequencies in a 320 MHz bandwidth, and the second 160 MHz channel is a second 160 MHz channel in ascending order of frequencies in the 320 MHz bandwidth.

Design 4: The first 160 MHz channel is a first 160 MHz channel in descending order of frequencies in a 320 MHz bandwidth, and the second 160 MHz channel is a second 160 MHz channel in descending order of frequencies in the 320 MHz bandwidth.

The frequency domain resource may include one or more RUs. In this embodiment of this application, if the frequency domain resource includes a plurality of RUs, the frequency domain resource may also be referred to as a resource unit combination. Optionally, the resource unit combination may be a first resource unit combination, a second resource unit combination, a third resource unit combination, a fourth resource unit combination, a fifth resource unit combination, a sixth resource unit combination, a seventh resource unit combination, an eighth resource unit combination, or a ninth resource unit combination.

The first resource unit combination includes one 26-tone RU and one 52-tone RU in a 20 MHz bandwidth.

The second resource unit combination includes one 242-tone RU and one 484-tone RU in an 80 MHz bandwidth.

The third resource unit combination includes one 484-tone RU and one 996-tone RU in a 160 MHz bandwidth.

The fourth resource unit combination includes one 242-tone RU, one 484-tone RU, and one 996-tone RU in a 160 MHz bandwidth.

The fifth resource unit combination includes one 484-tone RU and two 996-tone RUs in a 240 MHz bandwidth.

The sixth resource unit combination includes two 996-tone RUs in a 240 MHz bandwidth.

The seventh resource unit combination includes one 484-tone RU and three 996-tone RUs in a 320 MHz bandwidth.

The eighth resource unit combination includes three 996-tone RUs in a 320 MHz bandwidth.

The ninth resource unit combination includes one 106-tone RU and one 26-tone RU in a 20 MHz bandwidth.

In this embodiment of this application, for ease of naming, the first resource unit combination and the ninth resource unit combination may be collectively referred to as small resource unit combinations, and the second resource unit combination to the eighth resource unit combination may be collectively referred to as large resource unit combinations.

It may be understood that, that a part or all of a frequency domain resource indicated by the resource unit allocation subfield is located on a first 160 MHz channel means: (1) If the frequency domain resource indicated by the resource unit allocation subfield is less than or equal to the 160 MHz bandwidth, all of the frequency domain resource indicated by the resource unit allocation subfield is located on the first 160 MHz channel; and (2) if a frequency domain resource span indicated by the resource unit allocation subfield is greater than the 160 MHz bandwidth, a part of the frequency domain resource indicated by the resource unit allocation subfield is located on the first 160 MHz channel. For example, the frequency domain resource includes a first 996-tone RU in primary 160 MHz and a 2×996-tone RU in secondary 160 MHz.

It may be understood that, that a part or all of the frequency domain resource indicated by the resource unit allocation subfield is located on a second 160 MHz channel means: (1) If the frequency domain resource indicated by the resource unit allocation subfield is less than or equal to the 160 MHz bandwidth, all of the frequency domain resource indicated by the resource unit allocation subfield is located on the second 160 MHz channel; and (2) if a frequency domain resource span indicated by the resource unit allocation subfield is greater than the 160 MHz bandwidth, a part of the frequency domain resource indicated by the resource unit allocation subfield is located on the second 160 MHz channel. For example, the frequency domain resource includes a first 996-tone RU in secondary 160 MHz and a 2×996-tone RU in primary 160 MHz.

Optionally, if the frequency domain resource span indicated by the resource unit allocation subfield in the user information field is greater than the 160 MHz bandwidth, it may be specified that the user information field can only be located before the first user information field; or it may be specified that the user information field can only be located after the first user information field; or it is not limited that the user information field is located before the first user information field or after the first user information field.

When the fourth user information field is a user information field corresponding to a first station, the fourth user information field may be parsed by the first station according to the 802.11be standard.

Optionally, the resource unit allocation subfield in the fourth user information field occupies eight bits. A bit B0 in the resource unit allocation subfield indicates an 80 MHz channel on which a resource unit allocated by bits B1 to B7 is located. Specifically, when a value of the bit B0 is 0, it indicates that a part or all of a frequency domain resource allocated by the bits B1 to B7 is on a first 80 MHz channel. When the value of the bit B0 is 1, it indicates that a part or all of the frequency domain resource allocated by the bits B1 to B7 is on a second 80 MHz channel.

In another implementation, the resource unit allocation subfield in the fourth user information field further includes another bit, for example, a reserved bit in FIG. 7, which is denoted as a bit BS. The bit indicates a 160 MHz channel on which the resource unit allocated by the bits B1 to B7 is located. Specifically, when a value of the bit BS is 0, it indicates that a part or all of the frequency domain resource allocated by the bits B1 to B7 is on the first 160 MHz channel. When the value of the bit BS is 1, it indicates that a part or all of the frequency domain resource allocated by the bits B1 to B7 is on the second 160 MHz channel. In this case, the first user information field does not exist, and the bits B1 to B7 and the bit BS that are occupied by the resource unit allocation subfield may indicate any resource unit or a resource unit combination in a maximum bandwidth of 320 MHz.

It should be noted that the resource unit allocation subfield designed in this application may be applied to a trigger frame for scheduling single-user transmission, and may be further applied to a trigger frame for full-bandwidth or full-bandwidth puncturing MU-MIMO transmission.

Optionally, the trigger frame provided in this application may not include the first user information field, but include the fourth user information field. Further, the trigger frame may further include a third user information field mentioned below.

Optionally, one of the following designs may be used for the first 80 MHz channel and the second 80 MHz channel, and the first 80 MHz channel and the second 80 MHz channel are applied to all embodiments of this application:

Design 1: The first 80 MHz channel is a primary 80 MHz channel, and the second 80 MHz channel is a secondary 80 MHz channel.

Design 2: The first 80 MHz channel is a secondary 80 MHz channel, and the second 80 MHz channel is a primary 80 MHz channel.

Design 3: The first 80 MHz channel is a first 80 MHz channel in ascending order of frequencies in a 160 MHz bandwidth, and the second 80 MHz channel is a second 80 MHz channel in ascending order of frequencies in the 160 MHz bandwidth.

Design 4: The first 80 MHz channel is a first 80 MHz channel in descending order of frequencies in a 160 MHz bandwidth, and the second 80 MHz channel is a second 80 MHz channel in descending order of frequencies in the 160 MHz bandwidth.

Figure 2:
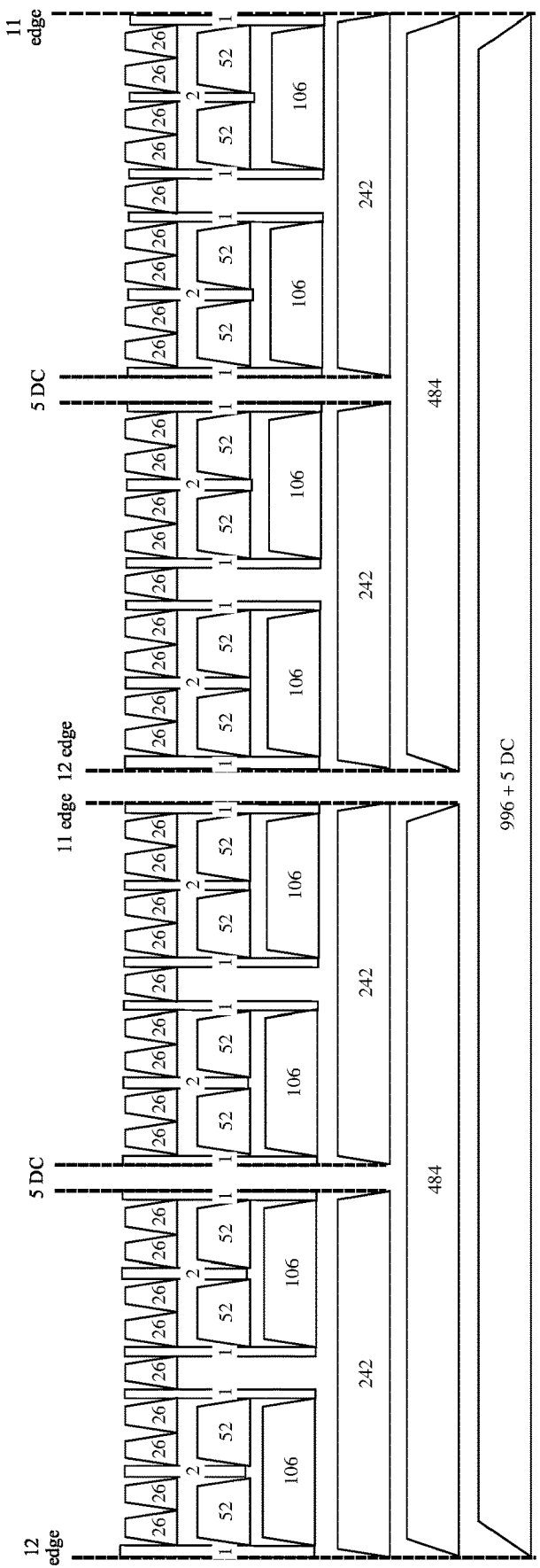
FIG. 2 is a schematic diagram of tone distribution in an 80 MHz frequency segment in the 802.11be standard.

Optionally, for encoding of the bits B1 to B7 of the resource unit allocation subfield, refer to Table 6. In Table 6, the first column indicates values of the bits B1 to B7, the second column indicates an uplink bandwidth, the third column indicates a bandwidth value of the frequency domain resource indicated by the bits B1 to B7, and the fourth column indicates numbers of the frequency domain resource indicated by the bits B1 to B7. It may be understood that Table 6 is merely an example, and encoding of the bits B1 to B7 in the resource unit allocation subfield may alternatively be implemented in another manner.

leftmost part of FIG. 2 may be considered as a lowest frequency, and the rightmost part of FIG. 2 may be considered as a highest frequency. 26-tone RUs on the 80 MHz channel may be respectively numbered from left to right to obtain an RU 1 to an RU 36. 52-tone RUs on the 80 MHz channel may also be respectively numbered from left to right to obtain an RU 1 to an RU 16. 106-tone RUs on the 80 MHz channel may also be respectively numbered from left to right to obtain an RU 1 to an RU 8. 242-tone RUs on the 80 MHz channel may also be respectively numbered from left to right to obtain an RU 1 to an RU 4. 484-tone RUs on the 80 MHz channel may also be respectively numbered from left to right to obtain an RU 1 and an RU 2. A 996-tone RU on the 80 MHz channel may also be numbered from left to right to obtain an RU 1. The foregoing numbers may alternatively be numbered in descending order of frequencies.

In this embodiment of this application, the 80 MHz channel may be divided into a first 20 MHz channel, a second 20 MHz channel, a third 20 MHz channel, and a fourth 20 MHz channel in ascending order of frequencies (or descending order of frequencies). A small resource unit

TABLE 6

| Value | Uplink bandwidth | RU tone size | Description |
| --- | --- | --- | --- |
| 0 to 8 | 20 MHz/40 MHz/80 MHz/80 + 80 MHz or 160 MHz/240 MHz or 160 + 80 MHz/320 MHz or 160 + 160 MHz | 26-tone | RU 1 to RU 9 respectively |
| 9 to 17 | 40 MHz/80 MHz/80 + 80 MHz or 160 MHz/240 MHz or 160 + 80 MHz/320 MHz or 160 + 160 MHz | | RU 10 to RU 18 respectively |
| 18 to 35 | 80 MHz/80 + 80 MHz or 160 MHz/240 MHz or 160 + 80 MHz/320 MHz or 160 + 160 MHz | | RU 19 to RU 36 respectively |
| 36 to 39 | 20 MHz/40 MHz/80 MHz/80 + 80 MHz or 160 MHz/240 MHz or 160 + 80 MHz/320 MHz or 160 + 160 MHz | 52-tone | RU 1 to RU 4 respectively |
| 40 to 43 | 40 MHz/80 MHz/80 + 80 MHz or 160 MHz/240 MHz or 160 + 80 MHz/320 MHz or 160 + 160 MHz | | RU 5 to RU 8 respectively |
| 44 to 51 | 80 MHz/80 + 80 MHz or 160 MHz/240 MHz or 160 + 80 MHz/320 MHz or 160 + 160 MHz | | RU 9 to RU 16 respectively |
| 52 and 53 | 20 MHz/40 MHz/80 MHz/80 + 80 MHz or 160 MHz/240 MHz or 160 + 80 MHz/320 MHz or 160 + 160 MHz | 106-tone | RU 1 and RU 2 respectively |
| 54 and 55 | 40 MHz/80 MHz/80 + 80 MHz or 160 MHz/240 MHz or 160 + 80 MHz/320 MHz or 160 + 160 MHz | | RU 3 and RU 4 respectively |
| 56 to 59 | 80 MHz/80 + 80 MHz or 160 MHz/240 MHz or 160 + 80 MHz/320 MHz or 160 + 160 MHz | | RU 5 to RU 8 respectively |
| 60 | 20 MHz/40 MHz/80 MHz/80 + 80 MHz or 160 MHz/240 MHz or 160 + 80 MHz/320 MHz or 160 + 160 MHz | 242-tone | RU 1 |
| 61 | 40 MHz/80 MHz/80 + 80 MHz or 160 MHz/240 MHz or 160 + 80 MHz/320 MHz or 160 + 160 MHz | | RU 2 |
| 62 and 63 | 80 MHz/80 + 80 MHz or 160 MHz/240 MHz or 160 + 80 MHz/320 MHz or 160 + 160 MHz | | RU 3 and RU 4 respectively |
| 64 | 40 MHz/80 MHz/80 + 80 MHz or 160 MHz/240 MHz or 160 + 80 MHz/320 MHz or 160 + 160 MHz | 484-tone | RU 1 |
| 65 | 80 MHz/80 + 80 MHz or 160 MHz/240 MHz or 160 + 80 MHz/320 MHz or 160 + 160 MHz | | RU 2 |
| 66 | 80 MHz/80 + 80 MHz or 160 MHz/240 MHz or 160 + 80 MHz/320 MHz or 160 + 160 MHz | 996-tone | RU 1 |
| 67 | 80 + 80 MHz or 160 MHz | 2x996-tone | RU 1 or a large resource unit combination in a 240 MHz bandwidth |
| 68 to 83 | | Small resource unit combination | 16 combinations |
| 84 to 119 | | Large resource unit combination | 36 combinations (excluding one large resource unit combination in the 240 MHz bandwidth) |
| 120 | 320 MHz or 160 + 160 MHz | 4x996-tone | RU 1 |
| Otherwise | Reserved | | |

Figure 10:
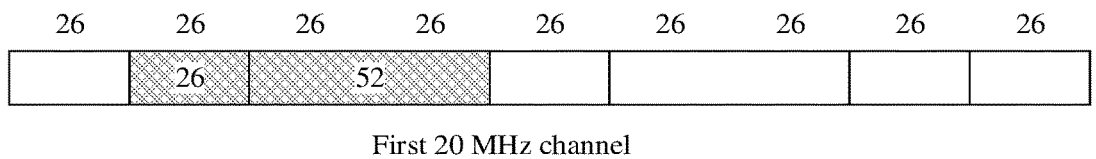
FIG. 10 to FIG. 25 are schematic diagrams of small resource unit combinations according to an embodiment of this application.
Figure 11:
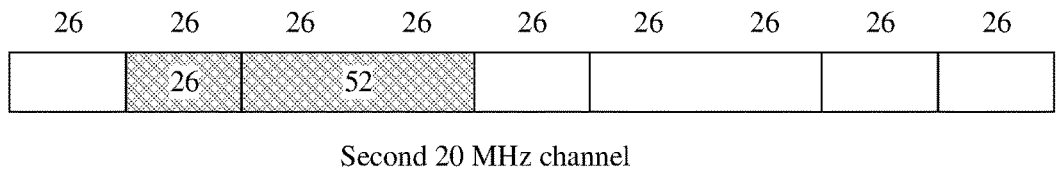
Figure 12:
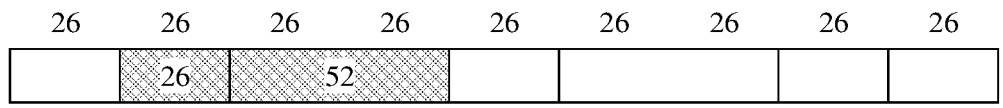
Figure 13:
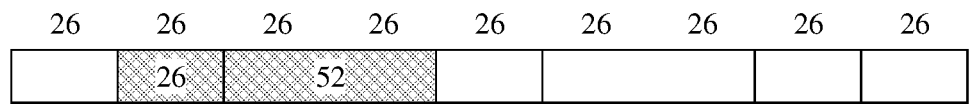
Figure 14:
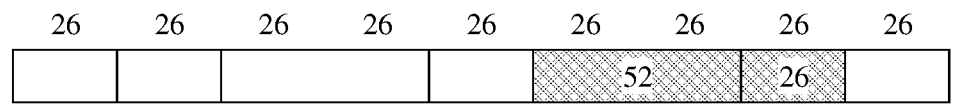
Figure 15:
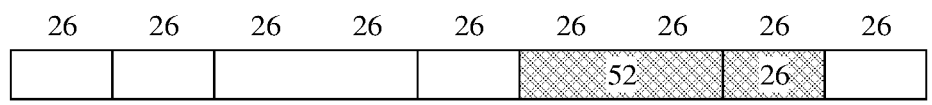
Figure 16:
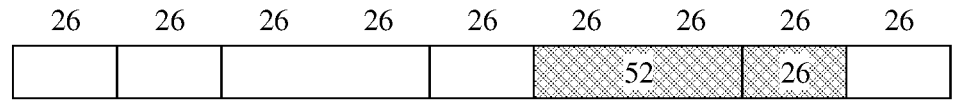
Figure 17:
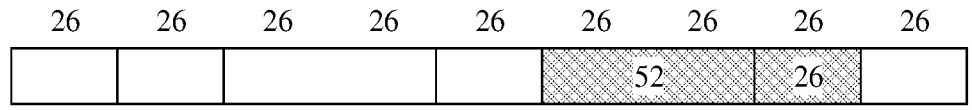

As shown in FIG. 2, an 80 MHz channel in the 802.11be standard may support a 26-tone RU, a 52-tone RU, a 106-tone RU, a 242-tone RU, a 484-tone RU, and a 996-tone RU. For example, when FIG. 2 is vertically placed, the combination allocated to one station in a 20 MHz frequency segment includes one 26-tone RU and one 52-tone RU. The small resource unit combination further includes one 106-tone RU and one 26-tone RU. For example, FIG. 10, FIG.

Figure 18:
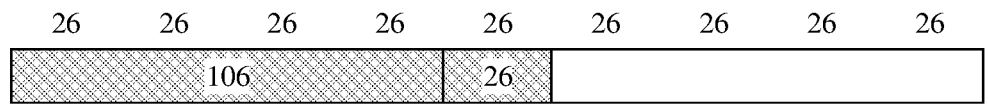
Figure 19:
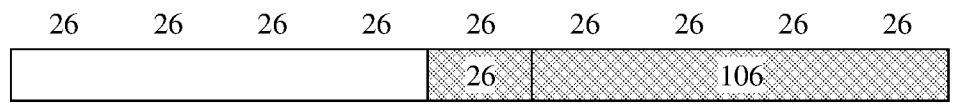
Figure 20:
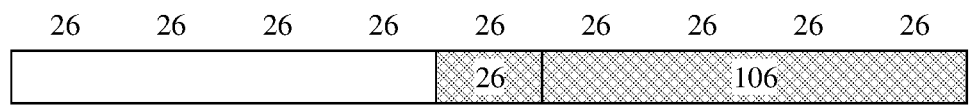
Figure 21:
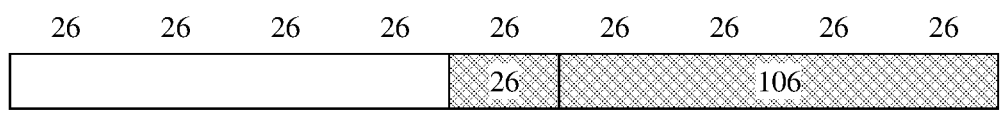
Figure 22:
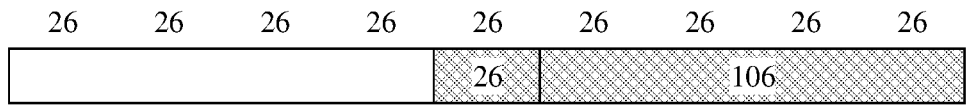
Figure 23:
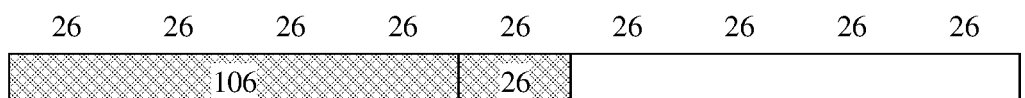
Figure 24:
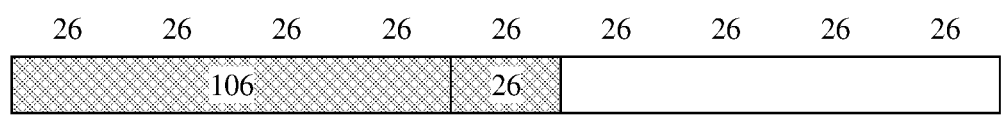
Figure 25:
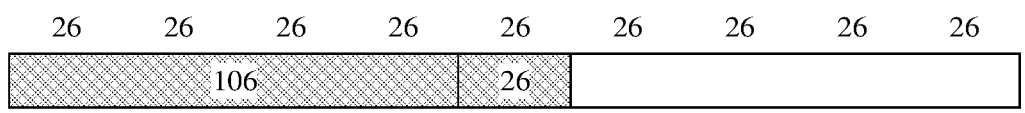
Figure 26:
FIG. 26 to FIG. 29 are schematic diagrams of large resource unit combinations in an 80 MHz bandwidth according to an embodiment of this application.
Figure 27:
Figure 28:
Figure 29:
Figure 30:
FIG. 30 to FIG. 41 are schematic diagrams of large resource unit combinations in a 160 MHz bandwidth according to an embodiment of this application.
Figure 31:
Figure 32:
Figure 33:
Figure 34:
Figure 35:
Figure 36:
Figure 37:
Figure 38:
Figure 39:
Figure 40:
Figure 41:
Figure 42:
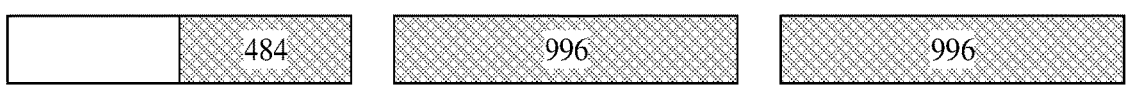
FIG. 42 to FIG. 50 are schematic diagrams of large resource unit combinations in a 240 MHz bandwidth according to an embodiment of this application.
Figure 43:
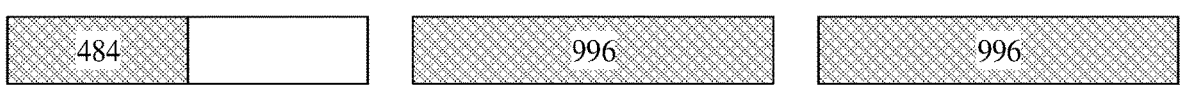
Figure 44:
Figure 45:
Figure 46:
Figure 47:

14, FIG. 18, and FIG. 22 show small resource unit combinations that may exist on the first 20 MHz channel; FIG. 11, FIG. 15, FIG. 19, and FIG. 23 show small resource unit combinations that may exist on the second 20 MHz channel; FIG. 12, FIG. 16, FIG. 20, and FIG. 24 show small resource unit combinations that may exist on the third 20 MHz channel; and FIG. 13, FIG. 17, FIG. 21, and FIG. 25 show small resource unit combinations that may exist on the fourth 20 MHz channel.

As shown in FIG. 26 to FIG. 29, a large resource unit combination allocated to one station in an 80 MHz frequency segment includes one 242-tone RU and one 484-tone RU.

Figure 48:
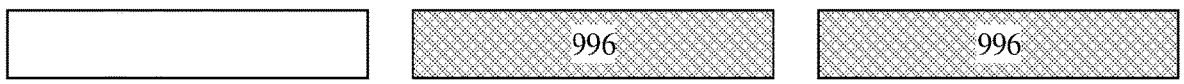
Figure 49:
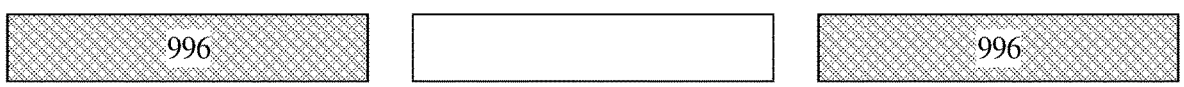
Figure 50:
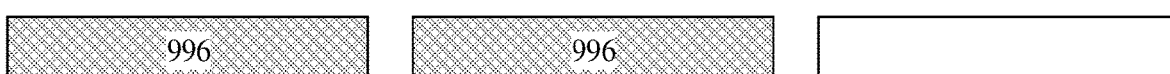
Figure 51:
FIG. 51 to FIG. 62 are schematic diagrams of large resource unit combinations in a 320 MHz bandwidth according to an embodiment of this application.
Figure 52:
Figure 53:
Figure 54:
Figure 55:
Figure 56:
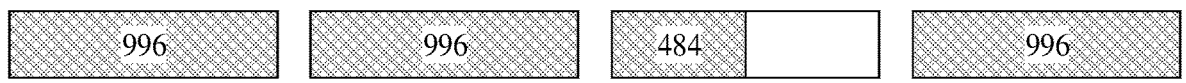
Figure 57:
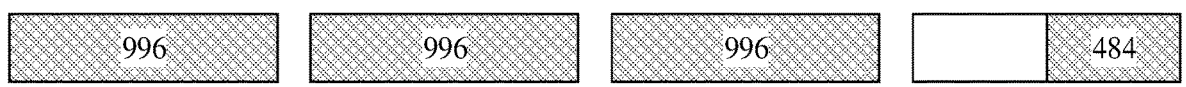
Figure 58:
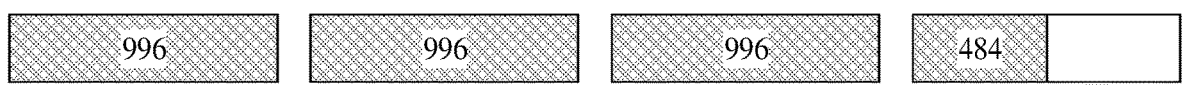
Figure 59:
Figure 60:
Figure 61:
Figure 62:
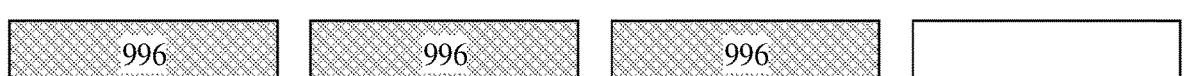

As shown in FIG. 30 to FIG. 33, a large resource unit combination allocated to one station in a 160 MHz frequency segment includes one 484-tone RU and one 996-tone RU. Alternatively, as shown in FIG. 34 to FIG. 41, a large resource unit combination allocated to one station in a 160 MHz frequency segment includes one 242-tone RU, one 484-tone RU, and one 996-tone RU. As shown in FIG. 42 to FIG. 47, a large resource unit combination allocated to one station in a 240 MHz frequency segment includes one 484-tone RU and two 996-tone RUs. Alternatively, as shown in FIG. 48 to FIG. 50, a large resource unit combination allocated to one station in a 240 MHz frequency segment includes two 996-tone RUs. Optionally, the two 996-tone RUs may be replaced with one 2×996-tone RU. Optionally, the 240 MHz frequency segment may be in the 320 MHz bandwidth.

As shown in FIG. 51 to FIG. 58, a large resource unit combination allocated to one station in a 320 MHz frequency segment includes one 484-tone RU and three 996-tone RUs. Alternatively, as shown in FIG. 59 to FIG. 62, a large resource unit combination allocated to one station in a 320 MHz frequency segment includes three 996-tone RUs. Optionally, the three 996-tone RUs may be replaced with one 3×996-tone RU. Alternatively, the three 996-tone RUs may be replaced with one 2×996-tone RU and one 996-tone RU.

The foregoing embodiment may alternatively be as follows:

As shown in FIG. 30 to FIG. 33, a large resource unit combination allocated to one station in a 160 MHz frequency segment includes one 484-tone RU and one 996-tone RU. A specific 160 MHz frequency segment may be indicated by using the bit BS in the resource unit allocation subfield. In this case, there are four 996+484 resource unit combinations in total, and 80 MHz in which a 484 resource unit of the 996+484 resource unit combination is located may be further indicated by using the bit B0 in the resource unit allocation subfield. In this case, B1 to B7 in the resource unit allocation subfield need to indicate only two 996+484 resource unit combinations, for example, FIG. 30 and FIG. 32, or FIG. 31 and FIG. 33.

As shown in FIG. 34 to FIG. 41, a large resource unit combination allocated to one station in a 160 MHz frequency segment includes one 242-tone RU, one 484-tone RU, and one 996-tone RU. A specific 160 MHz frequency segment may be indicated by using the bit BS in the resource unit allocation subfield. In this case, there are eight 996+484+242 resource unit combinations in total, and 80 MHz in which a 242 resource unit of the 996+484+242 resource unit combination is located may be further indicated by using the bit B0 in the resource unit allocation subfield. In this case, B1 to B7 in the resource unit allocation subfield need to indicate only four 996+484+242 resource unit combinations, for example, FIG. 34, FIG. 35, FIG. 36, and FIG. 37, or FIG. 38, FIG. 39, FIG. 40, or FIG. 41.

As shown in FIG. 51 to FIG. 58, a large resource unit combination allocated to one station in a 320 MHz frequency segment includes one 484-tone RU and three 996-tone RUs. In this case, there are eight 3×996+484 resource unit combinations in total, and 80 MHz in 320 MHz in which a 484 resource unit is located may be indicated by using BS and the bit B0 in the resource unit allocation subfield. In this case, B1 to B7 in the resource unit allocation subfield need to indicate only two 3×996+484 resource unit combinations, for example, FIG. 51 and FIG. 52, FIG. 53 and FIG. 54, FIG. 55 and FIG. 56, or FIG. 57 and FIG. 58.

As shown in FIG. 59 to FIG. 62, a large resource unit combination allocated to one station in a 320 MHz frequency segment includes three 996-tone RUs. In this case, there are four 3×996 resource unit combinations in total, and 80 MHz in 320 MHz in which a 996 resource unit is located may be indicated by using BS and the bit B0 in the resource unit allocation subfield. The 996 resource unit obtained through division based on a resource unit spectrum cannot form a 2×996 resource unit with another 996 resource unit. In this case, B1 to B7 in the resource unit allocation subfield need to indicate only one 3×996 resource unit combination, for example, FIG. 59, FIG. 60, FIG. 61, or FIG. 62.

As shown in FIG. 70 to FIG. 81, a large resource unit combination allocated to one station in a 320 MHz frequency segment includes two 996-tone RUs and one 484 resource unit. In this case, there are 12 2×996+484 resource unit combinations in total, and 80 MHz in 320 MHz in which a 484 resource unit in the resource unit combination is located may be indicated by using BS and the bit B0 in the resource unit allocation subfield. In this case, B1 to B7 in the resource unit allocation subfield need to indicate only four 2×996+484 resource unit combinations, for example, FIG. 70, FIG. 71, FIG. 76, and FIG. 77, or FIG. 72, FIG. 73, FIG. 78, and FIG. 79, or FIG. 74, FIG. 75, FIG. 78, and FIG. 79.

As shown in FIG. 10 to FIG. 17 and FIG. 82 to FIG. 85, a large resource unit combination provided for one station in an 80 MHz frequency segment includes one 52-tone RU and one 26-tone resource unit. In this case, there are 12 52+26 resource unit combinations in total. In this case, the 80 MHz frequency segment needs to be indicated by using BS and the bit B0 in the resource unit allocation subfield. Therefore, B1 to B7 in the resource unit allocation subfield need to indicate the 12 52+26 resource unit combinations.

As shown in FIG. 18 to FIG. 25, a large resource unit combination provided for one station in an 80 MHz frequency segment includes one 106-tone RU and one 26-tone resource unit. In this case, there are eight 106+26 resource unit combinations in total. In this case, the 80 MHz frequency segment needs to be indicated by using BS and the bit B0 in the resource unit allocation subfield. Therefore, B1 to B7 in the resource unit allocation subfield need to indicate the eight 106+26 resource unit combinations.

Further, in the foregoing method, B1 to B7 in the resource unit allocation subfield may be summarized into a 7-bit table (recorded as B7 to B1 in the table): For information indicated by B1 to B7, refer to the following descriptions.

The following further describes advantages of using a primary-secondary location indication method: Two bits in the primary-secondary location indication method are represented by BS and B0 herein (or may be represented by other letters, for example, B0 and B1 in the foregoing embodiment, which are merely examples herein), where B may be understood as a bit, and S may be understood as a 160 MHz segment. BS herein represents primary 160 MHz or secondary 160 MHz, B0 at P160 MHz represents primary 80 MHz and secondary 80 MHz, and B0 at S160 MHz represents 80 MHz with a lower frequency and 80 MHz with a higher frequency.

This embodiment of this application provides a design of a correspondence in Table 7(1). In Table 7(1), two bits indicate a correspondence between four primary-secondary cases (a, b, c, and d) of a location of primary 80 MHz in 320 MHz and 80 MHz in an absolute frequency indicated by the two bits. The absolute frequency herein is an absolute location of 80 MHz in the entire 320 MHz bandwidth. Case a is consistent with location distribution of the absolute frequency, that is, primary 80 MHz is at lowest 80 MHz of the absolute frequency. In Case b, primary 80 MHz is at secondary lowest 80 MHz of the absolute frequency. In Case c, primary 80 MHz is at secondary highest 80 MHz of the absolute frequency. In Case d, primary 80 MHz is at highest 80 MHz of the absolute frequency. In Table 7(1), each row indicates a value indicated by 80 MHz at an absolute frequency corresponding to four primary-secondary distribution cases. For example, in the first row, 00 at an absolute frequency corresponds to a0, b1, c2, and d2 (that is, a value 00 of Case a corresponds to an absolute location 00, a value 01 of Case b corresponds to the absolute location 00, a value 10 of Case c corresponds to the absolute location 00, and a value 10 of Case d corresponds to the absolute location 00). It should be noted that values of the two bits and meanings indicated by the two bits herein are merely examples. In specific implementation, there may be another correspondence, but there is a mapping relationship between a primary-secondary distribution case and a value indicated by 80 MHz at an absolute frequency.

In this way, when a receive device knows a case in which the receive device is, for example, Case c, when the received two bits indicate c3(11), c3 only needs to be corresponding to 01 in an absolute location, and then a finally allocated RU/MRU can be learned by querying Table 4 based on the 7-bit resource unit indication in the foregoing embodiment. It is equivalent to that the receive device has an operation of switching from a relative location to an absolute location. The receive device herein may be a non-AP STA.

Table 7(1) shows a correspondence between a primary-secondary indication and two bits indicated by the absolute frequency.

TABLE 7(1)

| Absolute Frequency (absolute frequency) | Case a in 320 MHz (Case a in 320 MHz) | Case b in 320 MHz (Case b in 320 MHz) | Case c in 320 MHz (Case c in 320 MHz) | Case d in 320 MHz (Case d in 320 MHz) |
|---|---|---|---|---|
| Lowest 80 MHz (00) | a0 (00, primary 80) | b1 (01, secondary 80) | c2 (10, $3^{rd}$ 80 MHz) | d2 (10, $3^{rd}$ 80 MHz) |
| Secondary lowest 80 MHz (01) | a1 (01, secondary 80) | b0 (00, primary 80) | c3 (11, $4^{th}$ 80 MHz) | d3 (11, $4^{th}$ 80 MHz) |
| Secondary highest 80 MHz (10) | a2 (10, $3^{rd}$ 80 MHz) | b2 (10, $3^{rd}$ 80 MHz) | c0 (00, primary 80) | d1 (01, secondary 80) |
| Highest 80 MHz (11) | a3 (11, $4^{th}$ 80 MHz) | b3 (11, $4^{th}$ 80 MHz) | c1 (01, secondary 80) | d0 (00, primary 80) |

Note: BS and B0 herein may indicate 80 MHz in which a smallest RU in the MRU or RU is located, and the primary/secondary location indication method is used. For example, 3×996 is formed by 2×996+996, and herein a location of 80 MHz in which 996 is located may be indicated. For another example, 3×996+484 may indicate a location of 80 MHz in which 484 is located.

This embodiment of this application further provides specific indications of B1 to B7. For details, refer to Table 7(2) below.

TABLE 7(2)

| BS: P/S 160 MHz (BS: primary/secondary 160 MHz) | RU allocation subfield (resource unit allocation subfield) B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (RU index 11be) | Description |
|---|---|---|---|---|---|---|
| | 0 to 3: 80 MHz segment where the RU is located (indicate 80 MHz where the RU is located) | 0 to 8 | 20 MHz, 40 MHz, 80 MHz, 160 MHz, or 320 MHz | 26 | RU 1 to RU 9 | 26 Tone RU: 11ax: RU 1 . . . 37, RU 19 is the DC RU in 80 MHz (11ax: RU 1 . . . 37, RU 19 is the DC RU in 80 MHz) 11be: RU 1 . . . 18 for lower 40 MHz and 20 to 37 in upper 40 MHz. RU 19 |
| | | 9 to 17 | 40 MHz, 80 MHz, 160 MHz, or 320 MHz | | RU 10 to RU 18 | |

TABLE 7(2)-continued

| BS: P/S 160 MHz (BS: primary/ secondary 160 MHz) | RU allocation subfield (resource unit allocation subfield) B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (RU index 11be) | Description |
|---|---|---|---|---|---|---|
| | | 18 | 80 MHz, 160 MHz, or 320 MHz | | not defined (not defined) | does not exist. (11be: RU1-18 for lower 40 MHz and RU20-37 in upper 40 MHz. RU 19 does not exist or is not defined) (DC RU indicates a direct current RU) |
| | | 19 to 36 | 80 MHz, 160 MHz, or 320 MHz | | RU 20 to RU 37 | |
| | | 37 to 40 | 20 MHz, 40 MHz, 80 MHz, 160 MHz, or 320 MHz | 52 | RU 1 to RU 4 | Same numbering for 11ax and 11be (same numbering for 11ax and 11be) |
| | | 41 to 44 | 40 MHz, 80 MHz, 160 MHz, or 320 MHz | | RU 5 to RU 8 | |
| | | 45 to 52 | 80 MHz, 160 MHz, or 320 MHz | | RU 9 to RU 16 | |
| | | 53 and 54 | 20 MHz, 40 MHz, 80 MHz, 160 MHz, or 320 MHz | 106 | RU 1 and RU 2 | |
| | | 55 and 56 | 40 MHz, 80 MHz, 160 MHz, or 320 MHz | | RU 3 and RU 4 | |
| | | 57 to 60 | 80 MHz, 160 MHz, or 320 MHz | | RU 5 to RU 8 | |
| | | 61 | 20 MHz, 40 MHz, 80 MHz, 160 MHz, or 320 MHz | 242 | RU 1 | |
| | | 62 | 40 MHz, 80 MHz, 160 MHz, or 320 MHz | | RU 2 | |
| | | 63 and 64 | 80 MHz, 160 MHz, or 320 MHz | | RU 3 and RU 4 | |
| | | 65 | 40 MHz, 80 MHz, 160 MHz, or 320 MHz | 484 | RU 1 | |
| | | 66 | 80 MHz, 160 MHz, or 320 MHz | | RU 2 | |
| | | 67 | 80 MHz, 160 MHz, or 320 MHz | 996 | RU 1 | |

TABLE 7(2)-continued

| BS: P/S 160 MHz (BS: primary/ secondary 160 MHz) | RU allocation subfield (resource unit allocation subfield) B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (RU index 11be) | Description |
|---|---|---|---|---|---|---|
| BS | 0 | 68 | | reserved | | |
| | 1 | | 160 MHz or 320 MHz | 2x996 | RU 1 | |
| a0 or b1 or c2 or d2 a1 or b0 or c3 or d3 a2 or b2 or c0 or d1 a3 or b3 or c1 or d0 0 to 3: 80 MHz segment where the RU is located (indicate 80 MHz where the RU is located) | | 69 | | reserved | | reserved |
| | | | 320 MHz | 4x996 | RU 1 | RU 1 |
| | | 70 to 72 | 20 MHz, 40 MHz, 80 MHz, 160 MHz, or 320 MHz | RU 52 + RU 26 | MRU 1 to MRU 3 | MRU 1: RU 2 (26T) + RU 2 (52T) reserved for BW >= 80 MHz MRU 2: RU 5 (26T) + RU 2 (52T) MRU 3: RU 8 (26T) + RU 3 (52T) |
| | | 73 to 75 | 40 MHz, 80 MHz, 160 MHz, or 320 MHz | | MRU 4 to MRU 6 | MRU 4: RU 11 (26T) + RU 6 (52T) MRU 5: RU 14 (26T) + RU 6 (52T) MRU 6: RU 17 (26T) + RU 7 (52T) reserved for BW >= 80 MHz |
| | | 76 to 81 | 80 MHz, 160 MHz, or 320 MHz | | MRU 7 to MRU 12 | MRU 7: RU 21 (26T) + RU 10 (52T) reserved MRU 8: RU 24 (26T) + RU 10 (52T) MRU 9: RU 27 (26T) + RU 11 (52T) MRU 10: RU 30 (26T) + RU 14 (52T) MRU 11: RU 33 (26T) + RU 14 (52T) MRU 12: RU 36 (26T) + RU 15 (52T) reserved |
| | | 82 and 83 | 20 MHz, 40 MHz, 80 MHz, 160 MHz, or 320 MHz | RU 106 + RU 26 | MRU 1 and MRU 2 | MRU 1: RU 5 (26T) + RU 1 (106T) MRU 2: RU 5 (26T) + RU 2 (106T) reserved for BW >= 80 MHz |
| | | 84 and 85 | 40 MHz, 80 MHz, 160 MHz, or 320 MHz | | MRU 3 and MRU 4 | MRU 3: RU 14 (26T) + RU 3 (106T) reserved for BW >= 80 MHz MRU 4: RU 14 (26T) + RU 4 (106T) |
| | | 86 to 89 | 80 MHz, 160 MHz, or 320 MHz | | MRU 5 to MRU 8 | MRU 5: RU 24 (26T) + RU 5 (106T) MRU 6: RU 24 (26T) + RU 6 (106T) reserved MRU 7: RU 33 (26T) + RU 7 (106T) reserved MRU 8: RU 33 (26T) + RU 8 (106T) |

TABLE 7(2)-continued

| BS: P/S 160 MHz (BS: primary/secondary 160 MHz) | RU allocation subfield (resource unit allocation subfield) B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (RU index 11be) | Description |
|---|---|---|---|---|---|---|
| | | 90 to 93 | 80 MHz, 160 MHz, or 320 MHz | RU 484 + RU 242 | MRU 1 to MRU 4 | MRU 1: RU 2 (242T) + RU 2 (484T) <br> MRU 2: RU 1 (242T) + RU 2 (484T) <br> MRU 3: RU 4 (242T) + RU 1 (484T) <br> MRU 4: RU 3 (242T) + RU 1 (484T) |
| a0 or b1 or c2 or d2 or a2 or b2 or c0 or d1 | | 94 and 95 | 160 MHz or 320 MHz | RU 996 + RU 484 | MRU 1 and MRU 2 | MRU 1: RU 2 (484T) + RU 2 (996T) <br> MRU 2: RU 1 (484T) + RU 2 (996T) |
| a1 or b0 or c3 or d3 or a3 or b3 or c1 or d0 | | | | | MRU 3 and MRU 4 | MRU 3: RU 4 (484T) + RU 1 (996T) <br> MRU 4: RU 3 (484T) + RU 1 (996T) |
| a0 or b1 or c2 or d2 or a2 or b2 or c0 or d1 | | 96 to 99 | 160 MHz or 320 MHz | RU 996 + RU 484 + RU 242 | MRU 1 to MRU 4 | MRU 1: RU 2 (242T) + RU 2 (484T) + RU 2 (996T) <br> MRU 2: RU 1 (242T) + RU 2 (484T) + RU 2 (996T) <br> MRU 3: RU 4 (242T) + RU 1 (484T) + RU 2 (996T) <br> MRU 4: RU 3 (242T) + RU 1 (484T) + RU 2 (996T) |
| a1 or b0 or c3 or d3 or a3 or b3 or c1 or d0 | | | | | MRU 5 to MRU 8 | MRU 5: RU 6 (242T) + RU 4 (484T) + RU 1 (996T) <br> MRU 6: RU 5 (242T) + RU 4 (484T) + RU 1 (996T) <br> MRU 7: RU 8 (242T) + RU 3 (484T) + RU 1 (996T) <br> MRU 8: RU 7 (242T) + RU 3 (484T) + RU 1 (996T) |
| a0 or b1 or c2 or d2 | | 100 to 103 | 320 MHz | RU 2x996 + RU 484 | MRU 1 and MRU 2 | MRU 1: RU 2 (484T) + RU 2 (996T) + RU 3 (996T) <br> MRU 2: RU 1 (484T) + RU 2 (996T) + RU 3 (996T) <br> 2 reserved entries for B7:B1 = 102, 103 |

TABLE 7(2)-continued

| BS: P/S 160 MHz (BS: primary/secondary 160 MHz) | B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (RU index 11be) | Description |
|---|---|---|---|---|---|---|
| a1 or b0 or c3 or d3 | | | | | MRU 3 to MRU 6 | MRU 3: RU 4 (484T) + RU 1 (996T) + RU 3 (996T)<br>MRU 4: RU 3 (484T) + RU 1 (996T) + RU 3 (996T)<br>MRU 5: RU 4 (484T) + RU 3 (996T) + RU 4 (996T)<br>MRU 6: RU 3 (484T) + RU 3 (996T) + RU 4 (996T) |
| a2 or b2 or c0 or d1 | | | | | MRU 7 to MRU 10 | MRU 7: RU 6 (484T) + RU 1 (996T) + RU 2 (996T)<br>MRU 8: RU 5 (484T) + RU 1 (996T) + RU 2 (996T)<br>MRU 9: RU 6 (484T) + RU 2 (996T) + RU 4 (996T)<br>MRU 10: RU 5 (484T) + RU 2 (996T) + RU 4 (996T) |
| a3 or b3 or c1 or d0 | | | | | MRU 11 and MRU 12 | 2 reserved entries for B7:B1 = 100, 101<br>MRU 11: RU 8 (484T) + RU 2 (996T) + RU 3 (996T)<br>MRU 12: RU 7 (484T) + RU 2 (996T) + RU 3 (996T) |
| a0 or b1 or c2 or d2 | | 104 | 320 MHz | RU 3×996 | reserved MRU 2 | MRU 2: RU 1 (996T) + RU 2 (2×996T) |
| a1 or b0 or c3 or d3 | | | | | MRU 1 | MRU 1: RU 2 (996T) + RU 2 (2×996T) |
| a2 or b2 or c0 or d1 | | | | | MRU 4 | MRU 4: RU 3 (996T) + RU 1 (2×996T) |
| a3 or b3 or c1 or d0 | | | | | MRU 3 | MRU 3: RU 4 (996T) + RU 1 (2×996T) |
| a0 or b1 or c2 or d2 | | 105 and 106 | 320 MHz | RU 3×996 + RU 484 | reserved MRU 1 and MRU 2 | MRU 1: RU 2 (484T) + RU 2 (996T) + RU 2 (2×996T)<br>MRU 2: RU 1 (484T) + RU 2 (996T) + RU 2 (2×996T) |
| a1 or b0 or c3 or d3 | | | | | MRU 3 and MRU 4 | MRU 3: RU 4 (484T) + RU 1 (996T) + RU 2 (2×996T) |

TABLE 7(2)-continued

| BS: P/S 160 MHz (BS: primary/secondary 160 MHz) | B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (RU index 11be) | Description |
|---|---|---|---|---|---|---|
| a2 or b2 or c0 or d1 | | | | | MRU 5 and MRU 6 | MRU 4: RU 3 (484T) + RU 1 (996T) + RU 2 (2x996T) <br> MRU 5: RU 6 (484T) + RU 4 (996T) + RU 1 (2x996T) <br> MRU 6: RU 5 (484T) + RU 4 (996T) + RU 1 (2x996T) |
| a3 or b3 or c1 or d0 | | | | | MRU 7 and MRU 8 | MRU 7: RU 8 (484T) + RU 3 (996T) + RU 1 (2x996T) <br> MRU 8: RU 7 (484T) + RU 3 (996T) + RU 1 (2x996T) |
| | | 107 to 127 | | | reserved | |

Optionally, the foregoing Table 7(2) may be designed as four tables. Based on the correspondence in the foregoing Table 7(1), Table 7(2) may alternatively be split into the following four tables: Table 7(2a), Table 7(2b), Table 7(2c), and Table 7(2d), that is, a table including only Case a, Case b, Case c, or Case d. One table does not need to involve BS and B0 indications of other cases.

When the table includes Case a, the following Table 7(2a) is read:

TABLE 7(2a)

| BS: P/S 160 MHz (BS: primary/secondary 160 MHz) | B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (resource unit index 11be) | Description |
|---|---|---|---|---|---|---|
| | 0 to 3: 80 MHz segment where the RU is located (indicate 80 MHz where the RU is located) | 0 to 8 | 20 MHz, 40 MHz, 80 MHz, 160 MHz, or 320 MHz | 26 | RU 1 to RU 9 | 26 Tone RU: 11ax: 1 . . . 37, RU 19 is the DC RU in 80 MHz (11ax: RU 1 . . . 37, RU 19 is the DC RU in 80 MHz) |
| | | 9 to 17 | 40 MHz, 80 MHz, 160 MHz, or 320 MHz | | RU 10 to RU 18 | 11be: 1 . . . 18 for lower 40 MHz and 20 to 37 in upper 40 MHz. RU 19 does not exist. (11be: RU |
| | | 18 | 80 MHz, 160 MHz, or 320 MHz | not defined (not defined) | | 1 . . . 18 for lower 40 MHz and 20 to 37 in upper 40 MHz. RU 19 does not exist or |

TABLE 7(2a)-continued

| BS: P/S 160 MHz (BS: primary/ secondary 160 MHz) | RU allocation subfield (resource unit allocation subfield) B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (resource unit index 11be) | Description |
|---|---|---|---|---|---|---|
| | | 19 to 36 | 80 MHz, 160 MHz, or 320 MHz | | RU 20 to RU 37 | is not defined) (DC RU indicates a direct current RU) |
| | | 37 to 40 | 20 MHz, 40 MHz, 80 MHz, 160 MHz, or 320 MHz | 52 | RU 1 to RU 4 | Same numbering for 11ax and 11be (same numbering for 11ax and 11be) |
| | | 41 to 44 | 40 MHz, 80 MHz, 160 MHz, or 320 MHz | | RU 5 to RU 8 | |
| | | 45 to 52 | 80 MHz, 160 MHz, or 320 MHz | | RU 9 to RU 16 | |
| | | 53 and 54 | 20 MHz, 40 MHz, 80 MHz, 160 MHz, or 320 MHz | 106 | RU 1 and RU 2 | |
| | | 55 and 56 | 40 MHz, 80 MHz, 160 MHz, or 320 MHz | | RU 3 and RU 4 | |
| | | 57 to 60 | 80 MHz, 160 MHz, or 320 MHz | | RU 5 to RU 8 | |
| | | 61 | 20 MHz, 40 MHz, 80 MHz, 160 MHz, or 320 MHz | 242 | RU 1 | |
| | | 62 | 40 MHz, 80 MHz, 160 MHz, or 320 MHz | | RU 2 | |
| | | 63 and 64 | 80 MHz, 160 MHz, or 320 MHz | | RU 3 and RU 4 | |
| | | 65 | 40 MHz, 80 MHz, 160 MHz, or 320 MHz | 484 | RU 1 | |
| | | 66 | 80 MHz, 160 MHz, or 320 MHz | | RU 2 | |
| | | 67 | 80 MHz, 160 MHz, or 320 MHz | 996 | RU 1 | |
| BS | 0 | 68 | | reserved | | |
| | 1 | | 160 MHz or 320 MHz | 2x996 | RU 1 | |

TABLE 7(2a)-continued

| BS: P/S 160 MHz (BS: primary/ secondary 160 MHz) | RU allocation subfield (resource unit allocation subfield) B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (resource unit index 11be) | Description |
|---|---|---|---|---|---|---|
| 00 01 10 11 0 to 3: 80 MHz segment where the RU is located (indicate 80 MHz where the RU is located) | | 69 | | reserved | reserved | |
| | | 70 to 72 | 320 MHz 20 MHz, 40 MHz, 80 MHz, 160 MHz, or 320 MHz | 4x996 RU 52 + RU 26 | RU 1 MRU 1 to MRU 3 | RU 1 MRU 1: RU 2 (26T) + RU 2 (52T) – reserved for BW >= 80 MHz MRU 2: RU 5 (26T) + RU 2 (52T) MRU 3: RU 8 (26T) + RU 3 (52T) |
| | | 73 to 75 | 40 MHz, 80 MHz, 160 MHz, or 320 MHz | | MRU 4 to MRU 6 | MRU 4: RU 11 (26T) + RU 6 (52T) MRU 5: RU 14 (26T) + RU 6 (52T) MRU 6: RU 17 (26T) + RU 7 (52T) reserved for BW >= 80 MHz |
| | | 76 to 81 | 80 MHz, 160 MHz, or 320 MHz | | MRU 7 to MRU 12 | MRU 7: RU 21 (26T) + RU 10 (52T) reserved MRU 8: RU 24 (26T) + RU 10 (52T) MRU 9: RU 27 (26T) + RU 11 (52T) MRU 10: RU 30 (26T) + RU 14 (52T) MRU 11: RU 33 (26T) + RU 14 (52T) MRU 12: RU 36 (26T) + RU 15 (52T) reserved |
| | | 82 and 83 | 20 MHz, 40 MHz, 80 MHz, 160 MHz, or 320 MHz | RU 106 + RU 26 | MRU 1 and MRU 2 | MRU 1: RU 5 (26T) + RU 1 (106T) MRU 2: RU 5 (26T) + RU 2 (106T) – reserved for BW >= 80 MHz |
| | | 84 and 85 | 40 MHz, 80 MHz, 160 MHz, or 320 MHz | | MRU 3 and MRU 4 | MRU 3: RU 14 (26T) + RU 3 (106T) reserved for BW >= 80 MHz MRU 4: RU 14 (26T) + RU 4 (106T) |
| | | 86 to 89 | 80 MHz, 160 MHz, or 320 MHz | | MRU 5 to MRU 8 | MRU 5: RU 24 (26T) + RU 5 (106T) MRU 6: RU 24 (26T) + RU 6 (106T) reserved MRU 7: RU 33 (26T) + RU 7 (106T) reserved MRU 8: RU 33 (26T) + RU 8 (106T) |
| | | 90 to 93 | 80 MHz, 160 MHz, or 320 MHz | RU 484 + RU 242 | MRU 1 to MRU 4 | MRU 1: RU 2 (242T) + RU 2 (484T) MRU 2: RU 1 (242T) + RU 2 (484T) MRU 3: RU 4 (242T) + RU 1 (484T) |

TABLE 7(2a)-continued

| BS: P/S 160 MHz (BS: primary/secondary 160 MHz) | RU allocation subfield (resource unit allocation subfield) B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (resource unit index 11be) | Description |
|---|---|---|---|---|---|---|
| 00 and 10 | | 94 and 95 | 160 MHz or 320 MHz | RU 996 + RU 484 | MRU 1 and MRU 2 | MRU 1: RU 2 (484T) + RU 2 (996T)<br>MRU 2: RU 1 (484T) + RU 2 (996T) |
| 01 and 11 | | | | | MRU 3 and MRU 4 | MRU 3: RU 4 (484T) + RU 1 (996T)<br>MRU 4: RU 3 (484T) + RU 1 (996T) |
| 00 and 10 | | 96 to 99 | 160 MHz, 320 MHz | RU 996 + RU 484 + RU 242 | MRU 1 to MRU 4 | MRU 1: RU 2 (242T) + RU 2 (484T) + RU 2 (996T)<br>MRU 2: RU 1 (242T) + RU 2 (484T) + RU 2 (996T)<br>MRU 3: RU 4 (242T) + RU 1 (484T) + RU 2 (996T)<br>MRU 4: RU 3 (242T) + RU 1 (484T) + RU 2 (996T) |
| 01 and 11 | | | | | MRU 5 to MRU 8 | MRU 5: RU 6 (242T) + RU 4 (484T) + RU 1 (996T)<br>MRU 6: RU 5 (242T) + RU 4 (484T) + RU 1 (996T)<br>MRU 7: RU 8 (242T) + RU 3 (484T) + RU 1 (996T)<br>MRU 8: RU 7 (242T) + RU 3 (484T) + RU 1 (996T) |
| 00 | | 100 to 103 | 320 MHz | RU 2×996 + RU 484 | MRU 1 and MRU 2 | MRU 1: RU 2 (484T) + RU 2 (996T) + RU 3 (996T)<br>MRU 2: RU 1 (484T) + RU 2 (996T) + RU 3 (996T)<br>2 reserved entries for B7:B1 = 102,103 |
| 01 | | | | | MRU 3 to MRU 6 | MRU 3: RU 4 (484T) + RU 1 (996T) + RU 3 (996T)<br>MRU 4: RU 3 (484T) + RU 1 (996T) + RU 3 (996T) |

TABLE 7(2a)-continued

| BS: P/S 160 MHz (BS: primary/secondary 160 MHz) | B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (resource unit index 11be) | Description |
|---|---|---|---|---|---|---|
| 10 | | | | | MRU 7 to MRU 10 | MRU 5: RU 4 (484T) + RU 3 (996T) + RU 4 (996T)<br>MRU 6: RU 3 (484T) + RU 3 (996T) + RU 4 (996T)<br>MRU 7: RU 6 (484T) + RU 1 (996T) + RU 2 (996T)<br>MRU 8: RU 5 (484T) + RU 1 (996T) + RU 2 (996T)<br>MRU 9: RU 6 (484T) + RU 2 (996T) + RU 4 (996T)<br>MRU 10: RU 5 (484T) + RU 2 (996T) + RU 4 (996T) |
| 11 | | | | | MRU 11 and MRU 12 | 2 reserved entries for B7:B1 = 100, 101<br>MRU 11: RU 8 (484T) + RU 2 (996T) + RU 3 (996T)<br>MRU 12: RU 7 (484T) + RU 2 (996T) + RU 3 (996T) |
| 00 | | 104 | 320 MHz | RU 3x996 reserved | MRU 2 | MRU 2: RU 1 (996T) + RU 2 (2x996T) |
| 01 | | | | | MRU 1 | MRU 1: RU 2 (996T) + RU 2 (2x996T) |
| 10 | | | | | MRU 4 | MRU 4: RU 3 (996T) + RU 1 (2x996T) |
| 11 | | | | | MRU 3 | MRU 3: RU 4 (996T) + RU 1 (2x996T) |
| 00 | | 105 and 106 | 320 MHz | RU 3x996 + RU 484 reserved | MRU 1 and MRU 2 | MRU 1: RU 2 (484T) + RU 2 (996T) + RU 2 (2x996T)<br>MRU 2: RU 1 (484T) + RU 2 (996T) + RU 2 (2x996T) |
| 01 | | | | | MRU 3 and MRU 4 | MRU 3: RU 4 (484T) + RU 1 (996T) + RU 2 (2x996T)<br>MRU 4: RU 3 (484T) + RU 1 (996T) + RU 2 (2x996T) |
| 10 | | | | | MRU 5 and MRU 6 | MRU 5: RU 6 (484T) + RU 4 (996T) + RU 1 (2x996T) |

TABLE 7(2a)-continued

| BS: P/S 160 MHz (BS: primary/secondary 160 MHz) | RU allocation subfield (resource unit allocation subfield) B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (resource unit index 11be) | Description |
|---|---|---|---|---|---|---|
| 11 | | | | | MRU 7 and MRU 8 | MRU 6: RU 5 (484T) + RU 4 (996T) + RU 1 (2x996T) MRU 7: RU 8 (484T) + RU 3 (996T) + RU 1 (2x996T) MRU 8: RU 7 (484T) + RU 3 (996T) + RU 1 (2x996T) |
| | | 107 to 127 | | | reserved | |

When the table includes Case b, Table 7(2b) is read:

| BS: P/S 160 MHz (BS: primary/secondary 160 MHz) | RU allocation subfield (resource unit allocation subfield) B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (resource unit index 11be) | Description |
|---|---|---|---|---|---|---|
| 0 to 3: 80 MHz segment where the RU is located (indicate 80 MHz where the RU is located) | | 0 to 8 | 20 MHz, 40 MHz, 80 MHz, 160 MHz, or 320 MHz | 26 | RU 1 to RU 9 | 26 Tone RU: –11ax: RU 1 . . . 37, RU 19 is the DC RU in 80 MHz (11ax: RU 1 . . . 37, RU 19 is the DC RU in 80 MHz) –11be: RU 1 . . . 18 for lower 40 MHz and 20 to 37 in upper 40 MHz. RU 19 does not exist. (11be: 1 . . . 18 for lower 40 MHz and 20 to 37 in upper 40 MHz. RU 19 does not exist or is not defined) (DC RU indicates a direct current RU) |
| | | 9 to 17 | 40 MHz, 80 MHz, 160 MHz, or 320 MHz | | RU 10 to RU 18 | |
| | | 18 | 80 MHz, 160 MHz, or 320 MHz | | not defined (not defined) | |
| | | 19 to 36 | 80 MHz, 160 MHz, or 320 MHz | | RU 20 to RU 37 | |

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (resource unit index 11be) | Description |
| | | 37 to 40 | 20 MHz, 40 MHz, 80 MHz, 160 MHz, or 320 MHz | 52 | RU 1 to RU 4 | Same numbering for 11ax and 11be (same numbering for 11ax and 11be) |
| | | 41 to 44 | 40 MHz, 80 MHz, 160 MHz, or 320 MHz | | RU 5 to RU 8 | |
| | | 45 to 52 | 80 MHz, 160 MHz, or 320 MHz | | RU 9 to RU 16 | |
| | | 53 and 54 | 20 MHz, 40 MHz, 80 MHz, 160 MHz, or 320 MHz | 106 | RU 1 and RU 2 | |
| | | 55 and 56 | 40 MHz, 80 MHz, 160 MHz, or 320 MHz | | RU 3 and RU 4 | |
| | | 57 to 60 | 80 MHz, 160 MHz, or 320 MHz | | RU 5 to RU 8 | |
| | | 61 | 20 MHz, 40 MHz, 80 MHz, 160 MHz, or 320 MHz | 242 | RU 1 | |
| | | 62 | 40 MHz, 80 MHz, 160 MHz, or 320 MHz | | RU 2 | |
| | | 63 and 64 | 80 MHz, 160 MHz, or 320 MHz | | RU 3 and RU 4 | |
| | | 65 | 40 MHz, 80 MHz, 160 MHz, or 320 MHz | 484 | RU 1 | |
| | | 66 | 80 MHz, 160 MHz, or 320 MHz | | RU 2 | |
| | | 67 | 80 MHz, 160 MHz, or 320 MHz | 996 | RU 1 | |
| BS | 0 | 68 | | reserved | | |
| | 1 | | 160 MHz or 320 MHz | 2x996 | RU 1 | |
| 01 00 10 | | 69 | | reserved | reserved | |

-continued

| RU allocation subfield (resource unit allocation subfield) | | | | | |
|---|---|---|---|---|---|
| BS: P/S 160 MHz (BS: primary/ secondary 160 MHz) | B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (resource unit index 11be) | Description |
| 11 0 to 3: 80 MHz segment where the RU is located (indicate 80 MHz where the RU is located) | | 70 to 72 | 320 MHz 20 MHz, 40 MHz, 80 MHz, 160 MHz, or 320 MHz | 4x996 RU 52 + RU 26 | RU 1 MRU 1 to MRU 3 | RU 1 MRU 1: RU 2 (26T) + RU 2 (52T) - reserved for BW >= 80 MHz MRU 2: RU 5 (26T) + RU 2 (52T) MRU 3: RU 8 (26T) + RU 3 (52T) |
| | | 73 to 75 | 40 MHz, 80 MHz, 160 MHz, or 320 MHz | | MRU 4 to MRU 6 | MRU 4: RU 11 (26T) + RU 6 (52T) MRU 5: RU 14 (26T) + RU 6 (52T) MRU 6: RU 17 (26T) + RU 7 (52T) reserved for BW >= 80 MHz |
| | | 76 to 81 | 80 MHz, 160 MHz, or 320 MHz | | MRU 7 to MRU 12 | MRU 7: RU 21 (26T) + RU 10 (52T) reserved MRU 8: RU 24 (26T) + RU 10 (52T) MRU 9: RU 27 (26T) + RU 11 (52T) MRU 10: RU 30 (26T) + RU 14 (52T) MRU 11: RU 33 (26T) + RU 14 (52T) MRU 12: RU 36 (26T) + RU 15 (52T) reserved |
| | | 82 and 83 | 20 MHz, 40 MHz, 80 MHz, 160 MHz, or 320 MHz | RU 106 + RU 26 | MRU 1 and MRU 2 | MRU 1: RU 5 (26T) + RU 1 (106T) MRU 2: RU 5 (26T) + RU 2 (106T) - reserved for BW >= 80 MHz |
| | | 84 and 85 | 40 MHz, 80 MHz, 160 MHz, or 320 MHz | | MRU 3 and MRU 4 | MRU 3: RU 14 (26T) + RU 3 (106T) reserved for BW >= 80 MHz MRU 4: RU 14 (26T) + RU 4 (106T) |
| | | 86 to 89 | 80 MHz, 160 MHz, or 320 MHz | | MRU 5 to MRU 8 | MRU 5: RU 24 (26T) + RU 5 (106T) MRU 6: RU 24 (26T) + RU 6 (106T) reserved MRU 7: RU 33 (26T) + RU 7 (106T) reserved MRU 8: RU 33 (26T) + RU 8 (106T) |
| | | 90 to 93 | 80 MHz, 160 MHz, or 320 MHz | RU 484 + RU 242 | MRU 1 to MRU 4 | MRU 1: RU 2 (242T) + RU 2 (484T) MRU 2: RU 1 (242T) + RU 2 (484T) MRU 3: RU 4 (242T) + RU 1 (484T) MRU 4: RU 3 (242T) + RU 1 (484T) |

-continued

| RU allocation subfield (resource unit allocation subfield) | | | | | |
|---|---|---|---|---|---|
| BS: P/S 160 MHz (BS: primary/ secondary 160 MHz) | B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (resource unit index 11be) | Description |
| 01 and 10 | | 94 and 95 | 160 MHz or 320 MHz | RU 996 + RU 484 | MRU 1 and MRU 2 | MRU 1: RU 2 (484T) + RU 2 (996T) MRU 2: RU 1 (484T) + RU 2 (996T) |
| 00 and 11 | | | | | MRU 3 and MRU 4 | MRU 3: RU 4 (484T) + RU 1 (996T) MRU 4: RU 3 (484T) + RU 1 (996T) |
| 01 and 10 | | 96 to 99 | 160 MHz or 320 MHz | RU 996 + RU 484 + RU 242 | MRU 1 to MRU 4 | MRU 1: RU 2 (242T) + RU 2 (484T) + RU 2 (996T) MRU 2: RU 1 (242T) + RU 2 (484T) + RU 2 (996T) MRU 3: RU 4 (242T) + RU 1 (484T) + RU 2 (996T) MRU 4: RU 3 (242T) + RU 1 (484T) + RU 2 (996T) |
| 00 and 11 | | | | | MRU 5 to MRU 8 | MRU 5: RU 6 (242T) + RU 4 (484T) + RU 1 (996T) MRU 6: RU 5 (242T) + RU 4 (484T) + RU 1 (996T) MRU 7: RU 8 (242T) + RU 3 (484T) + RU 1 (996T) MRU 8: RU 7 (242T) + RU 3 (484T) + RU 1 (996T) |
| 01 | | 100 to 103 | 320 MHz | RU 2x996 + RU 484 | MRU 1 and MRU 2 | MRU 1: RU 2 (484T) + RU 2 (996T) + RU 3 (996T) MRU 2: RU 1 (484T) + RU 2 (996T) + RU 3 (996T) 2 reserved entries for B7:B1 = 102, 103 |
| 00 | | | | | MRU 3 to MRU 6 | MRU 3: RU 4 (484T) + RU 1 (996T) + RU 3 (996T) MRU 4: RU 3 (484T) + RU 1 (996T) + RU 3 (996T) MRU 5: RU 4 (484T) + RU 3 (996T) + RU 4 (996T) |

-continued

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (resource unit index 11be) | Description |
| 10 | | | | | MRU 7 to MRU 10 | MRU 6: RU 3 (484T) + RU 3 (996T) + RU 4 (996T)<br>MRU 7: RU 6 (484T) + RU 1 (996T) + RU 2 (996T)<br>MRU 8: RU 5 (484T) + RU 1 (996T) + RU 2 (996T)<br>MRU 9: RU 6 (484T) + RU 2 (996T) + RU 4 (996T)<br>MRU 10: RU 5 (484T) + RU 2 (996T) + RU 4 (996T) |
| 11 | | | | | MRU 11 and MRU 12 | 2 reserved entries for B7:B1 = 100, 101<br>MRU 11: RU 8 (484T) + RU 2 (996T) + RU 3 (996T)<br>MRU 12: RU 7 (484T) + RU 2 (996T) + RU 3 (996T) |
| 01 | | 104 | 320 MHz | RU 3x996 | reserved | MRU 2: RU 1 (996T) + RU 2 (2X996T) |
| 00 | | | | | MRU 1 | MRU 1: RU 2 (996T) + RU 2 (2X996T) |
| 10 | | | | | MRU 4 | MRU 4: RU 3 (996T) + RU 1 (2X996T) |
| 11 | | | | | MRU 3 | MRU 3: RU 4 (996T) + RU 1 (2x996T) |
| 01 | | 105 and 106 | 320 MHz | RU 3x996 + RU 484 | reserved | MRU 1: RU 2 (484T) + RU 2 (996T) + RU 2 (2x996T)<br>MRU 2: RU 1 (484T) + RU 2 (996T) + RU 2 (2x996T) |
| | | | | | MRU 1 and MRU 2 | |
| 00 | | | | | MRU 3 and MRU 4 | MRU 3: RU 4 (484T) + RU 1 (996T) + RU 2 (2x996T)<br>MRU 4: RU 3 (484T) + RU 1 (996T) + RU 2 (2x996T) |
| 10 | | | | | MRU 5 and MRU 6 | MRU 5: RU 6 (484T) + RU 4 (996T) + RU 1 (2x996T)<br>MRU 6: RU 5 (484T) + RU 4 (996T) + RU 1 (2x996T) |

| RU allocation subfield (resource unit allocation subfield) | | | | | |
|---|---|---|---|---|---|
| BS: P/S 160 MHz (BS: primary/ secondary 160 MHz) | B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (resource unit index 11be) | Description |
| 11 | | | | | MRU 7 and MRU 8 | MRU 7: RU 8 (484T) + RU 3 (996T) + RU 1 (2x996T) MRU 8: RU 7 (484T) + RU 3 (996T) + RU 1 (2x996T) |
| | | 107 to 127 | | | | reserved |

When the Case c, Table 7(2c) is read:

TABLE 7(20)

| RU allocation subfield (resource unit allocation subfield) | | | | | | |
|---|---|---|---|---|---|---|
| BS: P/S 160 MHz (BS: primary/s econdary 160 MHz) | B0: 80 MHz P/S in P160 and L/U in S160 (B0: primary 160 MHz indicates primary/ secondary, and secondary 160 MHz indicates low/high) | B7 to B1 | BW subfield (bandwidth subfield) | RU size (resource unit size) | RU index 11be (RU index 11be) | Description |
| 0 to 3: 80 MHz segment where the RU is located (indicate 80 MHz where the RU is located) | | 0 to 8 | 20 MHz, 40 MHz, 80 MHz, 160 MHz, or 320 MHz | 26 | RU 1 to RU 9 | 26 Tone RU: −11ax: RU 1 . . . 37, RU 19 is the DC RU in 80 MHz (11ax: RU 1 . . . 37, RU 19 is the DC RU in 80 MHz) −11be: RU 1 . . . 18 for lower 40 MHz and 20 to 37 in upper 40 MHz. RU 19 does not exist. (11be: 1 . . . 18 for lower 40 MHz and 20 to 37 in upper 40 MHz. RU 19 does not exist or is not defined) (DC RU indicates a direct current RU) |
| | | 9 to 17 | 40 MHz, 80 MHz, 160 MHz, or 320 MHz | | RU 10 to RU 18 | |
| | | 18 | 80 MHz, 160 MHz, or 320 MHz | | not defined (not defined) | |
| | | 19 to 36 | 80 MHz, 160 MHz, or 320 MHz | | RU 20 to RU 37 | |
| | | 37 to 40 | 20 MHz, 40 MHz, 80 MHz, 160 MHz, or 320 MHz | 52 | RU 1 to RU 4 | Same numbering for 11ax and 11be (same numbering for 11ax and 11be) |

TABLE 7(20)-continued

| RU allocation subfield (resource unit allocation subfield) | | | | | | |
|---|---|---|---|---|---|---|
| BS: P/S 160 MHz (BS: primary/secondary 160 MHz) | B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (RU index 11be) | Description |
| | | 41 to 44 | 40 MHz, 80 MHz, 160 MHz, or 320 MHz | | RU 5 to RU 8 | |
| | | 45 to 52 | 80 MHz, 160 MHz, or 320 MHz | | RU 9 to RU 16 | |
| | | 53 and 54 | 20 MHz, 40 MHz, 80 MHz, 160 MHz, or 320 MHz | 106 | RU 1 and RU 2 | |
| | | 55 and 56 | 40 MHz, 80 MHz, 160 MHz, or 320 MHz | | RU 3 and RU 4 | |
| | | 57 to 60 | 80 MHz, 160 MHz, or 320 MHz | | RU 5 to RU 8 | |
| | | 61 | 20 MHz, 40 MHz, 80 MHz, 160 MHz, or 320 MHz | 242 | RU 1 | |
| | | 62 | 40 MHz, 80 MHz, 160 MHz, or 320 MHz | | RU 2 | |
| | | 63 and 64 | 80 MHz, 160 MHz, or 320 MHz | | RU 3 and RU 4 | |
| | | 65 | 40 MHz, 80 MHz, 160 MHz, or 320 MHz | 484 | RU 1 | |
| | | 66 | 80 MHz, 160 MHz, or 320 MHz | | RU 2 | |
| | | 67 | 80 MHz, 160 MHz, or 320 MHz | 996 | RU 1 | |
| BS | 0 | 68 | | | reserved | |
| | 1 | | 160 MHz or 320 MHz | 2x996 | RU 1 | |
| 10 | | 69 | | | reserved | reserved |
| 11 | | | | | | |
| 00 | | | | | | |
| 01 | | | 320 MHz | 4x996 | RU 1 | RU 1 |
| 0 to 3: 80 MHz segment where the RU is located (indicate 80 MHz where the RU is located) | | 70 to 72 | 20 MHz, 40 MHz, 80 MHz, 160 MHz, or 320 MHz | RU 52 + RU 26 | MRU 1 to MRU 3 | MRU 1: RU 2 (26T) + RU 2 (52T) - reserved for BW >= 80 MHz MRU 2: RU 5 (26T) + RU 2 (52T) |

TABLE 7(20)-continued

| RU allocation subfield (resource unit allocation subfield) | | | | | |
|---|---|---|---|---|---|
| BS: P/S 160 MHz (BS: primary/secondary 160 MHz) | B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (RU index 11be) | Description |
| | | 73 to 75 | 40 MHz, 80 MHz, 160 MHz, or 320 MHz | | MRU 4 to MRU 6 | MRU 3: RU 8 (26T) + RU 3 (52T) MRU 4: RU 11 (26T) + RU 6 (52T) MRU 5: RU 14 (26T) + RU 6 (52T) MRU 6: RU 17 (26T) + RU 7 (52T) reserved for BW >= 80 MHz |
| | | 76 to 81 | 80 MHz, 160 MHz, or 320 MHz | | MRU 7 to MRU 12 | MRU 7: RU 21 (26T) + RU 10 (52T) - reserved MRU 8: RU 24 (26T) + RU 10 (52T) MRU 9: RU 27 (26T) + RU 11 (52T) MRU 10: RU 30 (26T) + RU 14 (52T) MRU 11: RU 33 (26T) + RU 14 (52T) MRU 12: RU 36 (26T) + RU 15 (52T) reserved |
| | | 82 and 83 | 20 MHz, 40 MHz, 80 MHz, 160 MHz, or 320 MHz | RU 106 + RU 26 | MRU 1 and MRU 2 | MRU 1: RU 5 (26T) + RU 1 (106T) MRU 2: RU 5 (26T) + RU 2 (106T) - reserved for BW >= 80 MHz |
| | | 84 and 85 | 40 MHz, 80 MHz, 160 MHz, or 320 MHz | | MRU 3 and MRU 4 | MRU 3: RU 14 (26T) + RU 3 (106T) reserved for BW >= 80 MHz MRU 4: RU 14 (26T) + RU 4 (106T) |
| | | 86 to 89 | 80 MHz, 160 MHz, or 320 MHz | | MRU 5 to MRU 8 | MRU 5: RU 24 (26T) + RU 5 (106T) MRU 6: RU 24 (26T) + RU 6 (106T) reserved MRU 7: RU 33 (26T) + RU 7 (106T) reserved MRU 8: RU 33 (26T) + RU 8 (106T) |
| | | 90 to 93 | 80 MHz, 160 MHz, or 320 MHz | RU 484 + RU 242 | MRU 1 to MRU 4 | MRU 1: RU 2 (242T) + RU 2 (484T) MRU 2: RU 1 (242T) + RU 2 (484T) MRU 3: RU 4 (242T) + RU 1 (484T) MRU 4: RU 3 (242T) + RU 1 (484T) |
| 00 and 10 | | 94 and 95 | 160 MHz or 320 MHz | RU 996 + RU 484 | MRU 1 and MRU 2 | MRU 1: RU 2 (484T) + RU 2 (996T) MRU 2: RU 1 (484T) + RU 2 (996T) |
| 01 and 11 | | | | | MRU 3 and MRU 4 | MRU 3: RU 4 (484T) + RU 1 (996T) |

TABLE 7(20)-continued

| RU allocation subfield (resource unit allocation subfield) | | | | | |
|---|---|---|---|---|---|
| BS: P/S 160 MHz (BS: primary/secondary 160 MHz) | B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (RU index 11be) | Description |
|---|---|---|---|---|---|---|
| 00 and 10 | | 96 to 99 | 160 MHz or 320 MHz | RU 996 + RU 484 + RU 242 | MRU 1 to MRU 4 | MRU 1: RU 2 (242T) + RU 2 (484T) + RU 2 (996T) MRU 2: RU 1 (242T) + RU 2 (484T) + RU 2 (996T) MRU 3: RU 4 (242T) + RU 1 (484T) + RU 2 (996T) MRU 4: RU 3 (242T) + RU 1 (484T) + RU 2 (996T) |
| 01 and 11 | | | | | MRU 5 to MRU 8 | MRU 5: RU 6 (242T) + RU 4 (484T) + RU 1 (996T) MRU 6: RU 5 (242T) + RU 4 (484T) + RU 1 (996T) MRU 7: RU 8 (242T) + RU 3 (484T) + RU 1 (996T) MRU 8: RU 7 (242T) + RU 3 (484T) + RU 1 (996T) |
| 10 | | 100 to 103 | 320 MHz | RU 2x996 + RU 484 | MRU 1 and MRU 2 | MRU 1: RU 2 (484T) + RU 2 (996T) + RU 3 (996T) MRU 2: RU 1 (484T) + RU 2 (996T) + RU 3 (996T) 2 reserved entries for B7:B1 = 102, 103 |
| 11 | | | | | MRU 3 to MRU 6 | MRU 3: RU 4 (484T) + RU 1 (996T) + RU 3 (996T) MRU 4: RU 3 (484T) + RU 1 (996T) + RU 3 (996T) MRU 5: RU 4 (484T) + RU3 (996T) + RU 4 (996T) MRU 6: RU 3 (484T) + RU3 (996T) + RU 4 (996T) |
| 00 | | | | | MRU 7 to MRU 10 | MRU 7: RU 6 (484T) + RU 1 (996T) + RU 2 (996T) |

TABLE 7(20)-continued

| BS: P/S 160 MHz (BS: primary/secondary 160 MHz) | B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be | (RU index 11be) | Description |
|---|---|---|---|---|---|---|---|
| 01 | | | | | MRU 11 and MRU 12 | | MRU 8: RU 5 (484T) + RU 1 (996T) + RU 2 (996T)<br>MRU 9: RU 6 (484T) + RU 2 (996T) + RU 4 (996T)<br>MRU 10: RU 5 (484T) + RU 2 (996T) + RU 4 (996T)<br>2 reserved entries for B7:B1 = 100, 101<br>MRU 11: RU 8 (484T) + RU 2 (996T) + RU 3 (996T)<br>MRU 12: RU 7 (484T) + RU 2 (996T) + RU 3 (996T) |
| 10 | | 104 | 320 MHz | RU 3x996 | reserved | MRU 2 | MRU 2: RU 1 (996T) + RU 2 (2x996T) |
| 11 | | | | | | MRU 1 | MRU 1: RU 2 (996T) + RU 2 (2x996T) |
| 00 | | | | | | MRU 4 | MRU 4: RU 3 (996T) + RU 1 (2x996T) |
| 01 | | | | | | MRU 3 | MRU 3: RU 4 (996T) + RU 1 (2x996T) |
| 10 | | 105 and 106 | 320 MHz | RU 3x996 + RU 484 | reserved | MRU 1 and MRU 2 | MRU 1: RU 2 (484T) + RU 2 (996T) + RU 2 (2x996T)<br>MRU 2: RU 1 (484T) + RU 2 (996T) + RU 2 (2x996T) |
| 11 | | | | | | MRU 3 and MRU 4 | MRU 3: RU 4 (484T) + RU 1 (996T) + RU 2 (2x996T)<br>MRU 4: RU 3 (484T) + RU 1 (996T) + RU 2 (2x996T) |
| 00 | | | | | | MRU 5 and MRU 6 | MRU 5: RU 6 (484T) + RU 4 (996T) + RU 1 (2x996T)<br>MRU 6: RU 5 (484T) + RU 4 (996T) + RU 1 (2x996T) |
| 01 | | | | | | MRU 7 and MRU 8 | MRU 7: RU 8 (484T) + RU 3 (996T) + RU 1 (2x996T) |

TABLE 7(20)-continued

| BS: P/S 160 MHz (BS: primary/secondary 160 MHz) | RU allocation subfield (resource unit allocation subfield) B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (RU index 11be) | Description |
|---|---|---|---|---|---|---|
| | | 107 to 127 | | | reserved | MRU 8: RU 7 (484T) + RU 3 (996T) + RU 1 (2x996T) |

When is Case d, the following Table 7(2d) is read:

TABLE 7(2d)

| BS: P/S 160 MHz (BS: primary/secondary 160 MHz) | RU allocation subfield (resource unit allocation subfield) B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (RU index 11be) | Description |
|---|---|---|---|---|---|---|
| 0 to 3: 80 MHz segment where the RU is located (indicate 80 MHz where the RU is located) | | 0 to 8 | 20 MHz, 40 MHz, 80 MHz, 160 MHz, or 320 MHz | 26 | RU 1 to RU 9 | 26 Tone RU: −11ax: RU 1 . . . 37, RU 19 is the DC RU in 80 MHz (11ax: RU 1 . . . 37, RU 19 is the DC RU in 80 MHz) −11be: RU 1 . . . 18 for lower 40 MHz and 20 to 37 in upper 40 MHz. RU 19 does not exist. (11be: 1 . . . 18 for lower 40 MHz and 20 to 37 in upper 40 MHz. RU 19 does not exist or is not defined) (DC RU indicates a direct current RU) |
| | | 9 to 17 | 40 MHz, 80 MHz, 160 MHz, or 320 MHz | | RU 10 to RU 18 | |
| | | 18 | 80 MHz, 160 MHz, or 320 MHz | | not defined (not defined) | |
| | | 19 to 36 | 80 MHz, 160 MHz, or 320 MHz | | RU 20 to RU 37 | |
| | | 37 to 40 | 20 MHz, 40 MHz, 80 MHz, 160 MHz, or 320 MHz | 52 | RU 1 to RU 4 | Same numbering for 11ax and 11be (same numbering for 11ax and 11be) |

TABLE 7(2d)-continued

| RU allocation subfield (resource unit allocation subfield) | | | | | | |
|---|---|---|---|---|---|---|
| BS: P/S 160 MHz (BS: primary/secondary 160 MHz) | B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (RU index 11be) | Description |
| | | 41 to 44 | 40 MHz, 80 MHz, 160 MHz, or 320 MHz | | RU 5 to RU 8 | |
| | | 45 to 52 | 80 MHz, 160 MHz, or 320 MHz | | RU 9 to RU 16 | |
| | | 53 and 54 | 20 MHz, 40 MHz, 80 MHz, 160 MHz, or 320 MHz | 106 | RU 1 and RU 2 | |
| | | 55 and 56 | 40 MHz, 80 MHz, 160 MHz, or 320 MHz | | RU 3 and RU 4 | |
| | | 57 to 60 | 80 MHz, 160 MHz, or 320 MHz | | RU 5 to RU 8 | |
| | | 61 | 20 MHz, 40 MHz, 80 MHz, 160 MHz, or 320 MHz | 242 | RU 1 | |
| | | 62 | 40 MHz, 80 MHz, 160 MHz, or 320 MHz | | RU 2 | |
| | | 63 and 64 | 80 MHz, 160 MHz, or 320 MHz | | RU 3 and RU 4 | |
| | | 65 | 40 MHz, 80 MHz, 160 MHz, or 320 MHz | 484 | RU 1 | |
| | | 66 | 80 MHz, 160 MHz, or 320 MHz | | RU 2 | |
| | | 67 | 80 MHz, 160 MHz, or 320 MHz | 996 | RU 1 | |
| BS | 0 | 68 | | reserved | | |
| | 1 | | 160 MHz or 320 MHz | 2x996 | RU 1 | |
| 10 | | 69 | | reserved | | reserved |
| 11 | | | | | | |
| 01 | | | | | | |
| 00 | | | 320 MHz | 4x996 | RU 1 | RU 1 |
| 0 to 3: 80 MHz segment where the RU is located (indicate 80 MHz where the RU is located) | | 70 to 72 | 20 MHz, 40 MHz, 80 MHz, 160 MHz, or 320 MHz | RU 52 + RU 26 | MRU 1 to MRU 3 | MRU 1: RU 2 (26T) + RU 2 (52T) - reserved for BW >= 80 MHz MRU 2: RU 5 (26T) + RU 2 (52T) |

TABLE 7(2d)-continued

| BS: P/S 160 MHz (BS: primary/secondary 160 MHz) | RU allocation subfield (resource unit allocation subfield) B0: 80 MHz P/S in P160 and L/U in S160 (B0: primary 160 MHz indicates primary/secondary, and secondary 160 MHz indicates low/high) | B7 to B1 | BW subfield (bandwidth subfield) | RU size (resource unit size) | RU index 11be (RU index 11be) | Description |
|---|---|---|---|---|---|---|
| | | 73 to 75 | 40 MHz, 80 MHz, 160 MHz, or 320 MHz | | MRU 4 to MRU 6 | MRU 3: RU 8 (26T) + RU 3 (52T) MRU 4: RU 11 (26T) + RU 6 (52T) MRU 5: RU 14 (26T) + RU 6 (52T) MRU 6: RU 17 (26T) + RU 7 (52T) reserved for BW >= 80 MHz |
| | | 76 to 81 | 80 MHz, 160 MHz, or 320 MHz | | MRU 7 to MRU 12 | MRU 7: RU 21 (26T) + RU 10 (52T) reserved MRU 8: RU 24 (26T) + RU 10 (52T) MRU 9: RU 27 (26T) + RU 11 (52T) MRU 10: RU 30 (26T) + RU 14 (52T) MRU 11: RU 33 (26T) + RU 14 (52T) MRU 12: RU 36 (26T) + RU 15 (52T) reserved |
| | | 82 and 83 | 20 MHz, 40 MHz, 80 MHz, 160 MHz, or 320 MHz | RU 106 + RU 26 | MRU 1 and MRU 2 | MRU 1: RU 5 (26T) + RU 1 (106T) MRU 2: RU 5 (26T) + RU 2 (106T) - reserved for BW >= 80 MHz |
| | | 84 and 85 | 40 MHz, 80 MHz, 160 MHz, or 320 MHz | | MRU 3 and MRU 4 | MRU 3: RU 14 (26T) + RU 3 (106T) reserved for BW >= 80 MHz MRU 4: RU 14 (26T) + RU 4 (106T) |
| | | 86 to 89 | 80 MHz, 160 MHz, or 320 MHz | | MRU 5 to MRU 8 | MRU 5: RU 24 (26T) + RU 5 (106T) MRU 6: RU 24 (26T) + RU 6 (106T) reserved MRU 7: RU 33 (26T) + RU 7 (106T) reserved MRU 8: RU 33 (26T) + RU 8 (106T) |
| | | 90 to 93 | 80 MHz, 160 MHz, or 320 MHz | RU 484 + RU 242 | MRU 1 to MRU 4 | MRU 1: RU 2 (242T) + RU 2 (484T) MRU 2: RU 1 (242T) + RU 2 (484T) MRU 3: RU 4 (242T) + RU 1 (484T) MRU 4: RU 3 (242T) + RU 1 (484T) |
| 01 and 10 | | 94 and 95 | 160 MHz or 320 MHz | RU 996 + RU 484 | MRU 1 and MRU 2 | MRU 1: RU 2 (484T) + RU 2 (996T) MRU 2: RU 1 (484T) + RU 2 (996T) |
| 00 and 11 | | | | | MRU 3 and MRU 4 | MRU 3: RU 4 (484T) + RU 1 (996T) |

TABLE 7(2d)-continued

| RU allocation subfield (resource unit allocation subfield) | | | | | |
|---|---|---|---|---|---|
| BS: P/S 160 MHz (BS: primary/ secondary 160 MHz) | B0: 80 MHz P/S in P160 and L/U in S160 (B0: primary 160 MHz indicates primary/ secondary, and secondary 160 MHz indicates low/high) | B7 to B1 | BW subfield (bandwidth subfield) | RU size (resource unit size) | RU index 11be (RU index 11be) | Description |
| | 01 and 10 | 96 to 99 | 160 MHz or 320 MHz | RU 996 + RU 484 + RU 242 | MRU 1 to MRU 4 | MRU 1: RU 2 (242T) + RU 2 (484T) + RU 2 (996T) MRU 2: RU 1 (242T) + RU 2 (484T) + RU 2 (996T) MRU 3: RU 4 (242T) + RU 1 (484T) + RU 2 (996T) MRU 4: RU 3 (242T) + RU 1 (484T) + RU 2 (996T) |
| | 00 and 11 | | | | MRU 5 to MRU 8 | MRU 5: RU 6 (242T) + RU 4 (484T) + RU 1 (996T) MRU 6: RU 5 (242T) + RU 4 (484T) + RU 1 (996T) MRU 7: RU 8 (242T) + RU 3 (484T) + RU 1 (996T) MRU 8: RU 7 (242T) + RU 3 (484T) + RU 1 (996T) |
| | 10 | 100 to 103 | 320 MHz | RU 2x996 + RU 484 | MRU 1 and MRU 2 | MRU 1: RU 2 (484T) + RU 2 (996T) + RU 3 (996T) MRU 2: RU 1 (484T) + RU 2 (996T) + RU 3 (996T) 2 reserved entries for B7:B1 = 102, 103 |
| | 11 | | | | MRU 3 to MRU 6 | MRU 3: RU 4 (484T) + RU 1 (996T) + RU 3 (996T) MRU 4: RU 3 (484T) + RU 1 (996T) + RU 3 (996T) MRU 5: RU 4 (484T) + RU 3 (996T) + RU 4 (996T) MRU 6: RU 3 (484T) + RU 3 (996T) + RU 4 (996T) |
| | 01 | | | | MRU 7 to MRU 10 | MRU 7: RU 6 (484T) + RU 1 (996T) + RU 2 (996T) |

TABLE 7(2d)-continued

| BS: P/S 160 MHz (BS: primary/ secondary 160 MHz) | B0: 80 MHz P/S in P160 and L/U in S160 (B0: primary 160 MHz indicates primary/ secondary, and secondary 160 MHz indicates low/high) | B7 to B1 | BW subfield (bandwidth subfield) | RU size (resource unit size) | RU index 11be | (RU index 11be) | Description |
|---|---|---|---|---|---|---|---|
| 00 | | | | | MRU 11 and MRU 12 | | MRU 8: RU 5 (484T) + RU 1 (996T) + RU 2 (996T) MRU 9: RU 6 (484T) + RU 2 (996T) + RU 4 (996T) MRU 10: RU 5 (484T) + RU 2 (996T) + RU 4 (996T) 2 reserved entries for B7:B1 = 100, 101 MRU 11: RU 8 (484T) + RU 2 (996T) + RU 3 (996T) MRU 12: RU 7 (484T) + RU 2 (996T) + RU 3 (996T) |
| 10 | | 104 | 320 MHz | RU 3x996 | reserved | MRU 2 | MRU 2: RU 1 (996T) + RU 2 (2x996T) |
| 11 | | | | | | MRU 1 | MRU 1: RU 2 (996T) + RU 2 (2x996T) |
| 01 | | | | | | MRU 4 | MRU 4: RU 3 (996T) + RU 1 (2x996T) |
| 00 | | | | | | MRU 3 | MRU 3: RU 4 (996T) + RU 1 (2x996T) |
| 10 | | 105 and 106 | 320 MHz | RU 3x996 + RU 484 | reserved | MRU 1 and MRU 2 | MRU 1: RU 2 (484T) + RU 2 (996T) + RU 2 (2x996T) MRU 2: RU 1 (484T) + RU 2 (996T) + RU 2 (2x996T) |
| 11 | | | | | | MRU 3 and MRU 4 | MRU 3: RU 4 (484T) + RU 1 (996T) + RU 2 (2x996T) MRU 4: RU 3 (484T) + RU 1 (996T) + RU 2 (2x996T) |
| 01 | | | | | | MRU 5 and MRU 6 | MRU 5: RU 6 (484T) + RU 4 (996T) + RU 1 (2x996T) MRU 6: RU 5 (484T) + RU 4 (996T) + RU 1 (2x996T) |
| 00 | | | | | | MRU 7 and MRU 8 | MRU 7: RU 8 (484T) + RU 3 (996T) + RU 1 (2x996T) |

TABLE 7(2d)-continued

| RU allocation subfield (resource unit allocation subfield) | | | | | |
|---|---|---|---|---|---|
| BS: P/S 160 MHz (BS: primary/ secondary 160 MHz) | B0: 80 MHz P/S in P160 and L/U in S160 (B0: primary 160 MHz indicates primary/ secondary, and secondary 160 MHz indicates low/high) | B7 to B1 | BW subfield (bandwidth subfield) | RU size (resource unit size) | RU index 11be (RU index 11be) | Description |
| | | 107 to 127 | | | reserved | MRU 8: RU 7 (484T) + RU 3 (996T) + RU 1 (2×996T) |

This embodiment of this application further provides a 2-bit location indication+7-bit table indication method.

This is another technical solution for implementing indication in an RU allocation subfield table. To be specific, only a 7-bit table indication method is used to indicate a specific RU/MRU at an 80 MHz location determined by the bits BS and B0. 3×996+484 is used as an example. When the 7 bits (B7 to B1) indicates 105, the following four MRU cases exist in total:

MRU 1: RU 2 (484T)+RU 2 (996T)+RU 2 (2×996T)
MRU 3: RU 4 (484T)+RU 1 (996T)+RU 2 (2×996T)
MRU 5: RU 6 (484T)+RU 4 (996T)+RU 1 (2×996T)
MRU 7: RU 8 (484T)+RU 3 (996T)+RU 1 (2×996T)

According to indication of the two bits BS and B0, it may be determined to select the MRU 1, the MRU 3, the MRU 5, or the MRU 7. That is, an idea of the method is that after an RU/MRU set corresponding to a value of seven bits is given, a specific MRU in the set may be determined based on the two bits BS and B0.

It should be noted that an MRUx or an RUx corresponding to a resource unit size may represent a specific RU/MRU location.

The two bits BS and B0 use a primary-secondary location indication method, where the two-bit indication may indicate a location in 80 MHz in which a smallest RU in RUs/MRUs is located. Details are shown in Table 7(3).

TABLE 7(3)

| B7 to B1 | BW subfield (bandwidth subfield) | RU size (resource unit size) | RU index 11be (resource unit index 11be) | Description |
|---|---|---|---|---|
| 0 to 8 | 20 MHz, 40 MHz, 80 MHz, 160 MHz, or 320 MHz | 26 | RU 1 to RU 9 | 26 Tone RU: -11ax: RU 1...37, RU 19 is the DC RU in 80 MHz (11ax: RU 1 . . . 37, RU 19 is the DC RU in 80 MHz) -11be: RU 1 . . . 18 for lower 40 MHz and 20 to 37 in upper 40 MHz. RU 19 does not exist. (11be: 1 . . . 18 for lower 40 MHz and 20 to 37 in upper 40 MHz. RU 19 does not exist or is not defined) (DC RU indicates a direct current RU) |
| 9 to 17 | 40 MHz, 80 MHz, 160 MHz, or 320 MHz | | RU 10 to RU 18 | |
| 18 | 80 MHz, 160 MHz, or 320 MHz | | not defined (not defined) | |
| 19 to 36 | 80 MHz, 160 MHz, or 320 MHz | | RU 20 to RU 37 | |
| 37 to 40 | 20 MHz, 40 MHz, 80 MHz, 160 MHz, or 320 MHz | 52 | RU 1 to RU 4 | Same numbering for 11ax and 11be (same numbering for 11ax and 11be) |
| 41 to 44 | 40 MHz, 80 MHz, 160 MHz, or 320 MHz | | RU 5 to RU 8 | |
| 45 to 52 | 80 MHz, 160 MHz, or 320 MHz | | RU 9 to RU 16 | |
| 53 and 54 | 20 MHz, 40 MHz, 80 MHz, 160 MHz, or 320 MHz | 106 | RU 1 and RU 2 | |
| 55 and 56 | 40 MHz, 80 MHz, 160 MHz, or 320 MHz | | RU 3 and RU 4 | |
| 57 to 60 | 80 MHz, 160 MHz, or 320 MHz | | RU 5 to RU 8 | |

TABLE 7(3)-continued

| B7 to B1 | BW subfield (bandwidth subfield) | RU size (resource unit size) | RU index 11be (resource unit index 11be) | Description |
|---|---|---|---|---|
| 61 | 20 MHz, 40 MHz, 80 MHz, 160 MHz, or 320 MHz | 242 | RU 1 | |
| 62 | 40 MHz, 80 MHz, 160 MHz, or 320 MHz | | RU 2 | |
| 63 and 64 | 80 MHz, 160 MHz, or 320 MHz | | RU 3 and RU 4 | |
| 65 | 40 MHz, 80 MHz, 160 MHz, or 320 MHz | 484 | RU 1 | |
| 66 | 80 MHz, 160 MHz, or 320 MHz | | RU 2 | |
| 67 | 80 MHz, 160 MHz, or 320 MHz | 996 | RU 1 | |
| 68 | reserved | | | B0 is set to 0 (B0 is set to 0) |
| | 160 MHz or 320 MHz | 2x996 | RU 1 | B0 is set to 1 (B0 is set to 1) |
| 69 | reserved | | | BS-B0 is not equal to 11 (BS-B0 is not equal to 11) |
| | 320 MHz | 4x996 | RU 1 | BS and B0 are both set to 1 (BS and B0 are both set to 1, namely, n) |
| 70 to 72 | 20 MHz, 40 MHz, 80 MHz, 160 MHz, or 320 MHz | RU 52 + RU 26 | MRU 1 to MRU 3 | The MRU index indicates the MRU in the 80 MHz segment that is indicated by BS B0 (the MRU index indicates the MRU in |
| 73 to 75 | 40 MHz, 80 MHz, 160 MHz, or 320 MHz | | MRU 4 to MRU 6 | |
| 76 to 81 | 80 MHz, 160 MHz, or 320 MHz | | MRU 7 to MRU 12 | 80 MHz that is indicated by BS B0) |
| 82 and 83 | 20 MHz, 40 MHz, 80 MHz, 160 MHz, or 320 MHz | RU 106 + RU 26 | MRU 1 and MRU 2 | |
| 84 and 85 | 40 MHz, 80 MHz, 160 MHz, or 320 MHz | | MRU 3 and MRU 4 | |
| 86 to 89 | 80 MHz, 160 MHz, or 320 MHz | | MRU 5 to MRU 8 | |
| 90 to 93 | 80 MHz, 160 MHz, or 320 MHz | RU 484 + RU 242 | MRU 1 to MRU 4 | The MRU index indicates the RU in the 80 MHz segment that is indicated by BS B0 (the MRU index indicates the MRU in 80 MHz that is indicated by BS B0) |
| 94 | 160 MHz or 320 MHz | RU 996 + RU 484 | MRU 1 or MUR 3 | Indicate the MRU which contains the 484 tone RU which is located in 80 segment indicated by BS B0 (indicate the MRU which contains the 484 tone RU which is located in 80 MHz indicated by BS B0) |
| 95 | | | MRU 2 or MUR 4 | |

TABLE 7(3)-continued

| B7 to B1 | BW subfield (bandwidth subfield) | RU size (resource unit size) | RU index 11be (resource unit index 11be) | Description |
|---|---|---|---|---|
| 96 | 16o MHz or 320 | RU 996 + RU 484 + RU 242 | MRU 1 or MRU 5 | Indicate the MRU which contains the 242 tone RU which is located in 80 segment indicated by BS B0 (indicate the MRU which contains the 242 tone RU which is located in 80 MHz indicated by BS B0) |
| 97 | MHz | | MRU 2 or MRU 6 | |
| 98 | | | MRU 3 or MRU 7 | |
| 99 | | | MRU 4 or MRU 8 | |
| 100 | 320 MHz | RU 2x996 + RU 484 | MRU 1, MRU 3 or MRU 5 | Indicate the MRU which contains the 484 tone RU which is located in 80 segment indicated by BS B0 (indicate the MRU which contains the 484 tone RU which is located in 80 MHz indicated by BS B0) |
| 101 | | | MRU 2, MRU 4 or MRU 6 | Indicate the MRU which contains the 484 tone RU which is located in 80 segment indicated by BS B0 (indicate the MRU which contains the 484 tone RU which is located in 80 MHz indicated by BS B0) |
| 102 | | | MRU 7, MRU 9 or MRU 11 | Indicate the MRU which contains the 484 tone RU which is located in 80 segment indicated by BS B0 (indicate the MRU which contains the 484 tone RU which is located in 80 MHz indicated by BS B0) |
| 103 | | | RU 8, MRU 10 or MRU 12 | Indicate the MRU which contains the 484 tone RU which is located in 80 segment indicated by BS B0 (indicate the MRU which contains the 484 tone RU which is located in 80 MHz indicated by BS B0) |
| 104 | 320 MHz | RU 3x996 | MRU 1, MRU 2, MRU 3 or MRU 4 | Indicate the MRU which contains the 996 tone RU which is located in 80 segment indicated by BS B0 (indicate the MRU which contains the 996 tone RU which is located in 80 MHz indicated by BS B0) |
| 105 | 320 MHz | RU 3x996 + RU 484 | MRU 1, MRU 3, MRU 5 or MUR 7 | Indicate the MRU which contains the 484 tone RU which is located in 80 segment indicated by BS B0 (indicate the MRU which contains the 484 tone RU which is located in 80 MHz indicated by BS B0) |

TABLE 7(3)-continued

| B7 to B1 | BW subfield (bandwidth subfield) | RU size (resource unit size) | RU index 11be (resource unit index 11be) | Description |
|---|---|---|---|---|
| 106 | | | MRU 2, MRU 4, MRU 6 or MUR 8 | Indicate the MRU which contains the 484 tone RU which is located in 80 segment indicated by BS B0 (indicate the MRU which contains the 484 tone RU which is located in 80 MHz indicated by BS B0) |
| 107 to 127 reserved | | | | |

For a meaning of the MRU in the foregoing table, refer to the appendix MRU index shown in Table 7(4a) and Table 7(4b).

The MRU Index is an MRU index. It should be noted that the MRU index does not represent a value obtained by using 7 bits or 9 bits in the resource unit allocation subfield, but may be understood as an MRU pattern. Table 7(4a) and Table 7(4b) show MRU indexes at 160 MHz and 320 MHz.

TABLE 7(4a)

| MRU type (MRU type) | MRU index (MRU index) | MRU combination (MRU combination) Note: empty indicates that a value is empty |
|---|---|---|
| RU 996 + RU 484 | MRU 1 | RU 996 + RU 484; [empty-RU 484 RU 484 RU 996] |
| | MRU 2 | RU 996 + RU 484; [RU 484 empty-RU 484 RU 996] |
| | MRU 3 | RU 996 + RU 484; [RU 996 empty-RU 484 RU 484] |
| | MRU 4 | RU 996 + RU 484; [RU 996 RU 484 empty-RU 484] |
| RU 996 + RU 484 + RU 242 (for non-OFDMA only) | MRU 1 | RU 996 + RU 484 + RU 242; [empty-RU 242 RU 242 RU 484 RU 996] |
| | MRU 2 | RU 996 + RU 484 + RU 242; [RU 242 empty-RU 242 RU 484 RU 996] |
| | MRU 3 | RU 996 + RU 484 + RU 242; [RU 484 empty-RU 242 RU 242 RU 996] |
| | MRU 4 | RU 996 + RU 484 + RU 242; [RU 484 RU 242 empty-RU 242 RU 996] |
| | MRU 5 | RU 996 + RU 484 + RU 242; [RU 996 empty-RU 242 RU 242 RU 484] |
| | MRU 6 | RU 996 + RU 484 + RU 242; [RU 996 RU 242 empty-RU 242 RU 484] |
| | MRU 7 | RU 996 + RU 484 + RU 242; [RU 996 RU 484 empty-RU 242 RU 242] |
| | MRU 8 | RU 996 + RU 484 + RU 242; [RU 996 RU 484 RU 242 empty-RU 242] |

TABLE 7(4b)

| MRU type (MRU type) | MRU index (MRU index) | MRU combination (MRU combination) Note: empty indicates that a value is empty |
|---|---|---|
| 2 x RU 996 + RU 484 | MRU 1 | 2 x RU 996 + RU 484; [empty-RU 484 RU 484 RU 996 RU 996 empty-RU 996] |
| | MRU 2 | 2 x RU 996 + RU 484; [RU 484 empty-RU 484 RU 996 RU 996 empty-RU 996] |
| | MRU 3 | 2 x RU 996 + RU 484; [RU 996 empty-RU 484 RU 484 RU 996 empty-RU 996] |
| | MRU 4 | 2 x RU 996 + RU 484; [RU 996 RU 484 empty-RU 484 RU 996 empty-RU 996] |
| | MRU 5 | 2 x RU 996 + RU 484; [RU 996 RU 996 empty-RU 484 RU 484 empty-RU 996] |
| | MRU 6 | 2 x RU 996 + RU 484; [RU 996 RU 996 RU 484 empty-RU 484 empty-RU 996] |
| | MRU 7 | 2 x RU 996 + RU 484; [empty-RU 996 empty-RU 484 RU 484 RU 996 RU 996] |
| | MRU 8 | 2 x RU 996 + RU 484; [empty-RU 996 RU 484 empty-RU 484 RU 996 RU 996] |

TABLE 7(4b)-continued

| MRU type (MRU type) | MRU index (MRU index) | MRU combination (MRU combination) Note: empty indicates that a value is empty |
|---|---|---|
|  | MRU 9 | 2 x RU 996 + RU 484; [empty-RU 996 RU 996 empty-RU 484 RU 484 RU 996] |
|  | MRU 10 | 2 x RU 996 + RU 484; [empty-RU 996 RU 996 RU 484 empty-RU 484 RU 996] |
|  | MRU 11 | 2 x RU 996 + RU 484; [empty-RU 996 RU 996 RU 996 empty-RU 484 RU 484] |
|  | MRU 12 | 2 x RU 996 + RU 484; [empty-RU 996 RU 996 RU 996 RU 484 empty-RU 484] |
| 3 x RU 996 | MRU 1 | 3 x RU 996; [empty-RU 996 RU 996 RU 996 RU 996] |
|  | MRU 2 | 3 x RU 996; [RU 996 empty-RU 996 RU 996 RU 996] |
|  | MRU 3 | 3 x RU 996; [RU 996 RU 996 empty-RU 996 RU 996] |
|  | MRU 4 | 3 x RU 996; [RU 996 RU 996 RU 996 empty-RU 996] |
| 3 x RU 996 + RU 484 | MRU 1 | 3 x RU 996 + RU 484; [empty-RU 484 RU 484 RU 996 RU 996 RU 996] |
|  | MRU 2 | 3 x RU 996 + RU 484; [RU 484 empty-RU 484 RU 996 RU 996 RU 996] |
|  | MRU 3 | 3 x RU 996 + RU 484; [RU 996 empty-RU 484 RU 484 RU 996 RU 996] |
|  | MRU 4 | 3 x RU 996 + RU 484; [RU 996 RU 484 empty-RU 484 RU 996 RU 996] |
|  | MRU 5 | 3 x RU 996 + RU 484; [RU 996 RU 996 empty-RU 484 RU 484 RU 996] |
|  | MRU 6 | 3 x RU 996 + RU 484; [RU 996 RU 996 RU 484 empty-RU 484 RU 996] |
|  | MRU 7 | 3 x RU 996 + RU 484; [RU 996 RU 996 RU 996 empty-RU 484 RU 484] |
|  | MRU 8 | 3 x RU 996 + RU 484; [RU 996 RU 996 RU 996 RU 484 empty-RU 484] |

It should be understood that mapping relationships between indexes and RUs/MRUs in the tables provided in embodiments of this application, such as Table 7(1), Table 7(2), Table 7(2a), Table 7(2b), Table 7(2c), Table 7(2d), Table 7(3), Table 7(4a), and Table 7(4b), are merely examples. In specific implementation, other table forms may be derived based on the technical solutions provided in embodiments of this application, which falls within the protection scope of embodiments of this application.

A value in an AID subfield included in the first user information field is a first preset value. The first preset value may be 2046, 4095, or a reserved value. The reserved value may be anyone of 2008 to 2044 or 2047 to 4094.

In a possible design, the first preset value is a reserved value, for example, 2044. In this case, other remaining bits in the first user information field other than the AID subfield are not used.

In another possible design, the first preset value is 4095, and there are two manners below:

Manner 1: The first user information field may include a first indication subfield, and a value of the first indication subfield is a first value. In this case, other remaining bits in the first user information field other than the AID subfield and the first indication subfield are not used.

It may be understood that the conventional technology defines that the user information field whose value in the AID subfield is 4095 is a field used to fill the trigger frame. However, this application further defines that the user information field whose value in the AID subfield is 4095 may be further used as the first user information field. Therefore, to prevent the first station from confusing a function of the user information field whose value in the AID subfield is 4095, this application provides the following solution: The user information field whose value in the AID subfield is 4095 includes the first indication subfield, and the first indication subfield indicates the function of the user information field whose value in the AID subfield is 4095. Specifically, if the value of the first indication subfield is the first value, for example, 0, the user information field whose value in the AID subfield is 4095 is a user information field used to fill the trigger frame; and if the value of the first indication subfield is a second value, for example, 1, the user information field whose value in the AID subfield is 4095 is the first user information field.

Manner 2: The user information field whose value in the AID subfield is 4095 is a first user information field, but is still a user information field used for padding for the second station. In addition, the user information field used for padding for the first station is added. For the first station, a value in an AID subfield of the user information field used for padding may be any one of reserved values, for example, 4094.

When the first preset value is 4095, and when the first user information field uses Design 1, the second station may consider the first user information field as a user information field used to fill the trigger frame. To be specific, after the second station reads the first user information field, the second station does not parse a user information field after the first user information field, so that the second station can reduce energy consumption.

In another possible design, the first preset value is 2046, the first user information field may include a second indication subfield, and a value of the second indication subfield is a third value. The second indication subfield may reuse the resource unit allocation subfield, and the third value is a reserved value of the resource unit allocation subfield in the conventional technology, in other words, the third value may be any integer value of 121 to 127. For example, the third value may be 127. In this case, other remaining bits in the first user information field other than the AID subfield and the second indication subfield are not used.

It may be understood that the conventional technology defines that a user information field whose value in the AID subfield is 2046 is a user information field used to indicate an unallocated resource unit. However, this application further defines that the user information field whose value in the AID subfield is 2046 may be used as the first user information field. Therefore, to prevent the first station from confusing a function of the user information field whose value in the AID subfield is 2046, this application provides the following solution: The user information field whose value in the AID subfield is 2046 includes the second indication subfield, and the second indication subfield indicates the function of the user information field whose value in the AID subfield is 2046. Specifically, if the value of the second indication subfield is the third value, the second indication subfield indicates that the user information field whose value in the AID subfield is 2046 is the first user information field; and if the value of the second indication subfield is a non-third value, the second indication subfield indicates that the user information field whose value in the AID subfield is 2046 is the user information field used to indicate the unallocated resource unit.

If the second indication subfield reuses the resource unit allocation subfield, when a value of the resource unit allocation subfield is a non-third value, the resource unit allocation subfield indicates a frequency domain resource in a corresponding bandwidth.

The resource unit allocation subfield in the fourth user information field may be a resource allocation subfield in the user information field used to indicate the unallocated resource unit.

In this embodiment of this application, a quantity of bits occupied by the first user information field is the same as a quantity of bits occupied by a user information field corresponding to the second station in the 802.11ax standard.

In this embodiment of this application, if the trigger frame further includes the user information field corresponding to the second station, the second station may parse, according to a rule defined in the 802.11ax standard, the user information field corresponding to the second station.

A maximum transmission bandwidth supported by the 802.11ax standard is 160 MHz, and a maximum transmission bandwidth supported by the 802.11be standard is 320 MHz. When the uplink bandwidth is 320 MHz, the resource unit allocation subfield in the user information field of the trigger frame in the 802.11ax standard cannot accurately indicate a 160 MHz frequency domain in which a resource unit is located in a 320 MHz bandwidth. To resolve this problem, in the conventional technology, it is proposed that one bit be added to the resource unit allocation subfield in the user information field of the trigger frame, where the added bit indicates the 160 MHz frequency domain in which the resource unit is located. However, adding the bit to the resource unit allocation subfield in the user information field means adding a bit to the user information field. Consequently, a frame structure of the trigger frame is changed. A modified trigger frame is not compatible with the trigger frame in the 802.11ax standard. The second station cannot correctly parse the modified trigger frame. Consequently, the modified trigger frame cannot trigger the second station to perform uplink transmission. Therefore, how to ensure that a resource unit can be allocated to the first station on a 320 MHz channel by using the trigger frame and ensure that the trigger frame can normally trigger the second station to perform uplink transmission is an urgent problem to be resolved in the industry.

This technical problem can be resolved by using the foregoing implementation 1 for the trigger frame. Specifically, the first user information field exists in the user information list field of the trigger frame, and the first user information field may be used to determine a specific 160 MHz frequency domain in which a frequency domain resource indicated by a resource unit allocation subfield in another user information field is located, so that the resource unit is allocated to the first station in the 320 MHz frequency domain by using the trigger frame. In addition, one bit does not need to be added to the resource unit allocation subfield in the fourth user information field. This ensures that the trigger frame provided in this application can be compatible with the trigger frame in the 802.11ax standard.

Figure 63:
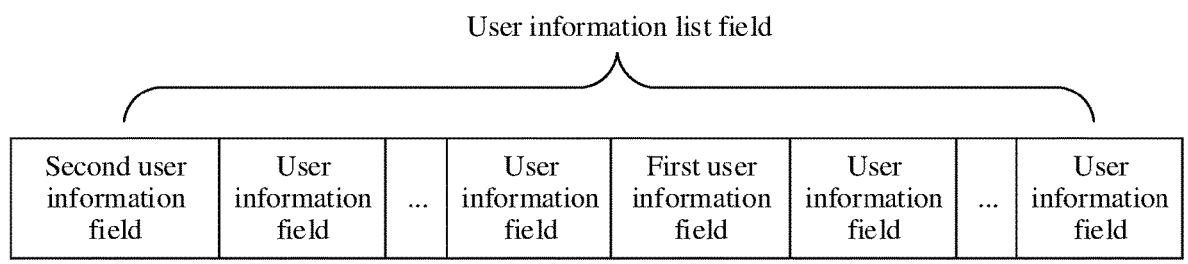
FIG. 63 is a schematic diagram of a structure of a user information list field according to an embodiment of this application.

Optionally, as shown in FIG. 63, the user information list field of the trigger frame may further include a second user information field. In the user information list field, the second user information field is located before the first user information field. If the fourth user information field is located before the first user information field and after the second user information field, a part or all of the frequency domain resource indicated by the resource unit allocation subfield included in the fourth user information field is located on the first 160 MHz channel. If the fourth user information field is located after the first user information field, a part or all of the frequency domain resource indicated by the resource unit allocation subfield included in the fourth user information field is located on the second 160 MHz channel.

Optionally, a value in an AID subfield included in the second user information field is a second preset value. The second preset value is not equal to the first preset value. The second preset value may be a reserved value. The reserved value may be any one of 2008 to 2044 or 2047 to 4094.

In this embodiment of this application, a quantity of bits occupied by the second user information field is the same as a quantity of bits occupied by a user information field corresponding to the second station in the 802.11ax standard. Other remaining bits in the second user information field other than the AID subfield are not used.

Figure 64:
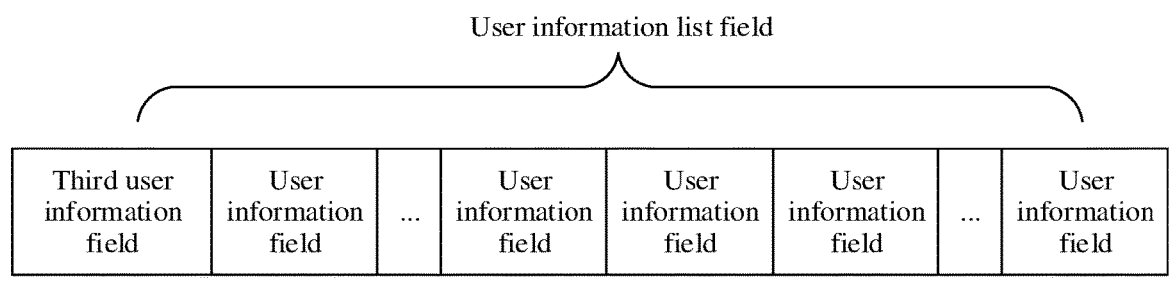
FIG. 64 is a schematic diagram of a structure of a user information list field according to an embodiment of this application.

Implementation 2: As shown in FIG. 64, the user information list field of the trigger frame includes a third user information field. The third user information field carries common information of the first station. In other words, the third user information field includes common information that needs to be read by the first station. The common information is used to support the first station to implement data transmission in a larger bandwidth (greater than a 160 MHz bandwidth).

Optionally, the third user information field includes one or more of the following:

(1) First subfield. The first subfield indicates the uplink bandwidth in combination with the uplink bandwidth subfield in the common information field of the trigger frame. The uplink bandwidth is a transmission bandwidth of an uplink PPDU.

In an optional design, the first subfield occupies one bit in the third user information field. In this case, that the first subfield indicates the uplink bandwidth in combination with the uplink bandwidth subfield in the common information field of the trigger frame may be specifically implemented as follows: when a value of the uplink bandwidth subfield is 0 and a value of the first subfield is a reserved value, the uplink bandwidth is 20 MHz; when the value of the uplink bandwidth subfield is 1 and the a value of first subfield is the reserved value, the uplink bandwidth is 40 MHz; when the value of the uplink bandwidth subfield is 2 and the a value of first subfield is the reserved value, the uplink bandwidth is 80 MHz; when the value of the uplink bandwidth subfield is 3 and the value of the first subfield is a fourth value, the uplink bandwidth is 160 MHz; and when the value of the uplink bandwidth subfield is 3 and the value of the first subfield is a fifth value, the uplink bandwidth is 320 MHz.

The fourth value is 0, and the fifth value is 1. Alternatively, the fourth value is 1, and the fifth value is 0.

In another optional design, the first subfield occupies two bits in the third user information field. In this case, that the first subfield indicates the uplink bandwidth in combination with the uplink bandwidth subfield in the common information field of the trigger frame may be specifically implemented as follows: when a value of the uplink bandwidth subfield is 0 and a value of the first subfield is a reserved value, the uplink bandwidth is 20 MHz; when the value of the uplink bandwidth subfield is 1 and the a value of first subfield is the reserved value, the uplink bandwidth is 40 MHz; when the value of the uplink bandwidth subfield is 2 and the a value of first subfield is the reserved value, the uplink bandwidth is 80 MHz; when the value of the uplink bandwidth subfield is 3 and the value of the first subfield is a sixth value, the uplink bandwidth is 160 MHz; when the value of the uplink bandwidth subfield is 3 and the value of the first subfield is a seventh value, the uplink bandwidth is 240 MHz; and when the value of the uplink bandwidth subfield is 3 and the value of the first subfield is an eighth value, the uplink bandwidth is 320 MHz.

The sixth value, the seventh value, and the eighth value are not equal to each other. The sixth value, the seventh value, and the eighth value may be selected from a set {0, 1, 2, 3}. For example, the sixth value is 0, the seventh value is 1, and the eighth value is 2.

Optionally, the first subfield may have another name, for example, an uplink bandwidth extension subfield. This embodiment of this application is not limited thereto.

(2) Second subfield. The second subfield indicates a puncturing pattern. It may be understood that the puncturing pattern is used to determine a punctured subchannel and an unpunctured subchannel on the 320 MHz channel. The punctured subchannel does not transmit a signal and includes a preamble and a data field. Optionally, a bandwidth granularity of the subchannel may be 20 MHz.

In a possible design, the second subfield includes an index of the puncturing pattern. In other words, a value of the second subfield is the index of the puncturing pattern.

It may be understood that M puncturing patterns may be specified in advance in the protocol, and the M puncturing patterns one-to-one correspond to M values of the second subfield, where M is an integer greater than or equal to 1. Therefore, the first station may determine a corresponding puncturing pattern based on a value of the second subfield.

In another possible design, the second subfield includes a bitmap. The bitmap includes K bits, where K is an integer greater than 1. The K bits one-to-one correspond to (320/K) subchannels in the 320 MHz channel, and values of the bits indicate whether (320/K) subchannels corresponding to the bits are punctured.

For example, the bitmap included in the second subfield occupies 16 bits. Each bit in the bitmap corresponds to a 20 MHz subchannel in the 320 MHz channel. If a value of a bit is 0, it indicates that a 20 MHz subchannel corresponding to the bit is punctured. If the value of the bit is 1, it indicates that the 20 MHz subchannel corresponding to the bit is not punctured.

Optionally, the second subfield may have another name, for example, a preamble puncturing indication subfield. This embodiment of this application is not limited thereto.

(3) Third subfield. The third subfield indicates the first station transmits whether an HE PPDU or an EHT PPDU on one or more frequency segments in the uplink bandwidth.

It may be understood that the second station can send only the HE PPDU. The first station may send both the HE PPDU and the EHT PPDU.

Design 1: If it is limited that only the primary 160 MHz channel can be used to hybridly transmit the HE PPDU and the EHT PPDU, and a bandwidth granularity for transmitting an uplink sub-PPDU is 80 MHz, the third subfield may occupy two bits. A first bit in the two bits corresponds to a first 80 MHz channel, and a second bit corresponds to a second 80 MHz channel. A value of the first bit indicates whether the HE PPDU or the EHT PPDU is transmitted on the first 80 MHz channel in the primary 160 MHz channel. A value of the second bit indicates whether the HE PPDU or the EHT PPDU is transmitted on the second 80 MHz channel in the primary 160 MHz channel.

For definitions of the first 80 MHz and the second 80 MHz, refer to the foregoing descriptions. Details are not described herein again.

For example, if the value of the first bit is 0, it indicates that the HE PPDU is transmitted on the first 80 MHz channel; and if the value of the first bit is 1, it indicates that the EHT PPDU is transmitted on the first 80 MHz.

Alternatively, if the value of the first bit is 0, it indicates that the EHT PPDU is transmitted on the first 80 MHz channel; and if the value of the first bit is 1, it indicates that the HE PPDU is transmitted on the first 80 MHz.

An example is used for description with reference to FIG. 65. It is assumed that a value of a bit is 0, indicating that the HE PPDU is to be transmitted; and the value of the bit is 1, indicating that the EHT PPDU is to be transmitted. If the third subfield is 01, it indicates that the first station transmits the HE PPDU on the primary 80 MHz channel in the primary 160 MHz, and the first station transmits the EHT PPDU on the secondary 80 MHz subchannel in the primary 160 MHz.

Design 2: If it is limited that only the primary 160 MHz channel can be used to hybridly transmit the HE PPDU and the EHT PPDU, and a bandwidth granularity for transmitting an uplink sub-PPDU is 160 MHz, the third subfield may occupy one bit. The one bit indicates whether the first station transmits the HE PPDU or the EHT PPDU in the primary 160 MHz.

Design 3: If it is limited that only the primary 160 MHz channel can be used to hybridly transmit the HE PPDU and the EHT PPDU, and a bandwidth granularity for transmitting an uplink sub-PPDU is 20 MHz, the third subfield may occupy eight bits. The eight bits one-to-one correspond to eight 20 MHz channels in the primary 160 MHz channel. A value of each bit indicates whether the first station transmits the HE PPDU or the EHT PPDU on a 20 MHz channel corresponding to the bit.

Based on the foregoing design 1 to design 3, the first station may transmit the EHT PPDU on the secondary 160 MHz channel by default.

Design 4: If the entire 320 MHz channel can be used to hybridly transmit the HE PPDU and the EHT PPDU, and a bandwidth granularity for transmitting an uplink sub-PPDU is 80 MHz, the third subfield may occupy four bits. The four bits one-to-one correspond to four 80 MHz channels in the 320 MHz bandwidth. A value of each bit indicates whether the first station transmits the HE PPDU or the EHT PPDU on an 80 MHz channel corresponding to the bit. It may be understood that if the uplink bandwidth is less than 320 MHz, a bit corresponding to an 80 MHz channel that is not in the uplink bandwidth may be ignored or not used.

Design 5: If the entire 320 MHz channel can be used to hybridly transmit the HE PPDU and the EHT PPDU, and a bandwidth granularity for transmitting an uplink sub-PPDU is 160 MHz, the third subfield may occupy two bits. The two bits one-to-one correspond to two 160 MHz channels in the 320 MHz bandwidth. A value of each bit indicates whether the first station transmits the HE PPDU or the EHT PPDU on a 160 MHz channel corresponding to the bit. It may be understood that if the uplink bandwidth is less than 320 MHz, a bit corresponding to a 160 MHz channel that is not in the uplink bandwidth may be ignored or not used.

Design 6: If the entire 320 MHz channel can be used to hybridly transmit the HE PPDU and the EHT PPDU, and a bandwidth granularity for transmitting an uplink sub-PPDU is 20 MHz, the third subfield may occupy 16 bits, and the 16 bits one-to-one correspond to 16 20 MHz channels in the 320 MHz bandwidth. A value of each bit indicates whether the first station transmits the HE PPDU or the EHT PPDU on a 20 MHz channel corresponding to the bit. It may be understood that if the uplink bandwidth is less than 320 MHz, a bit corresponding to a 20 MHz channel that is not in the uplink bandwidth may be ignored or not used.

It may be understood that if the uplink bandwidth is less than 320 MHz, a bit corresponding to a 20 MHz channel that is not in the uplink bandwidth may be ignored or not used.

Design 7:

(1) If it is limited that only the primary 160 MHz channel can be used to hybridly transmit the HE PPDU and the EHT PPDU, and a bandwidth granularity for transmitting an uplink sub-PPDU is 80 MHz, the third subfield may include two PHY PPDU version fields. A first PHY PPDU version field in the PHY PPDU version fields corresponds to a first 80 MHz channel, and a second PHY PPDU version field in the PHY PPDU version fields corresponds to a second 80 MHz channel. A value of the first PHY PPDU version field indicates whether the HE PPDU, the EHT PPDU, or a another next generation PPDU is transmitted on the first 80 MHz channel in the primary 160 MHz channel. A value of the second PHY PPDU version field indicates whether the HE PPDU, the EHT PPDU, or the another next-generation PPDU is transmitted on the second 80 MHz channel in the primary 160 MHz channel. Because the next generation PPDU is not determined currently, a corresponding value of the field is a reserved value.

For definitions of the first 80 MHz and the second 80 MHz, refer to the foregoing descriptions. Details are not described herein again.

For example, if the first PHY PPDU version field has three bits, and the value of the first PHY PPDU version field is 0 (000 in binary), it indicates that the HE PPDU is transmitted on the first 80 MHz channel; and if the value of the first PHY PPDU version is 1 (001 in binary), it indicates that the EHT PPDU is transmitted on the first 80 MHz.

Alternatively, if the value of the first PHY PPDU version field is 0, it indicates that the EHT PPDU is transmitted on the first 80 MHz channel; and if the value of the first bit is 7, it indicates that the HE PPDU is transmitted on the first 80 MHz.

An example is used for description with reference to FIG. 65. It is assumed that a value of the PHY PPDU version field is 0, indicating that the HE PPDU is to be transmitted; and the value of the PHY PPDU version field is 1, indicating that the EHT PPDU is to be transmitted. If the third subfield is 000 001, it indicates that the first station transmits the HE PPDU on the primary 80 MHz channel in the primary 160 MHz, and the first station transmits the EHT PPDU on the secondary 80 MHz subchannel in the primary 160 MHz.

(2) If it is limited that only the primary 160 MHz channel can be used to hybridly transmit the HE PPDU and the EHT PPDU, and a bandwidth granularity for transmitting an uplink sub-PPDU is 160 MHz, the third subfield may include one PHY PPDU version field. The one PHY PPDU version field indicates whether the first station transmits, in the primary 160 MHz, the HE PPDU, the EHT PPDU, or the another next-generation PPDU.

(3) If it is limited that only the primary 160 MHz channel can be used to hybridly transmit the HE PPDU and the EHT PPDU, and a bandwidth granularity for transmitting an uplink sub-PPDU is 20 MHz, the third subfield may include eight PHY PPDU version fields. The eight PHY PPDU version fields one-to-one correspond to eight 20 MHz channels in the primary 160 MHz channel. A value of each PHY PPDU version field indicates whether the first station transmits the HE PPDU, the EHT PPDU, or the another next-generation PPDU on a 20 MHz channel corresponding to the PHY PPDU version field.

Based on the foregoing (1) to (3), the first station may transmit the EHT PPDU on the secondary 160 MHz channel by default.

(4) If the entire 320 MHz channel can be used to hybridly transmit the HE PPDU and the EHT PPDU, and a bandwidth granularity for transmitting an uplink sub-PPDU is 80 MHz, the third subfield may include four PHY PPDU version fields. The four PHY PPDU version fields one-to-one correspond to four 80 MHz channels in the 320 MHz bandwidth. A value of each PHY PPDU version field indicates whether the first station transmits the HE PPDU, the EHT PPDU, or the next-generation PPDU on an 80 MHz channel corresponding to the PHY PPDU version field. It may be understood that, if the uplink bandwidth is less than 320 MHz, a PHY PPDU version field corresponding to an 80 MHz channel that is not in the uplink bandwidth may be ignored/omitted or not used.

(5) If the entire 320 MHz channel can be used to hybridly transmit the HE PPDU and the EHT PPDU, and a bandwidth granularity for transmitting an uplink sub-PPDU is 160 MHz, the third subfield may include two PHY PPDU version fields. The two PHY PPDU version fields one-to-one correspond to two 160 MHz channels in the 320 MHz bandwidth. A value of each PHY PPDU version field indicates whether the first station transmits the HE PPDU, the EHT PPDU, or the next-generation PPDU on a 160 MHz channel corresponding to the PHY PPDU version field. It may be understood that, if the uplink bandwidth is less than 320 MHz, a PHY PPDU version field corresponding to a 160 MHz channel that is not in the uplink bandwidth may be ignored/omitted or not used.

(6) If the entire 320 MHz channel can be used to hybridly transmit the HE PPDU and the EHT PPDU, and a bandwidth granularity for transmitting an uplink sub-PPDU is 20 MHz, the third subfield may include 16 PHY PPDU version fields. The 16 PHY PPDU version fields one-to-one correspond to 16 20 MHz channels in the 320 MHz bandwidth. A value of each PHY PPDU version field indicates whether the first station transmits the HE PPDU, the EHT PPDU, or the next-generation PPDU on a 20 MHz channel corresponding to the PHY PPDU version field. It may be understood that, if the uplink bandwidth is less than 320 MHz, a PHY PPDU version field corresponding to a 20 MHz channel that is not in the uplink bandwidth may be ignored/omitted or not used.

Devices in 802.11be may be classified into a first version and a second version. For ease of implementation of a station of the first version, it is proposed that an EHT AP of the first version does not support sending of a trigger frame for hybrid scheduling. In other words, an uplink PPDU scheduled by the trigger frame is an uplink HE PPDU (or referred to as an HE TB (trigger based) PPDU) or an uplink EHT TB PPDU (or referred to as an EHT TB (trigger based) PPDU) instead of their hybrid PPDUs or an aggregated PPDU (aggregated PPDU, A-PPDU). An EHT AP of the second version supports sending of a trigger frame for hybrid scheduling. In other words, an uplink PPDU scheduled by the trigger frame may be an aggregated PPDU (A-PPDU), may be the foregoing uplink HE PPDU, or may be the foregoing uplink EHT PPDU.

In the first version of the 802.11be standard:

If the uplink PPDU scheduled by the trigger frame is the uplink HE PPDU, a third subfield in the trigger frame indicates that uplink HE PPDUs are transmitted in all frequency segments. For example, in Design 1, if two bits in the third subfield are both set to "00" (where 0 represents the uplink HE PPDU, and 1 represents the uplink EHT PPDU), it indicates that the first station transmits the uplink HE PPDU in the primary 160 MHz. For another example, in Design 2, if one bit in the third subfield is set to "0" (where 0 represents the uplink HE PPDU, and 1 represents the uplink EHT PPDU), it indicates that the first station transmits the uplink HE PPDU in the primary 160 MHz.

If the uplink PPDU scheduled by the trigger frame is the uplink EHT PPDU, the third subfield needs to be set to a value for transmitting the uplink EHT PPDU on all frequency segments. In addition, in this case, the trigger frame cannot include a user information field of an HE station (in other words, the HE station is scheduled to transmit the uplink HE PPDU, to avoid that the uplink PPDU is an A-PPDU). For example, in Design 1, if two bits in the third subfield are both set to "11" (where 0 represents the uplink HE PPDU, and 1 represents the uplink EHT PPDU), it indicates that the first station transmits the uplink EHT PPDU in the primary 160 MHz. For another example, in Design 2, if one bit in the third subfield is set to "1" (where 0 represents the uplink HE PPDU, and 1 represents the uplink EHT PPDU), it indicates that the first station transmits the uplink EHT PPDU in the primary 160 MHz.

In the second version of the 802.11be standard, the uplink PPDU scheduled by the trigger frame may be the uplink HE PPDU, the uplink EHT PPDU, or the A-PPDU. In this case, a third subfield in the trigger frame may be set to any value, and no limitation is required.

On a station side, the first station determines, based on a resource unit allocation subfield in a user information field that matches an AID of the first station and that is in the received trigger frame and a third subfield, the uplink HE PPDU or the uplink EHT PPDU. The resource unit allocation subfield is used to determine a frequency segment in which a resource unit/a multi-resource unit combination allocated to the first station is located, and the resource unit allocation subfield includes 9 bits, which are specifically a bit BS, a bit B0, and other 7 bits.

That an 802.11ax station or 802.11ac station with 160 MHz bandwidth support may combine legacy preambles on each 20 MHz of 160 MHz, for example, an L-SIG field, or combine non-legacy preambles that are replicated and transmitted on each 20 MHz of 160 MHz, for example, an HE-SIG-A field in 802.11ax or a VHT-SIG-A field in 802.11ac is considered. Therefore, it is proposed that hybrid transmission of an uplink PPDU transmitted in the primary 160 MHz is not allowed, to prevent the 802.11ax station or 802.11ac station supporting 160 MHz from incorrectly receiving a preamble. In this case, a size of a frequency segment (the bandwidth granularity for transmitting the uplink sub-PPDU) of the third subfield needs to be 160 MHz, that is, corresponds to (2) and (6) in the foregoing designs 2, 6, and 7. Further, the first station determines, based on the bit BS in the resource unit allocation subfield in the user information field that matches the AID of the first station and that is in the received trigger frame and the third subfield, whether the uplink HE PPDU or the uplink EHT PPDU, where the bit BS indicates the primary 160 MHz or the secondary 160 MHz. The bit BS is specifically described as follows:

(I) If the bit BS in the resource unit allocation subfield is "0", that is, the primary 160 MHz, the first station determines, based on a value of that bit in the third subfield, an uplink PPDU to be transmitted. For example, if one bit in the third subfield is set to "1" (0 represents the uplink HE PPDU, and 1 represents the uplink EHT PPDU), the first station transmits the uplink EHT PPDU. For another example, if one bit in the third subfield is set to "0" (where 0 represents the uplink HE PPDU, and 1 represents the uplink HE PPDU), the first station transmits the uplink HE PPDU.

(II) If the bit BS in the resource unit allocation subfield is "1", that is, the secondary 160 MHz, the first station transmits the uplink EHT PPDU. It should be noted that the uplink HE PPDU is transmitted only on the primary 160 MHz, and is also used to be compatible with a transmission capability of an existing HE station, that is, the uplink HE PPDU can be transmitted only on the primary 160 MHz.

Alternatively, the bit BS may be as follows: (1) When a size of a resource unit/multi-resource unit combination indicated by the resource unit allocation subfield (9 bits) is less than or equal to 160 MHz, the bit BS indicates the primary 160 MHz or the secondary 160 MHz. (2) When the size of the resource unit/multi-resource unit combination indicated by the resource unit allocation subfield (9 bits) is greater than 160 MHz, the bit BS no longer indicates the primary 160 MHz or the secondary 160 MHz. In this case, the bit B0 in the resource unit allocation subfield may be jointly used. Optionally, one or more other bits of the resource unit allocation subfield may jointly indicate an allocated resource unit/multi-resource unit combination, including the multi-resource unit combinations in FIG. 7 (4b) and the 4×996 tone resource unit.

In Case (1), the first station determines, according to the foregoing descriptions of (I) and (II), which uplink PPDU (a type of the uplink PPDU, including the uplink HE PPDU and the uplink EHT PPDU) is to be transmitted.

In Case (2), that currently only the EHT PPDU supports transmission on a resource unit/multi-resource unit combination greater than 160 MHz (the uplink HE PPDU does not support transmission on the resource unit/multi-resource unit combination greater than 160 MHz) is considered. Therefore, in this case, the first station transmits the uplink EHT PPDU on the allocated resource unit/multi-resource unit combination. However, the first station needs to determine, by using the resource unit allocation subfield, including one or more of the bit BS, the bit B0, and the other seven bits, whether the size of the allocated resource unit/multi-resource unit combination is greater than 160 MHz, that is, distinguish Case (1) from Case (2), to determine, according to the method in Case (1) and Case (2), which uplink PPDU is to be transmitted.

To help the first station simply determine the type of uplink PPDU to be transmitted, the first station determines, based on the bit BS in the resource unit allocation subfield in the user information field that matches the AID of the first station and that is in the received trigger frame and the third subfield, the uplink HE PPDU or the uplink EHT PPDU without distinguishing Case (1) or Case (2). Details are as follows:

In Case (1), the first station still determines, according to the foregoing descriptions of (I) and (II), the type of the uplink PPDU to be transmitted.

In Case (2), that the bit BS may indicate that the allocated resource unit/multi-resource unit combination definitely includes the primary 160 MHz resource unit in the 320 MHz bandwidth is considered. In this case, if the bit BS is "0", the first station may further determine, based on the bit of the third subfield in Design 2, the type of the uplink PPDU to be transmitted, which complies with the description of (I). If the bit BS is "1", the size of the allocated resource unit is greater than 160 MHz, the and first station transmits the uplink EHT PPDU, which complies with the description of (II). In other words, in this case, the first station still determines, according to the foregoing descriptions of (I) and (II), the type of the uplink PPDU to be transmitted.

Therefore, without distinguishing Case (1) from Case (2), after receiving the trigger frame, the first station determines, according to the foregoing descriptions of (I) and (II), the type of the uplink PPDU to be transmitted.

Optionally, the third user information field of the trigger frame may not include the third subfield. When the third user information field does not include the third subfield, the station transmits the PPDU based on a latest capability of the station. For example, the first station may transmit the EHT PPDU by default. In this case, the first station transmits the EHT PPDU. A general field in a physical layer preamble includes a PHY version identifier field, and a value of the PHY version identifier field is set to a value corresponding to the EHT PPDU, for example, "0". For another example, a subsequent enhanced version of the first station may be scheduled to transmit the uplink EHT PPDU or the uplink HE PPDU. For a specific method, refer to the descriptions related to the third subfield.

Optionally, the third subfield may have another name, for example, an EHT/HE indication field. This embodiment of this application is not limited thereto.

In addition, after the AP sends the trigger frame, the trigger frame may include one or more of a user information field that solicits an HE PPDU from the HE station, and a user information field that solicits an EHT/HE PPDU from an EHT station, for example, include both a user information field used to schedule the HE station and a user information field used to schedule the EHT station. The station responds to an uplink multi-user PPDU, and a parameter of the general field (or referred to as a general signal field) of the physical layer preamble of the uplink EHT PPDU (an EHT PPDU part shown in FIG. 65) included in the uplink multi-user PPDU is obtained from the received trigger frame, for example, the uplink bandwidth. In addition, the general field of the uplink EHT PPDU includes fields such as a PHY (physical layer, physical layer) version identifier field, a TXOP (transmit opportunity, transmit opportunity) field, a BSS (basic service set, basic service set) color field, a cyclic redundancy code field, and a tail bit field. The PHY version identifier field in the general field in the physical layer preamble of the uplink EHT PPDU (or referred to as a sub-EHT PPDU) that is sent by the EHT station (the first station) in response to the trigger frame may be obtained from the third subfield in the trigger frame. Details are as follows:

(1) One of Design 1 to Design 6 is used for the trigger frame. If the third subfield of the trigger frame indicates that the HE PPDU is transmitted in one of the frequency segments, the EHT station transmits the HE PPDU in the frequency segment. The physical layer preamble, such as a high efficient signal field A, does not carry the PHY version identifier, which is the same as that in 802.11ax. If the third subfield of the trigger frame indicates that the EHT PPDU is transmitted in one of the frequency segments, the EHT station transmits the HE PPDU in the frequency segment, where the HE PPDU carries the PHY version identifier field (for example, 3 bits), and the PHY version identifier field is set to a value corresponding to the EHT PPDU, for example, "0".

For example, in Design 1, an example is used for description with reference to FIG. 65. It is assumed that a value of a bit is 0, indicating that the HE PPDU is to be transmitted; and the value of the bit is 1, indicating that the EHT PPDU is to be transmitted. If the third subfield is 01, it indicates that the first station transmits the HE PPDU on the primary 80 MHz channel in the primary 160 MHz, where the physical layer preamble does not include the PHY version identifier field. The first station transmits the EHT PPDU on the secondary 80 MHz subchannel in the primary 160 MHz. The general field in the physical layer preamble includes the PHY version identifier field, and the value of the PHY version identifier field is set to the value corresponding to the EHT PPDU, for example, "0".

For another example, in Design 2, it is assumed that a value of a bit is 0, indicating that the HE PPDU is to be transmitted; and the value of the bit is 1, indicating that the EHT PPDU is to be transmitted. For example, if the third subfield is 0, the first station transmits the HE PPDU on the primary 160 MHz channel, and the physical layer preamble does not include the PHY version identifier field. For example, if the third subfield is 1, the first station transmits the EHT PPDU on the primary 160 MHz channel. The general field in the physical layer preamble includes the PHY version identifier field, and the value of the PHY version identifier field is set to the value corresponding to the EHT PPDU, for example, "0".

(2) Design 7 is used for the trigger frame. If the third subfield of the trigger frame carries a PHY version identifier field corresponding to each frequency segment, the EHT station transmits, in the frequency segment, a PPDU type indicated by the PHY version identifier field. If the PHY version identifier field indicates the HE PPDU, the physical layer preamble of the HE PPDU, for example, a high efficient signal field A, does not carry the PHY version identifier, which is the same as that in 802.11ax. If the PHY version identifier field indicates the EHT PPDU, the EHT station transmits the EHT PPDU in the frequency segment, and directly copies a PHY version identifier field (for example, 3 bits) corresponding to the frequency segment in the trigger frame, for example, a value "0". If the PHY version identifier field indicates a next-generation PPDU of the EHT PPDU, a next-generation station of the EHT transmits the next-generation PPDU of the EHT in the frequency segment, and directly copies a PHY version identifier field (for example, 3 bits) corresponding to the frequency segment in the trigger frame, for example, a value "1".

(4) Fourth subfield. The fourth subfield indicates a spatial reuse parameter supporting 320 MHz bandwidth transmission.

Optionally, the fourth subfield may have another name, for example, an uplink spatial reuse extension field. This embodiment of this application is not limited thereto.

It may be understood that the third user information field may further carry another field. This embodiment of this application is not limited thereto.

In this embodiment of this application, the third user information field further includes an AID subfield. A value in the AID subfield is a third preset value. The third preset value may be a reserved value in an AID subfield in the conventional technology. In other words, the third preset value may be any one of 2008 to 2044 or 2047 to 4094.

Optionally, the third user information field may be a first user information field in the user information field list. In this way, after receiving the trigger frame, the first station may first parse out, from the third user information field, the common information that needs to be read. This helps reduce a processing delay of the first station.

Optionally, when the first user information field and the third user information field are a same user information field, the first preset value is equal to the third preset value. Otherwise, the first preset value is not equal to the third preset value.

It may be understood that when the first user information field and the third user information field are implemented as one user information field, other bits in the user information field other than the AID subfield are used to carry signaling that needs to be carried by the first user information field and the third user information field, to implement functions of the first user information field and the third user information field.

Optionally, when the second user information field and the third user information field are a same user information field, the second preset value is equal to the third preset value. Otherwise, the second preset value is not equal to the third preset value.

It may be understood that when the second user information field and the third user information field are implemented as one user information field, other bits in the user information field other than the AID subfield are used to carry signaling that needs to be carried by the second user information field and the third user information field, to implement functions of the second user information field and the third user information field.

Optionally, the third user information field may be a first user information field in the user information field list. In this way, after receiving the trigger frame, the first station may first parse out, from the third user information field, the common information that needs to be read. This helps reduce a processing delay of the first station.

It may be understood that the third user information field reuses the first user information field or the second user information field, so that signaling overheads can be reduced.

In this embodiment of this application, a quantity of bits occupied by the third user information field is the same as the quantity of bits occupied by the user information field corresponding to the second station in the 802.11ax standard.

The maximum transmission bandwidth supported by the 802.11ax standard is 160 MHz, and the maximum transmission bandwidth supported by the 802.11be standard is 320 MHz. The 802.11be standard requires that the trigger frame can provide, to the first station, common information supporting 320 MHz bandwidth transmission. However, currently, a common information field of the trigger frame in the 802.11ax standard does not have sufficient reserved bits to carry more common information. Consequently, a quantity of bits of the common information field of the trigger frame may need to be added. However, adding the quantity of bits to the common information field of the trigger frame is equivalent to modifying the structure of the trigger frame. In this way, the modified trigger frame is not compatible with the trigger frame in the 802.11ax standard. Consequently, the modified trigger frame cannot trigger the second station to perform uplink transmission. Therefore, how to enable the trigger frame to carry more common information that needs to be read by first station without adding the quantity of bits occupied by the common information field of the trigger frame is a technical problem to be urgently resolved in the industry.

This technical problem can be resolved by using the foregoing implementation 2 for the trigger frame. Specifically, the trigger frame uses the third user information field to carry the extra common information that needs to be read by the first station, so that the quantity of bits does not need to be added to the common information field of the trigger frame, thereby ensuring that the trigger frame provided in this application can be compatible with the trigger frame in the 802.11ax standard. In other words, the trigger frame provided in this application may trigger the first station to perform uplink transmission, and may also trigger the second station to perform uplink transmission.

Optionally, the common information of the first station carried in the third user information field may not be carried in the third user information field, but is carried in a 9-bit uplink HE-SIG-A2 reserved field in the trigger frame. Based on this solution, the quantity of bits of the common information field of the trigger frame provided in this application is consistent with the quantity of bits of the common information field of the trigger frame in the 802.11ax standard. In this way, in addition to a reserved field or reserved values of some fields, the trigger frame provided in this application does not change meanings of existing fields.

Implementation 3: The user information list field in the trigger frame includes the user information field corresponding to the first station, and the user information field corresponding to the first station includes a spatial stream allocation subfield. When the spatial stream allocation subfield is applied to MU-MIMO, the spatial stream allocation subfield includes a spatial stream start sequence number field and a number of spatial streams field. The number of streams in which a single user participates in MU-MIMO is limited, for example, a maximum number is 4. In this case, the spatial stream allocation subfield occupies four bits, and indicates a start sequence number of a spatial stream used by the station. The number of spatial streams field occupies two bits, and indicates the number of spatial streams used by the station. When the spatial stream allocation subfield is applied to SU or SU-MIMO, the spatial stream allocation subfield indicates the number of spatial streams.

The 802.11ax standard supports a maximum of eight spatial streams, while the 802.11be standard supports a maximum of 16 spatial streams. The spatial stream start sequence number field in the spatial stream allocation subfield in the 802.11ax standard occupies three bits, and cannot indicate 16 spatial stream sequence numbers. Therefore, the spatial stream allocation subfield in the 802.11ax standard cannot support spatial stream allocation of 16 spatial streams.

Based on Implementation 3, in this application, the spatial stream start sequence number field is increased from 3 bits to 4 bits, so that the spatial stream start sequence number field occupying 4 bits can indicate any start location of 16 spatial streams; and the number of spatial streams field is decreased from 3 bits to 2 bits, to limit a maximum number of streams of a user participating in MU-MIMO to 4. In this way, on a premise that a quantity of bits occupied by the spatial stream allocation subfield remains unchanged, the spatial stream allocation subfield can support spatial stream allocation of 16 spatial streams.

Implementation 4: The common information field in the trigger frame includes a Doppler subfield and a number of HE-LTF/EHT-LTF symbols and midamble periodicity subfield. The Doppler subfield occupies one bit, and the number of HE-LTF/EHT-LTF symbols and midamble periodicity subfield occupies three bits. The Doppler subfield and the number of HE-LTF/EHT-LTF symbols and midamble periodicity subfield are used in the following manner:

If a value of the Doppler subfield is 0, and a value of the number of HE-LTF/EHT-LTF symbols and midamble periodicity subfield is 0, the number of HE-LTF/EHT-LTF symbols and midamble periodicity subfield indicates that the number of HE-LTF/EHT-LTF symbols is 1; if the value of the Doppler subfield is 0, and the value of the number of HE-LTF/EHT-LTF symbols and midamble periodicity subfield is 1, the number of HE-LTF/EHT-LTF symbols and midamble periodicity subfield indicates that the number of HE-LTF/EHT-LTF symbols is 2; if the value of the Doppler subfield is 0, and the value of the number of HE-LTF/EHT-LTF symbols and midamble periodicity subfield is 2, the number of HE-LTF/EHT-LTF symbols and midamble periodicity subfield indicates that the number of HE-LTF/EHT-LTF symbols is 4; if the value of the Doppler subfield is 0, and the value of the number of HE-LTF/EHT-LTF symbols and midamble periodicity subfield is 3, the number of HE-LTF/EHT-LTF symbols and midamble periodicity subfield indicates that the number of HE-LTF/EHT-LTF symbols is 6; if the value of the Doppler subfield is 0, and the value of the number of HE-LTF/EHT-LTF symbols and midamble periodicity subfield is 4, the number of HE-LTF/EHT-LTF symbols and midamble periodicity subfield indicates that the number of HE-LTF/EHT-LTF symbols is 8; if the value of the Doppler subfield is 0, and the value of the number of HE-LTF/EHT-LTF symbols and midamble periodicity subfield is 5, the number of HE-LTF/EHT-LTF symbols and midamble periodicity subfield indicates that the number of EHT-LTF symbols is a ninth value; or a value 5 of the number of HE-LTF/EHT-LTF symbols and midamble periodicity subfield is a reserved value; if the value of the Doppler subfield is 0, and the value of the number of HE-LTF/EHT-LTF symbols and midamble periodicity subfield is 6, the number of HE-LTF/EHT-LTF symbols and midamble periodicity subfield indicates that the number of EHT-LTF symbols is a tenth value; or a value 6 of the number of HE-LTF/EHT-LTF symbols and midamble periodicity subfield is a reserved value; and if the value of the Doppler subfield is 0, and the value of the number of HE-LTF/EHT-LTF symbols and midamble periodicity subfield is 7, the number of HE-LTF/EHT-LTF symbols and midamble periodicity subfield indicates that the number of EHT-LTF symbols is an eleventh value; or a value 7 of the number of HE-LTF/EHT-LTF symbols and midamble periodicity subfield is a reserved value.

The ninth value, the tenth value, and the eleventh value are not equal to each other.

Design 1: The ninth value, the tenth value, and the eleventh value may be selected from a set {10, 12, 14, 16}. For example, the ninth value is 10, the tenth value is 12, and the eleventh value is 16. Alternatively, the ninth value is 10, the tenth value is 16, and the eleventh value does not exist.

Design 2: The ninth value is 10, the tenth value is 12, and the eleventh value is an integer greater than or equal to 14.

Based on Design 2, a number of EHT-LTF symbols extension field needs to be added to the trigger frame. Specifically, when the value of the number of HE-LTF/EHT-LTF symbols and midamble periodicity subfield is less than 7, the number of EHT-LTF symbols extension field is not used. When the value of the number of HE-LTF/EHT-LTF symbols extension field and midamble periodicity subfield is 7, when a value of the number of EHT-LTF symbols extension field is a twelfth value, the number of EHT-LTF symbols extension field indicates that the number of EHT-LTF symbols is 14; and when the value of the number of EHT-LTF symbols extension field is a thirteenth value, the number of EHT-LTF symbols extension field indicates that the number of EHT-LTF symbols is 16.

For example, the twelfth value is 0, and the thirteenth value is 1; or the twelfth value is 1, and the thirteenth value is 1.

Optionally, the number of EHT-LTF symbols extension field may be carried in the third user information field, or may be carried in the 9-bit uplink HE-SIG-A2 reserved field in the trigger frame.

It may be understood that the number of HE-LTF/EHT-LTF symbols and midamble periodicity subfield in the trigger frame provided in this application is similar to a number of HE-LTF symbols and midamble periodicity subfield in the trigger frame in the 802.11ax standard.

If the trigger frame provided in this application includes the user information field corresponding to the second station, when the value of the Doppler subfield is 0, the value of the number of HE-LTF/EHT-LTF symbols and midamble periodicity subfield is less than or equal to 4. If the trigger frame provided in this application includes only the user information field corresponding to the first station, and does not include the user information field corresponding to the second station, when the value of the Doppler subfield is 0, the value of the number of HE-LTF/EHT-LTF symbols and midamble periodicity subfield may be any value of 0 to 7.

S102: The AP sends the trigger frame. Correspondingly, the station receives the trigger frame.

The trigger frame is used to schedule one or more stations to send a response frame, and the response frame may be a data frame, a management frame, or a control frame.

S103: The station parses the trigger frame.

If the station is the second station, when the trigger frame includes the user information field corresponding to the second station, the second station parses, in a parsing manner defined in the 802.11ax standard, the common information field in the trigger frame and the user information field corresponding to the second station. If the station is the first station, when the trigger frame includes the user information field corresponding to the first station, the first station parses, in a parsing manner defined in the 802.11be standard, the common information field in the trigger frame and the user information field corresponding to the first station.

If an AID in the user information field in the trigger frame matches the AID of the station, the station sends the response frame based on the common information field in the trigger frame and the user information field that matches the AID of the station, where the response frame is sent on a frequency domain resource indicated by the resource unit allocation subfield in the user information field that matches the AID of the station.

Correspondingly, the AP receives the response frame sent by the one or more stations, and replies with an acknowledgment frame. The acknowledgment frame sent to the one or more stations may be sent in a downlink OFDMA form, or may be sent in a non-HT replication transmission form. The acknowledgment frame further includes an Ack frame and a Block Ack frame, and the Block Ack frame includes a compressed Block Ack frame and a Multi-STA Block Ack frame. The Ack frame and the Block Ack frame are acknowledgment information of information sent to one station, and the Multi-STA Block Ack is acknowledgment information of information sent to one or more stations.

Based on the method shown in FIG. 8, the trigger frame provided in this application may be compatible with the trigger frame in the 802.11ax standard. Therefore, the trigger frame provided in this application may trigger the first station to perform uplink transmission, and may also trigger the second station to perform uplink transmission.

In the 802.11ax standard, the AP may send a downlink multi-user PPDU, for example, OFDMA, full-bandwidth MU-MIMO, or a combination of OFDMA and MU-MIMO. The downlink multi-user PPDU may include MAC frames corresponding to a plurality of stations. The MAC frame corresponding to the station includes a TRS control field, and the TRS control field includes a control information field. As shown in FIG. 66, the control information field includes an UL data symbols (UL data symbols) subfield, a resource unit allocation subfield, an AP TX power (AP TX power) field, an UL target RSSI (UL target RSSI) field, an UL MCS (UL MCS) field, and a reserved bit.

The control information field includes the resource unit allocation subfield. For implementation of the resource unit allocation subfield in the control information field, refer to the foregoing resource unit allocation subfield in the user information field in the 802.11ax standard.

The maximum transmission bandwidth supported by the 802.11ax standard is 160 MHz, and the maximum transmission bandwidth supported by the 802.11be standard is 320 MHz. Therefore, when the uplink bandwidth is 320 MHz, the resource unit allocation subfield in the control information field in the 802.11ax standard cannot accurately indicate whether the resource unit is on the primary 160 MHz channel or the secondary 160 MHz channel. In addition, to ensure compatibility with the 802.11ax standard, no bit can be added to the control information field. Therefore, how to enable the resource unit allocation subfield in the control information field to be used for resource allocation in the 320 MHz bandwidth without adding a quantity of bits to the control information field is a technical problem to be urgently resolved in the industry.

To resolve the technical problem, an embodiment of this application provides a communication method. As shown in FIG. 67, the method includes the following steps.

S201: An AP generates a downlink PPDU. The downlink PPDU includes a downlink multi-user PPDU including an OFDMA PPDU and a MU-MIMO PPDU.

The downlink PPDU includes a MAC frame corresponding to one or more first stations. The MAC frame corresponding to the first station includes a TRS control field, the TRS control field includes a control information field, the control information field includes a resource unit allocation subfield, and the resource unit allocation subfield is used to allocate a resource unit used by the first station.

In this embodiment of this application, the resource unit allocation subfield includes the following two implementations:

Implementation 1: The resource unit allocation subfield occupies eight bits in the control information field. Specifically, the resource unit allocation subfield occupies bits B5 to B12 in the control information field.

In a possible design, all or a part of a frequency domain resource indicated by the resource unit allocation subfield is located on a 160 MHz channel for transmitting the MAC frame that carries the resource unit allocation subfield in the TRS control field. If a frequency domain resource for transmitting the MAC frame that carries the resource unit allocation subfield in the TRS control field is greater than 160 MHz, a part of the frequency domain resource indicated by the resource unit allocation subfield is located in the 80 MHz or a part of the frequency domain resource indicated by the resource unit allocation subfield is located in the 160 MHz. It should be noted that an 8-bit resource unit allocation subfield can indicate any frequency domain resource that is in a 320 MHz bandwidth and that is partially located in the 80 MHz. In other words, if the MAC frame is transmitted on a first 160 MHz channel, all or a part of the frequency domain resource indicated by the resource unit allocation subfield carried in the MAC frame is located on the first 160 MHz channel. If the MAC frame is transmitted on a second 160 MHz channel, all or a part of the frequency domain resource indicated by the resource unit allocation subfield carried in the MAC frame is located on the second 160 MHz channel.

In another possible design, all or a part of a frequency domain resource indicated by the resource unit allocation subfield is located on an 80 MHz channel for transmitting the MAC frame that carries the resource unit allocation subfield in the TRS control field. If a frequency domain resource for transmitting the MAC frame that carries the resource unit allocation subfield in the TRS control field is greater than 80 MHz, a part of the frequency domain resource indicated by the resource unit allocation subfield is located in 80 MHz.

Based on Implementation 1, for specific implementation of the resource unit allocation subfield, refer to the foregoing related descriptions of the resource unit allocation subfield in the fourth user information field.

Implementation 2: The resource unit allocation subfield occupies nine bits in the control information field. Specifically, the resource unit allocation subfield occupies bits B5 to B12, and a bit B25 or another bit such as a bit B39 in the control information field.

The resource unit allocation subfield may be divided into two parts. A first part of the resource unit allocation subfield includes eight bits. A second part of the resource unit allocation subfield includes one bit. For example, the first part of the resource unit allocation subfield may occupy the bits B5 to B12 in the control information field, and the second part of the resource unit allocation subfield may occupy the bit B25 or the another bit in the control information field. This embodiment of this application is not limited thereto.

In a possible design, the first part of the resource unit allocation subfield is used to allocate a frequency domain resource. The second part of the resource unit allocation subfield indicates whether the allocated frequency domain resource is located on a first 160 MHz or a second 160 MHz. If a part of the allocated frequency domain resource is located on one 160 MHz, in other words, a range of the frequency domain resource is greater than 160 MHz, there are three manners in this case. Manner 1: A part of the allocated frequency domain resource is located on the first 160 MHz by default. Manner 2: A part of the allocated frequency domain resource is located on the second 160 MHz. Manner 3: No limitation is imposed, and a part of the allocated frequency domain resource is located on the first 160 MHz or the second 160 MHz.

For example, when a value of the second part of the resource unit allocation subfield is 0, a part or all of the frequency domain resource indicated by the first part of the resource unit allocation subfield is located on the first 160 MHz channel; and when the value of the second part of the resource unit allocation subfield is 1, a part or all of a frequency domain resource indicated by the first part of the resource unit allocation subfield is located on the second 160 MHz channel.

Based on Implementation 2, for specific implementation of the first part of the resource unit allocation subfield, refer to the foregoing related descriptions of the resource unit allocation subfield in the user information field corresponding to the first station.

Optionally, the downlink PPDU may further include a MAC frame corresponding to one or more second stations.

S202: The AP sends the downlink PPDU. Correspondingly, the station receives the downlink PPDU.

S203: The station sends a response frame based on a TRS control field in the MAC frame in the received PPDU.

The response frame may be a data frame, a management frame, or a control frame. For example, the control frame is an acknowledgment frame.

In addition, an example in which the station is the second station is used. When the downlink PPDU carries the MAC frame corresponding to the second station, the second station parses, in a parsing manner defined in the 802.11ax standard, the MAC frame that corresponds to the second station and that is carried in the downlink PPDU. Therefore, the second station may determine, based on a resource unit allocation subfield carried in the MAC frame corresponding to the second station, a frequency domain resource allocated to the second station. An example in which the station is the first station is used. When the downlink PPDU carries the MAC frame corresponding to the first station, the first station parses, in a parsing manner defined in the 802.11be standard, the MAC frame that corresponds to the second station and that is carried in the downlink PPDU. Therefore, the first station may determine, based on the resource unit allocation subfield carried in the MAC frame corresponding to the first station, the frequency domain resource allocated to the first station. After the station determines the frequency domain resource allocated to the station, the station may send an uplink sub-PPDU on the allocated frequency domain resource. Therefore, the AP may receive an uplink multi-user PPDU including a plurality of uplink sub-PPDUs.

Based on the method shown in FIG. 67, on one hand, a quantity of bits occupied by the control information field provided in this application is the same as a quantity of bits occupied by a control information field in the 802.11ax standard, thereby ensuring compatibility with the 802.11ax standard. On the other hand, the resource unit allocation subfield in the control information field provided in this application may implement resource unit allocation in the 320 MHz bandwidth.

In this embodiment of this application, if a part of the frequency domain resource is located in an X MHz frequency segment, it indicates that a frequency domain resource span is greater than the X MHz frequency segment, where X=20, 40, 80, 160, or the like.

The foregoing mainly describes the solutions provided in embodiments of this application from a perspective of a communication apparatus. It may be understood that, to implement the foregoing functions, the communication apparatus includes corresponding hardware structures and/or software modules for performing the functions. A person skilled in the art should easily be aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the apparatus may be divided into functional modules based on the foregoing method examples. For example, each functional module may be obtained through division based on each corresponding function, or two or more functions may be integrated into one functional module. The integrated module may be implemented in a form of hardware, or may be implemented in a form of a software functional module. In embodiments of this application, division into modules is an example, and is merely logical function division. In actual implementation, another division manner may be used. An example in which each functional module is obtained through division based on each corresponding function is used below for description.

As shown in FIG. 68, an embodiment of this application provides a communication apparatus. The communication apparatus includes a processing module 101 and a communication module 102.

When the communication apparatus is used as an AP, the processing module 101 is configured to perform step S101 in FIG. 8 or step S201 in FIG. 67. The communication module 102 is configured to perform step S102 in FIG. 8 or step S202 in FIG. 67.

When the communication apparatus is used as a station, the processing module 101 is configured to perform step S103 in FIG. 8 or step S203 in FIG. 67. The communication module 102 is configured to perform step S102 in FIG. 8 or step S202 in FIG. 67.

Figure 69:
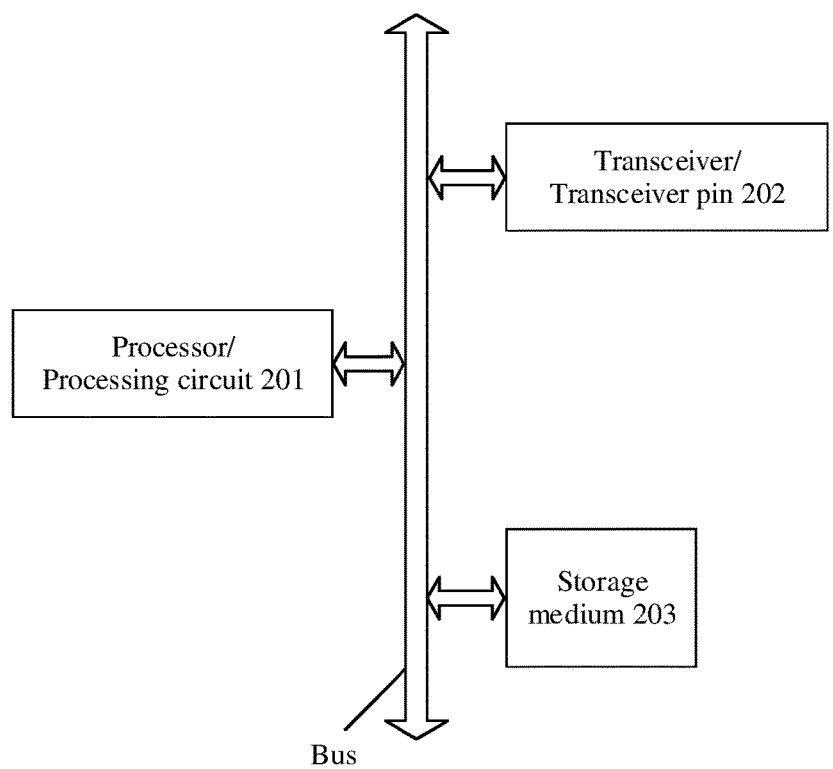
FIG. 69 is a schematic diagram of a structure of a communication apparatus according to an embodiment of this application.
Figure 70:
FIG. 70 to FIG. 81 are other schematic diagrams of large resource unit combinations in a 320 MHz bandwidth according to an embodiment of this application.
Figure 71:
Figure 72:
Figure 73:
Figure 74:
Figure 75:
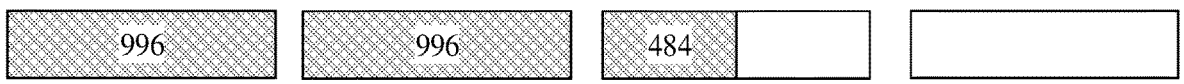
Figure 76:
Figure 77:
Figure 78:
Figure 79:
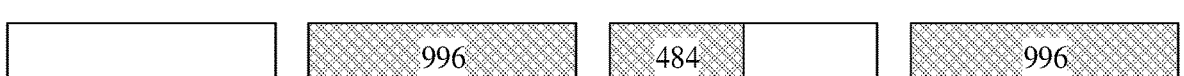
Figure 80:
Figure 81:
Figure 82:
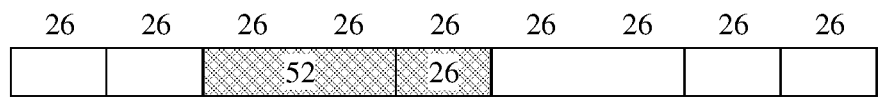
FIG. 82 to FIG. 85 are other schematic diagrams of small resource unit combinations according to an embodiment of this application.
Figure 83:
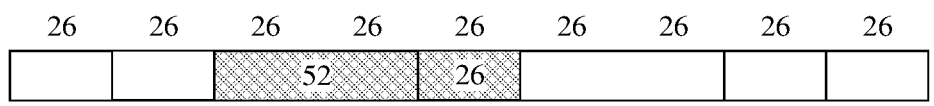
Figure 84:
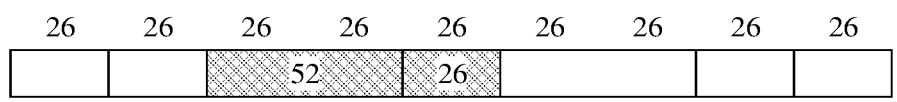
Figure 85:
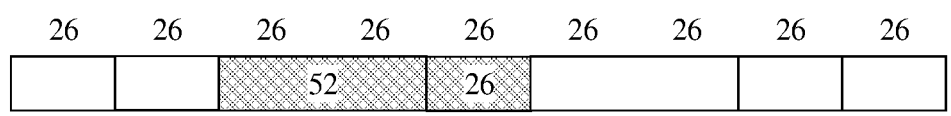

FIG. 69 is a structural diagram of a possible product form of a communication apparatus according to an embodiment of this application.

In a possible product form, the communication apparatus in this embodiment of this application may be a communication device, and the communication device includes a processor 201 and a transceiver 202. Optionally, the communication device further includes a storage medium 203.

When the communication apparatus is used as an AP, the processor 201 is configured to perform step S101 in FIG. 8 or step S201 in FIG. 67. The transceiver 202 is configured to perform step S102 in FIG. 8 or step S202 in FIG. 67.

When the communication apparatus is used as a STA, the processor 201 is configured to perform step S103 in FIG. 8 or step S203 in FIG. 67. The transceiver 202 is configured to perform step S102 in FIG. 8 or step S202 in FIG. 67.

In another possible product form, the communication apparatus described in this embodiment of this application may alternatively be implemented by a general-purpose processor or a special-purpose processor that is commonly referred to as a chip. The chip includes a processing circuit 201 and a transceiver pin 202. Optionally, the chip may further include a storage medium 203.

In another possible product form, the communication apparatus described in this embodiment of this application may alternatively be implemented by using the following circuit or component: one or more field programmable gate arrays (field programmable gate arrays, FPGAs), programmable logic devices (programmable logic devices, PLDs), controllers, state machines, gate logic, discrete hardware components, any other appropriate circuits, or any combination of circuits that can perform the functions described in this application.

It should be understood that the computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

The foregoing descriptions about implementations allow a person skilled in the art to understand that, for the purpose of convenient and brief description, division into the foregoing functional modules is used as an example for illustration. In actual application, the foregoing functions may be allocated to different functional modules and implemented based on requirements, that is, an inner structure of an apparatus is divided into different functional modules to implement all or some of the functions described above.

It should be understood that in the several embodiments provided in this application, the disclosed apparatuses and methods may be implemented in other manners. For example, the described apparatus embodiment is merely an example. For example, division into the modules or the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or a part contributing to the conventional technology, or all or some of the technical solutions may be implemented in a form of a software product. The software product is stored in a storage medium and includes several instructions for instructing a device (which may be a single-chip microcomputer, a chip or the like) or a processor (processor) to perform all or some of the steps of the methods described in embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, the method comprising:
receiving, by an apparatus, a trigger frame, wherein the trigger frame comprises a user information field, the user information field comprises an association identifier (AID) subfield and a resource unit allocation subfield, the AID subfield indicates an association identifier of a station, and a bit BS in the resource unit allocation subfield and a bit B0 in the resource unit allocation subfield jointly indicate an absolute location, in an uplink bandwidth, of a frequency segment in which a frequency domain resource allocated to the station is located; and
determining, by the apparatus, the absolute location, in the uplink bandwidth, of the frequency segment based on the bit BS and the bit B0.

2. The method according to claim 1, wherein the frequency segment is determined in a primary 160 MHz or in a secondary 160 MHz based on the bit BS.

3. The method according to claim 2, wherein:
when the frequency segment is in the primary 160 MHz, the frequency segment is determined to be the primary 80 MHz or the secondary 80 MHz based on bit B0; and
when the frequency segment is in the secondary 160 MHz, the frequency segment is determined to be an 80 MHz with a lower frequency in the secondary 160 MHz or an 80 MHz with a higher frequency in the secondary 160 MHz, based on bit B0.

4. The method according to claim 3, wherein the uplink bandwidth is a 320 MHz uplink bandwidth, a primary 80 MHz frequency segment is an 80 MHz frequency segment with a lowest frequency in the 320 MHz uplink bandwidth, a secondary 80 MHz frequency segment is an 80 MHz frequency segment with a secondary lowest frequency in the 320 MHz uplink bandwidth, a secondary 160 MHz frequency segment is a 160 MHz frequency segment with a highest frequency in the 320 MHz uplink bandwidth, and determining, by the apparatus, the absolute location, in the 320 MHz uplink bandwidth, of the frequency segment based on the bit BS and the bit B0, comprises:
when a value of the bit BS is 0 and a value of the bit B0 is 0, determining that the frequency segment is an 80 MHz frequency segment with the lowest frequency in the 320 MHz uplink bandwidth;
when a value of the bit BS is 0 and a value of the bit B0 is 1, determining that the frequency segment is an 80 MHz frequency segment with the secondary lowest frequency in the 320 MHz uplink bandwidth;
when a value of the bit BS is 1 and a value of the bit B0 is 0, determining that the frequency segment is an 80 MHz frequency segment with a secondary highest frequency in the 320 MHz uplink bandwidth; or
when a value of the bit BS is 1 and a value of the bit B0 is 1, determining that the frequency segment is an 80 MHz frequency segment with a highest frequency in the 320 MHz uplink bandwidth.

5. The method according to claim 3, wherein the uplink bandwidth is a 320 MHz uplink bandwidth, a primary 80 MHz frequency segment is an 80 MHz frequency segment with a secondary lowest frequency in the 320 MHz uplink bandwidth, a secondary 80 MHz frequency segment is an 80 MHz frequency segment with a lowest frequency in the 320

MHz uplink bandwidth, a secondary 160 MHz frequency segment is a 160 MHz frequency segment with a highest frequency in the 320 MHz uplink bandwidth, and determining, by the apparatus, the absolute location, in the 320 MHz uplink bandwidth, of the frequency segment based on the bit BS and the bit B0, comprises:
  when a value of the bit BS is 0 and a value of the bit B0 is 0, determining that the frequency segment is an 80 MHz frequency segment with the secondary lowest frequency in the 320 MHz uplink bandwidth;
  when a value of the bit BS is 0 and a value of the bit B0 is 1, determining that the frequency segment is an 80 MHz frequency segment with the lowest frequency in the 320 MHz uplink bandwidth;
  when a value of the bit BS is 1 and a value of the bit B0 is 0, determining that the frequency segment is an 80 MHz frequency segment with a secondary highest frequency in the 320 MHz uplink bandwidth; or
  when a value of the bit BS is 1 and a value of the bit B0 is 1, determining that the frequency segment is an 80 MHz frequency segment with a highest frequency in the 320 MHz uplink bandwidth.

6. The method according to claim 3, wherein the uplink bandwidth is a 320 MHz uplink bandwidth, a primary 80 MHz frequency segment is an 80 MHz frequency segment with a secondary highest frequency in the 320 MHz uplink bandwidth, a secondary 80 MHz frequency segment is an 80 MHz frequency segment with a highest frequency in the 320 MHz uplink bandwidth, a secondary 160 MHz frequency segment is a 160 MHz frequency segment with a lowest frequency in the 320 MHz uplink bandwidth, and determining, by the apparatus, the absolute location, in the 320 MHz uplink bandwidth, of the frequency segment based on the bit BS and the bit B0, comprises:
  when a value of the bit BS is 0 and a value of the bit B0 is 0, determining that the frequency segment is an 80 MHz frequency segment with the secondary highest frequency in the 320 MHz bandwidth;
  when a value of the bit BS is 0 and a value of the bit B0 is 1, determining that the frequency segment is an 80 MHz frequency segment with the highest frequency in the 320 MHz uplink bandwidth;
  when a value of the bit BS is 1 and a value of the bit B0 is 0, determining that the frequency segment is an 80 MHz frequency segment with a lowest frequency in the 320 MHz uplink bandwidth; or
  when a value of the bit BS is 1 and a value of the bit B0 is 1, determining that the frequency segment is an 80 MHz frequency segment with a secondary lowest frequency in the 320 MHz uplink bandwidth.

7. The method according to claim 3, wherein the uplink bandwidth is a 320 uplink MHz bandwidth, a primary 80 MHz frequency segment is an 80 MHz frequency segment with a highest frequency in the 320 MHz uplink bandwidth, a secondary 80 MHz frequency segment is an 80 MHz frequency segment with a secondary highest frequency in the 320 MHz uplink bandwidth, a secondary 160 MHz frequency segment is a 160 MHz frequency segment with a lowest frequency in the 320 MHz uplink bandwidth, and determining, by the apparatus, the absolute location, in the 320 MHz uplink bandwidth, of the frequency segment in the 320 MHz bandwidth based on the bit BS and the bit B0, comprises:
  when a value of the bit BS is 0 and a value of the bit B0 is 0, determining that the frequency segment is an 80 MHz frequency segment with the highest frequency in the 320 MHz uplink bandwidth;
  when a value of the bit BS is 0 and a value of the bit B0 is 1, determining that the frequency segment is an 80 MHz frequency segment with the secondary highest frequency in the 320 MHz uplink bandwidth;
  when a value of the bit BS is 1 and a value of the bit B0 is 0, determining that the frequency segment is an 80 MHz frequency segment with a lowest frequency in the 320 MHz uplink bandwidth; or
  when a value of the bit BS is 1 and a value of the bit B0 is 1, determining that the frequency segment is an 80 MHz frequency segment with a secondary lowest frequency in the 320 MHz uplink bandwidth.

8. The method according to claim 3, wherein determining the absolute location, in the uplink bandwidth, of the frequency segment based on the bit BS and the bit B0, comprises:
  determining, by the apparatus, a value of an absolute frequency indication parameter based on the bit BS and the bit B0, wherein the value of the absolute frequency indication parameter indicates the absolute location of the frequency segment in the uplink bandwidth; and
  wherein the absolute frequency indication parameter occupies two bits, and a value of the two bits indicates the absolute location of the frequency segment in the uplink bandwidth.

9. The method according to claim 8, wherein
  when a value of one bit of the two bits is 0 and a value of the other bit of the two bits is 0, the frequency segment is an 80 MHz frequency segment with a lowest frequency in a 320 MHz bandwidth;
  when a value of one bit of the two bits is 0 and a value of the other bit of the two bits is 1, the frequency segment is an 80 MHz frequency segment with a secondary lowest frequency in the 320 MHz bandwidth;
  when a value of one bit of the two bits is 1 and a value of the other bit of the two bits is 0, the frequency segment is an 80 MHz frequency segment with a secondary highest frequency in the 320 MHz bandwidth; or
  when a value of one bit of the two bits is 1 and a value of the other bit of the two bits is 1, the frequency segment is an 80 MHz frequency segment with a highest frequency in the 320 MHz bandwidth.

10. The method according to claim 9, wherein the uplink bandwidth is the 320 MHz bandwidth, a primary 80 MHz frequency segment is the 80 MHz frequency segment with the lowest frequency in the 320 MHz uplink bandwidth, a secondary 80 MHz frequency segment is the 80 MHz frequency segment with the secondary lowest frequency in the 320 MHz uplink bandwidth, a secondary 160 MHz frequency segment is a 160 MHz frequency segment with a highest frequency in the 320 MHz uplink bandwidth, and determining, by the apparatus, the value of the absolute frequency indication parameter based on the bit BS and the bit B0, comprises:
  when a value of the bit BS is 0 and a value of the bit B0 is 0, determining that a value of one bit of the two bits is 0 and a value of the other bit of the two bits is 0;
  when a value of the bit BS is 0 and a value of the bit B0 is 1, determining that a value of one bit of the two bits is 0 and a value of the other bit of the two bits is 1;
  when a value of the bit BS is 1 and a value of the bit B0 is 0, determining that a value of one bit of the two bits is 1 and a value of the other bit of the two bits is 0; or
  when a value of the bit BS is 1 and a value of the bit B0 is 1, determining that a value of one bit of the two bits is 1 and a value of the other bit of the two bits is 1.

11. The method according to claim 9, wherein the uplink bandwidth is the 320 MHz bandwidth, a primary 80 MHz frequency segment is the 80 MHz frequency segment with the secondary lowest frequency in the 320 MHz uplink bandwidth, a secondary 80 MHz frequency segment is the 80 MHz frequency segment with the lowest frequency in the 320 MHz uplink bandwidth, a secondary 160 MHz frequency segment is a 160 MHz frequency segment with a highest frequency in the 320 MHz uplink bandwidth, and determining, by the apparatus, the value of the absolute frequency indication parameter based on the bit BS and the bit B0, comprises:

when a value of the bit BS is 0 and a value of the bit B0 is 0, determining that a value of one bit of the two bits is 0 and a value of the other bit of the two bits is 1;

when a value of the bit BS is 0 and a value of the bit B0 is 1, determining that a value of one bit of the two bits is 0 and a value of the other bit of the two bits is 0;

when a value of the bit BS is 1 and a value of the bit B0 is Q, determining that a value of one bit of the two bits is 1 and a value of the other bit of the two bits is 0; or when a value of the bit BS is 1 and a value of the bit B0 is 1, determining that a value of one bit of the two bits is 1 and a value of the other bit of the two bits is 1.

12. The method according to claim 9, wherein the uplink bandwidth is the 320 MHz bandwidth, a primary 80 MHz frequency segment is the 80 MHz frequency segment with the secondary highest frequency in the 320 MHz uplink bandwidth, a secondary 80 MHz frequency segment is the 80 MHz frequency segment with the highest frequency in the 320 MHz uplink bandwidth, a secondary 160 MHz frequency segment is a 160 MHz frequency segment with a lowest frequency in the 320 MHz uplink bandwidth, and determining, by the apparatus, the value of the absolute frequency indication parameter based on the bit BS and the bit B0, comprises:

when a value of the bit BS is 0 and a value of the bit B0 is 0, determining that a value of one bit of the two bits is 1 and a value of the other bit of the two bits is 0;

when a value of the bit BS is 0 and a value of the bit B0 is 1, determining that a value of one bit of the two bits is 1 and a value of the other bit of the two bits is 1;

when a value of the bit BS is 1 and a value of the bit B0 is 0, determining that a value of one bit of the two bits is 0 and a value of the other bit of the two bits is 0; or when a value of the bit BS is 1 and a value of the bit B0 is 1, determining that a value of one bit of the two bits is 0 and a value of the other bit of the two bits is 1.

13. The method according to claim 9, wherein the uplink bandwidth is the 320 MHz bandwidth, a primary 80 MHz frequency segment is the 80 MHz frequency segment with the highest frequency in the 320 MHz uplink bandwidth, a secondary 80 MHz frequency segment is the 80 MHz frequency segment with the secondary highest frequency in the 320 MHz uplink bandwidth, a secondary 160 MHz frequency segment is a 160 MHz frequency segment with a lowest frequency in the 320 MHz uplink bandwidth, and determining, by the apparatus, the value of the absolute frequency indication parameter based on the bit BS and the bit B0, comprises:

when a value of the bit BS is 0 and a value of the bit B0 is 0, determining that a value of one bit of the two bits is 1 and a value of the other bit of the two bits is 1;

when a value of the bit BS is 0 and a value of the bit B0 is 1, determining that a value of one bit of the two bits is 1 and a value of the other bit of the two bits is 0;

when a value of the bit BS is 1 and a value of the bit B0 is 0, determining that a value of one bit of the two bits is 0 and a value of the other bit of the two bits is 0; or when a value of the bit BS is 1 and a value of the bit B0 is 1, determining that a value of one bit of the two bits is 0 and a value of the other bit of the two bits is 1.

14. The method according to claim 3, wherein the bit B0 occupies a bit B0 in a resource block allocation subfield of the user information field.

15. The method according to claim 2, wherein the bit BS occupies a bit B39 in the user information field.

16. An apparatus comprising:

a non-transitory memory storage comprising instructions; and one or more processors in communication with the memory storage, wherein the instructions, when executed by the one or more processors, cause the apparatus to perform:

receiving a trigger frame, wherein the trigger frame comprises a user information field, the user information field comprises an association identifier (AID) subfield and a resource unit allocation subfield, the AID subfield indicates an association identifier of a station, and a bit BS in the resource unit allocation subfield and a bit B0 in the resource unit allocation subfield jointly indicate an absolute location, in an uplink bandwidth, of a frequency segment in which a frequency domain resource allocated to the station is located; and determining the absolute location, in the uplink bandwidth, of the frequency segment based on the bit BS and the bit B0.

17. The apparatus according to claim 16, wherein the frequency segment is in a primary 160 MHz or in a secondary 160 MHz based on the bit BS.

18. The apparatus according to claim 17, wherein:

when the frequency segment is in the primary 160 MHz, the frequency segment is determined to be a primary 80 MHz or a secondary 80 MHz, based on bit B0; and when the frequency segment is in the secondary 160 MHz, the frequency segment is determined to be an 80 MHz with a lower frequency in the secondary 160 MHz or an 80 MHz with a higher frequency in the secondary 160 MHz, based on bit B0.

19. The apparatus according to claim 18, wherein the uplink bandwidth is a 320 MHz uplink bandwidth, a primary 80 MHz frequency segment is an 80 MHz frequency segment with a lowest frequency in the 320 MHz uplink bandwidth, a secondary 80 MHz frequency segment is an 80 MHz frequency segment with a secondary lowest frequency in the 320 MHz uplink bandwidth, a secondary 160 MHz frequency segment is a 160 MHz frequency segment with a highest frequency in the 320 MHz uplink bandwidth, and determining, by the apparatus, the absolute location, in the 320 MHz uplink bandwidth, of the frequency segment based on the bit BS and the bit B0, comprises:

when a value of the bit BS is 0 and a value of the bit B0 is 0, determining that the frequency segment is an 80 MHz frequency segment with the lowest frequency in the 320 MHz uplink bandwidth;

when a value of the bit BS is 0 and a value of the bit B0 is 1, determining that the frequency segment is an 80 MHz frequency segment with the secondary lowest frequency in the 320 MHz uplink bandwidth;

when a value of the bit BS is 1 and a value of the bit B0 is 0, determining that the frequency segment is an 80

MHz frequency segment with a secondary highest frequency in the 320 MHz uplink bandwidth; or when a value of the bit BS is 1 and a value of the bit B0 is 1, determining that the frequency segment is an 80 MHz frequency segment with a highest frequency in the 320 MHz uplink bandwidth.

20. The apparatus according to claim 18, wherein the uplink bandwidth is a 320 MHz uplink bandwidth, a primary 80 MHz frequency segment is an 80 MHz frequency segment with a secondary lowest frequency in the 320 MHz uplink bandwidth, a secondary 80 MHz frequency segment is an 80 MHz frequency segment with a lowest frequency in the 320 MHz uplink bandwidth, a secondary 160 MHz frequency segment is a 160 MHz frequency segment with a highest frequency in the 320 MHz uplink bandwidth, and determining, by the apparatus, the absolute location, in the 320 MHz uplink bandwidth, of the frequency segment based on the bit BS and the bit B0, comprises:

when a value of the bit BS is 0 and a value of the bit B0 is 0, determining that the frequency segment is an 80 MHz frequency segment with the secondary lowest frequency in the 320 MHz uplink bandwidth;

when a value of the bit BS is 0 and a value of the bit B0 is 1, determining that the frequency segment is an 80 MHz frequency segment with the lowest frequency in the 320 MHz uplink bandwidth;

when a value of the bit BS is 1 and a value of the bit B0 is 0, determining that the frequency segment is an 80 MHz frequency segment with a secondary highest frequency in the 320 MHz uplink bandwidth; or when a value of the bit BS is 1 and a value of the bit B0 is 1, determining that the frequency segment is an 80 MHz frequency segment with a highest frequency in the 320 MHz uplink bandwidth.

21. The apparatus according to claim 18, wherein the uplink bandwidth is a 320 MHz uplink bandwidth, a primary 80 MHz frequency segment is an 80 MHz frequency segment with a secondary highest frequency in the 320 MHz uplink bandwidth, a secondary 80 MHz frequency segment is an 80 MHz frequency segment with a highest frequency in the 320 MHz uplink bandwidth, a secondary 160 MHz frequency segment is a 160 MHz frequency segment with a lowest frequency in the 320 MHz uplink bandwidth, and determining, by the apparatus, the absolute location, in the 320 MHz uplink bandwidth, of the frequency segment based on the bit BS and the bit B0, comprises:

when a value of the bit BS is 0 and a value of the bit B0 is 0, determining that the frequency segment is an 80 MHz frequency segment with the secondary highest frequency in the 320 MHz uplink bandwidth;

when a value of the bit BS is 0 and a value of the bit B0 is 1, determining that the frequency segment is an 80 MHz frequency segment with the highest frequency in the 320 MHz uplink bandwidth;

when a value of the bit BS is 1 and a value of the bit B0 is 0, determining that the frequency segment is an 80 MHz frequency segment with a lowest frequency in the 320 MHz uplink bandwidth; or when a value of the bit BS is 1 and a value of the bit B0 is 1, determining that the frequency segment is an 80 MHz frequency segment with a secondary lowest frequency in the 320 MHz uplink bandwidth.

22. The apparatus according to claim 18, wherein the uplink bandwidth is a 320 MHz uplink bandwidth, a primary 80 MHz frequency segment is an 80 MHz frequency segment with a highest frequency in the 320 MHz uplink bandwidth, a secondary 80 MHz frequency segment is an 80 MHz frequency segment with a secondary highest frequency in the 320 MHz uplink bandwidth, a secondary 160 MHz frequency segment is a 160 MHz frequency segment with a lowest frequency in the 320 MHz uplink bandwidth, and determining, by the apparatus, the absolute location, in the 320 MHz uplink bandwidth, of the frequency segment based on the bit BS and the bit B0, comprises:

when a value of the bit BS is 0 and a value of the bit B0 is 0, determining that the frequency segment is an 80 MHz frequency segment with the highest frequency in the 320 MHz uplink bandwidth;

when a value of the bit BS is 0 and a value of the bit B0 is 1, determining that the frequency segment is an 80 MHz frequency segment with the secondary highest frequency in the 320 MHz uplink bandwidth;

when a value of the bit BS is 1 and a value of the bit B0 is 0, determining that the frequency segment is an 80 MHz frequency segment with a lowest frequency in the 320 MHz uplink bandwidth; or when a value of the bit BS is 1 and a value of the bit B0 is 1, determining that the frequency segment is an 80 MHz frequency segment with a secondary lowest frequency in the 320 MHz uplink bandwidth.

23. The apparatus according to claim 18, wherein determining the absolute location, in the uplink bandwidth, of the frequency segment based on the bit BS and the bit B0, comprises:

determining, by the apparatus, a value of an absolute frequency indication parameter based on the bit BS and the bit B0, wherein the value of an absolute frequency indication parameter indicates the absolute location of the frequency segment in the uplink bandwidth; and wherein the absolute frequency indication parameter occupies two bits, and a value of the two bits indicates the absolute location of the frequency segment in the uplink bandwidth.

24. The apparatus according to claim 23, wherein when a value of one bit of the two bits is 0 and a value of the other bit of the two bits is 0, the frequency segment is an 80 MHz frequency segment with a lowest frequency in a 320 MHz bandwidth;

when a value of one bit of the two bits is 0 and a value of the other bit of the two bits is 1, the frequency segment is an 80 MHz frequency segment with a secondary lowest frequency in the 320 MHz bandwidth;

when a value of one bit of the two bits is 1 and a value of the other bit of the two bits is 0, the frequency segment is an 80 MHz frequency segment with a secondary highest frequency in the 320 MHz bandwidth; or when a value of one bit of the two bits is 1 and a value of the other bit of the two bits is 1, the frequency segment is an 80 MHz frequency segment with a highest frequency in the 320 MHz bandwidth.

25. The apparatus according to claim 24, wherein the uplink bandwidth is the 320 MHz uplink bandwidth, a primary 80 MHz frequency segment is the 80 MHz frequency segment with the lowest frequency in the 320 MHz uplink bandwidth, a secondary 80 MHz frequency segment is the 80 MHz frequency segment with the secondary lowest frequency in the 320 MHz uplink bandwidth, a secondary 160 MHz frequency segment is a 160 MHz frequency segment with a highest frequency in the 320 MHz uplink bandwidth, and determining, by the apparatus, the value of the absolute frequency indication parameter based on the bit BS and the bit B0, comprises:

when a value of the bit BS is 0 and a value of the bit B0 is 0, determining that a value of one bit of the two bits is 0 and a value of the other bit of the two bits is 0;
when a value of the bit BS is 0 and a value of the bit B0 is 1, determining that a value of one bit of the two bits is 0 and a value of the other bit of the two bits is 1;
when a value of the bit BS is 1 and a value of the bit B0 is 0, determining that a value of one bit of the two bits is 1 and a value of the other bit of the two bits is 0; or
when a value of the bit BS is 1 and a value of the bit B0 is 1, determining that a value of one bit of the two bits is 1 and a value of the other bit of the two bits is 1.

26. The apparatus according to claim 24, wherein the uplink bandwidth is the 320 MHz uplink bandwidth, a primary 80 MHz frequency segment is the 80 MHz frequency segment with the secondary lowest frequency in the 320 MHz uplink bandwidth, a secondary 80 MHz frequency segment is the 80 MHz frequency segment with the lowest frequency in the 320 MHz uplink bandwidth, a secondary 160 MHz frequency segment is a 160 MHz frequency segment with a highest frequency in the 320 MHz uplink bandwidth, and determining, by the apparatus, the value of the absolute frequency indication parameter based on the bit BS and the bit B0, comprises:
when a value of the bit BS is 0 and a value of the bit B0 is 0, determining that a value of one bit of the two bits is 0 and a value of the other bit of the two bits is 1;
when a value of the bit BS is 0 and a value of the bit B0 is 1, determining that a value of one bit of the two bits is 0 and a value of the other bit of the two bits is 0;
when a value of the bit BS is 1 and a value of the bit B0 is 0, determining that a value of one bit of the two bits is 1 and a value of the other bit of the two bits is 0; or
when a value of the bit BS is 1 and a value of the bit B0 is 1, determining that a value of one bit of the two bits is 1 and a value of the other bit of the two bits is 1.

27. The apparatus according to claim 24, wherein the uplink bandwidth is the 320 MHz uplink bandwidth, a primary 80 MHz frequency segment is the 80 MHz frequency segment with the secondary highest frequency in the 320 MHz uplink bandwidth, a secondary 80 MHz frequency segment is the 80 MHz frequency segment with the highest frequency in the 320 MHz uplink bandwidth, a secondary 160 MHz frequency segment is a 160 MHz frequency segment with a lowest frequency in the 320 MHz uplink bandwidth, and determining, by the apparatus, the value of the absolute frequency indication parameter based on the bit BS and the bit B0, comprises:
when a value of the bit BS is 0 and a value of the bit B0 is 0, determining that a value of one bit of the two bits is 1 and a value of the other bit of the two bits is 0;
when a value of the bit BS is 0 and a value of the bit B0 is 1, determining that a value of one bit of the two bits is 1 and a value of the other bit of the two bits is 1;
when a value of the bit BS is 1 and a value of the bit B0 is 0, determining that a value of one bit of the two bits is 0 and a value of the other bit of the two bits is 0; or
when a value of the bit BS is 1 and a value of the bit B0 is 1, determining that a value of one bit of the two bits is 0 and a value of the other bit of the two bits is 1.

28. The apparatus according to claim 24, wherein the uplink bandwidth is the 320 MHz uplink bandwidth, a primary 80 MHz frequency segment is the 80 MHz frequency segment with the highest frequency in the 320 MHz uplink bandwidth, a secondary 80 MHz frequency segment is the 80 MHz frequency segment with the secondary highest frequency in the 320 MHz uplink bandwidth, a secondary 160 MHz frequency segment is a 160 MHz frequency segment with a lowest frequency in the 320 MHz uplink bandwidth, and determining, by the apparatus, the value of the absolute frequency indication parameter based on the bit BS and the bit B0, comprises:
when a value of the bit BS is 0 and a value of the bit B0 is 0, determining that a value of one bit of the two bits is 1 and a value of the other bit of the two bits is 1;
when a value of the bit BS is 0 and a value of the bit B0 is 1, determining that a value of one bit of the two bits is 1 and a value of the other bit of the two bits is 0;
when a value of the bit BS is 1 and a value of the bit B0 is 0, determining that a value of one bit of the two bits is 0 and a value of the other bit of the two bits is 0; or
when a value of the bit BS is 1 and a value of the bit B0 is 1, determining that a value of one bit of the two bits is 0 and a value of the other bit of the two bits is 1.

29. The apparatus according to claim 18, wherein the bit B0 occupies a bit B0 in a resource block allocation subfield of the user information field.

30. The apparatus according to claim 17, wherein the bit BS occupies a bit B39 in the user information field.

* * * * *

UNITED STATES PATENT AND TRADEMARK OFFICE
CERTIFICATE OF CORRECTION

PATENT NO. : 11,832,263 B2
APPLICATION NO. : 17/994813
DATED : November 28, 2023
INVENTOR(S) : Gan et al.

Page 1 of 1

It is certified that error appears in the above-identified patent and that said Letters Patent is hereby corrected as shown below:

In the Specification

In Column 89, Line 42, delete "anyone" and insert -- any one --.

In the Claims

In Column 111, in Claim 5, Line 3, after "bandwidth," insert -- t --.

In Column 113, in Claim 11, Line 21, delete "Q," and insert -- 0, --.

In Column 115, in Claim 20, Line 15, after "bandwidth," insert -- t --.

Signed and Sealed this
Thirteenth Day of February, 2024

Katherine Kelly Vidal
*Director of the United States Patent and Trademark Office*